US012730034B2

(12) United States Patent
Kumagai

(10) Patent No.: US 12,730,034 B2
(45) Date of Patent: Sep. 8, 2026

(54) MEASURING DEVICE, MEASURING METHOD, AND COMPUTER-READABLE RECORDING MEDIUM

(71) Applicant: Yokogawa Electric Corporation, Tokyo (JP)

(72) Inventor: Yoshihiro Kumagai, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 88 days.

(21) Appl. No.: 18/624,829

(22) Filed: Apr. 2, 2024

(65) Prior Publication Data

US 2024/0337560 A1 Oct. 10, 2024

(30) Foreign Application Priority Data

Apr. 10, 2023 (JP) ................................ 2023-063506

(51) Int. Cl.
*G01M 11/00* (2006.01)
*G01D 5/353* (2006.01)
*G01K 11/322* (2021.01)

(52) U.S. Cl.
CPC ....... *G01M 11/319* (2013.01); *G01D 5/35364* (2013.01); *G01K 11/322* (2021.01)

(58) Field of Classification Search
CPC . G01M 11/319; G01D 5/35364; G01D 5/353; G01K 11/322; G01K 11/32; G01K 15/005; G01B 11/16
See application file for complete search history.

(56) References Cited

U.S. PATENT DOCUMENTS

| | | | | |
|---|---|---|---|---|
| 9,109,977 B2 | 8/2015 | Kishi et al. | | |
| 2003/0103552 A1* | 6/2003 | Chi | G01K 11/32 374/161 | |
| 2007/0223556 A1* | 9/2007 | Lee | G01K 15/00 374/161 | |
| 2008/0181554 A1* | 7/2008 | Taverner | G01K 11/32 374/E11.015 | |

(Continued)

FOREIGN PATENT DOCUMENTS

| | | |
|---|---|---|
| JP | 2008-170182 A | 7/2008 |
| JP | 5654891 B2 | 1/2015 |

(Continued)

OTHER PUBLICATIONS

Japanese Office Action (JPOA) mailed Jun. 16, 2026 and issued for Japanese patent application No. 2023-063506 and its English machine translation.

*Primary Examiner* — Michelle M Iacoletti
*Assistant Examiner* — Maher Yazback
(74) *Attorney, Agent, or Firm* — RANKIN, HILL & CLARK LLP

(57) ABSTRACT

An optical fiber characteristic measuring device acquires a Brillouin Frequency Shift (BFS) from a measuring position of an optical fiber disposed in an object to be measured, generates temperature distribution in a longitudinal direction of the optical fiber by converting the acquired BFS into a temperature, calculates a physical property change of the optical fiber based on the generated temperature distribution, and corrects the measuring position of the optical fiber based on the calculated physical property change.

7 Claims, 35 Drawing Sheets

(56) References Cited

U.S. PATENT DOCUMENTS

| | | | | |
|---|---|---|---|---|
| 2010/0040108 | A1* | 2/2010 | Sasaoka | G01D 5/35358 385/12 |
| 2010/0054298 | A1* | 3/2010 | Sasaoka | G01K 11/32 374/E11.015 |
| 2011/0228255 | A1* | 9/2011 | Li | G01B 11/18 356/32 |
| 2011/0231135 | A1* | 9/2011 | Suh | G01K 11/32 374/1 |
| 2016/0245643 | A1* | 8/2016 | Mori | G01D 5/35387 |
| 2018/0058948 | A1* | 3/2018 | Uno | G01K 11/32 |
| 2020/0032644 | A1 | 1/2020 | Xia et al. | |
| 2022/0011174 | A1* | 1/2022 | Ge | G01K 15/005 |
| 2022/0323997 | A1* | 10/2022 | Pawluczyk | G06N 3/091 |
| 2024/0011848 | A1* | 1/2024 | Kumagai | G01K 11/322 |

FOREIGN PATENT DOCUMENTS

| | | | |
|---|---|---|---|
| JP | 6686423 | B2 | 4/2020 |
| WO | 2019/022084 | A1 | 1/2019 |

* cited by examiner

1000
FUT
S
OBJECT TO BE MEASURED
OPTICAL FIBER
GENERATE BFS DISTRIBUTION
S1
100
OPTICAL FIBER CHARACTERISTIC MEASURING DEVICE
S5
CALCULATE MEASURING POSITION DISPLACEMENT AMOUNT
S4
CALCULATE DISTANCE CHANGE
S3
GENERATE REFRACTIVE INDEX DISTRIBUTION
S2
GENERATE TEMPERATURE DISTRIBUTION
S6
CORRECT TEMPERATURE DISTRIBUTION
S7
DETECT ABNORMALITY (1)
BRILLOUIN FREQUENCY SHIFT
0 m
MEASURING POSITION
(2)
TEMPERATURE
HIGH
LOW
0 m
MEASURING POSITION

MEASURING POSITION DISPLACEMENT

− ←  → +

OPTICAL FIBER SENSOR

MEASURING POSITION 0 m POSITION

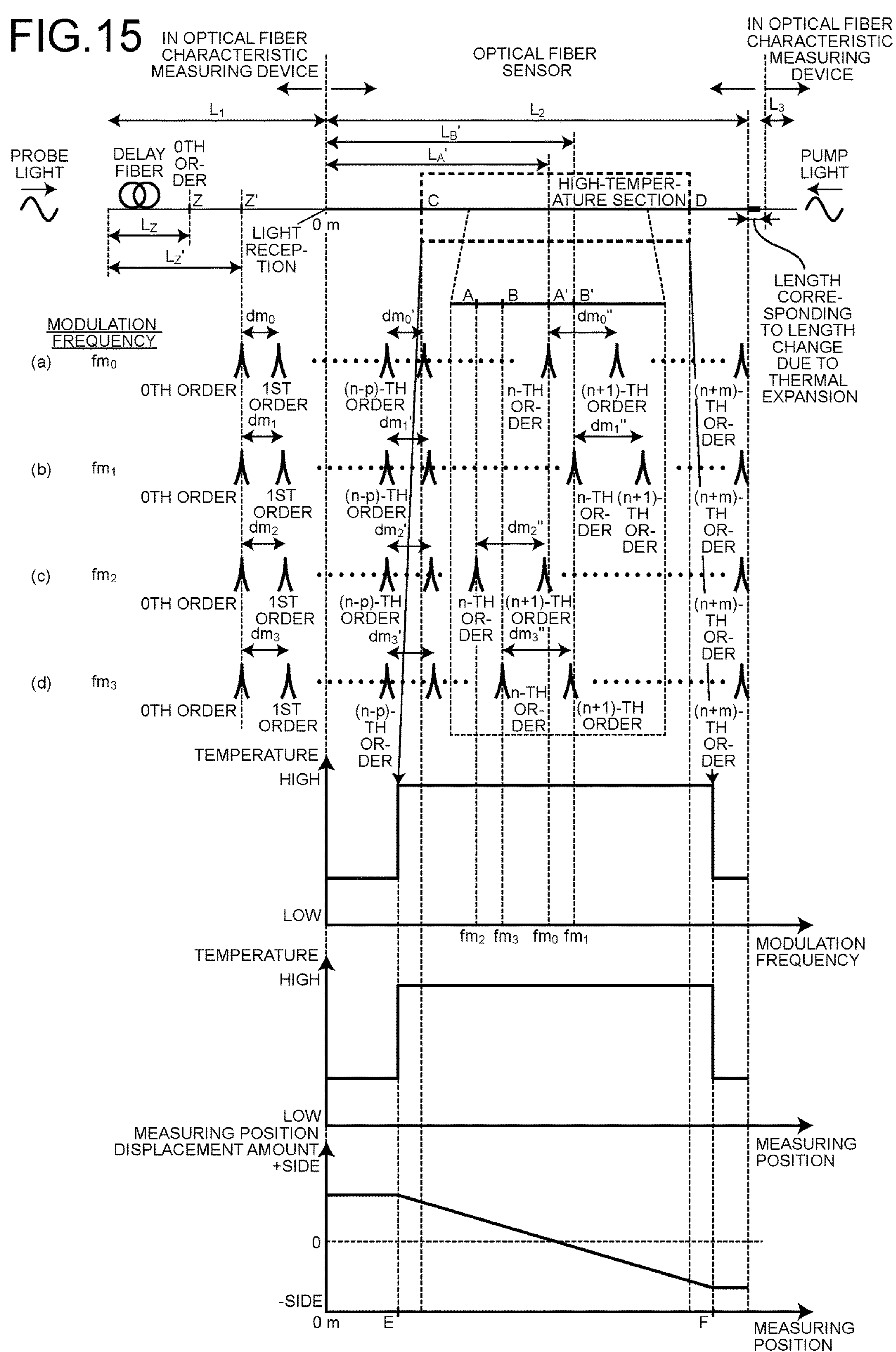
FIG.15
IN OPTICAL FIBER CHARACTERISTIC MEASURING DEVICE
OPTICAL FIBER SENSOR
IN OPTICAL FIBER CHARACTERISTIC MEASURING DEVICE
L1
L2
L3
LB'
LA'
PROBE LIGHT
DELAY FIBER
0TH ORDER
Z
Z'
C
HIGH-TEMPERATURE SECTION
D
PUMP LIGHT
LZ
LZ'
LIGHT RECEPTION
0 m
LENGTH CORRESPONDING TO LENGTH CHANGE DUE TO THERMAL EXPANSION
A B A' B'
MODULATION FREQUENCY
(a) fm0
(b) fm1
(c) fm2
(d) fm3
dm0 dm0' dm0''
dm1 dm1' dm1''
dm2 dm2' dm2''
dm3 dm3' dm3''
0TH ORDER
1ST ORDER
(n-p)-TH ORDER
n-TH ORDER
(n+1)-TH ORDER
(n+m)-TH ORDER
TEMPERATURE
HIGH
LOW
fm2 fm3 fm0 fm1
MODULATION FREQUENCY
MEASURING POSITION
MEASURING POSITION DISPLACEMENT AMOUNT
+SIDE
0
-SIDE
0 m
E
F

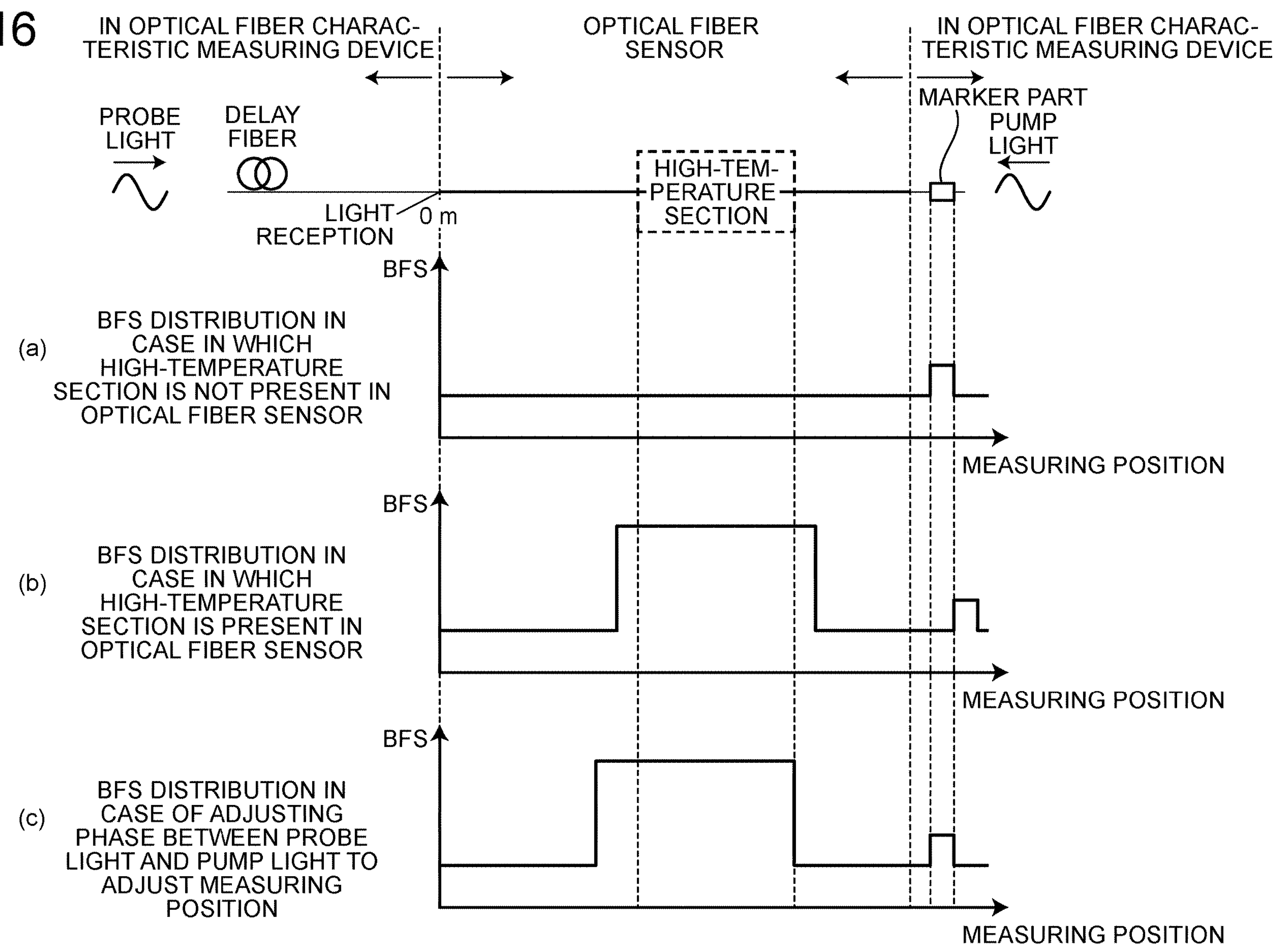
FIG.16
IN OPTICAL FIBER CHARAC-TERISTIC MEASURING DEVICE
OPTICAL FIBER SENSOR
IN OPTICAL FIBER CHARAC-TERISTIC MEASURING DEVICE
PROBE LIGHT
DELAY FIBER
MARKER PART
PUMP LIGHT
HIGH-TEM-PERATURE SECTION
LIGHT RECEPTION
0 m
BFS
(a)
BFS DISTRIBUTION IN CASE IN WHICH HIGH-TEMPERATURE SECTION IS NOT PRESENT IN OPTICAL FIBER SENSOR
MEASURING POSITION
BFS
(b)
BFS DISTRIBUTION IN CASE IN WHICH HIGH-TEMPERATURE SECTION IS PRESENT IN OPTICAL FIBER SENSOR
MEASURING POSITION
BFS
(c)
BFS DISTRIBUTION IN CASE OF ADJUSTING PHASE BETWEEN PROBE LIGHT AND PUMP LIGHT TO ADJUST MEASURING POSITION
MEASURING POSITION

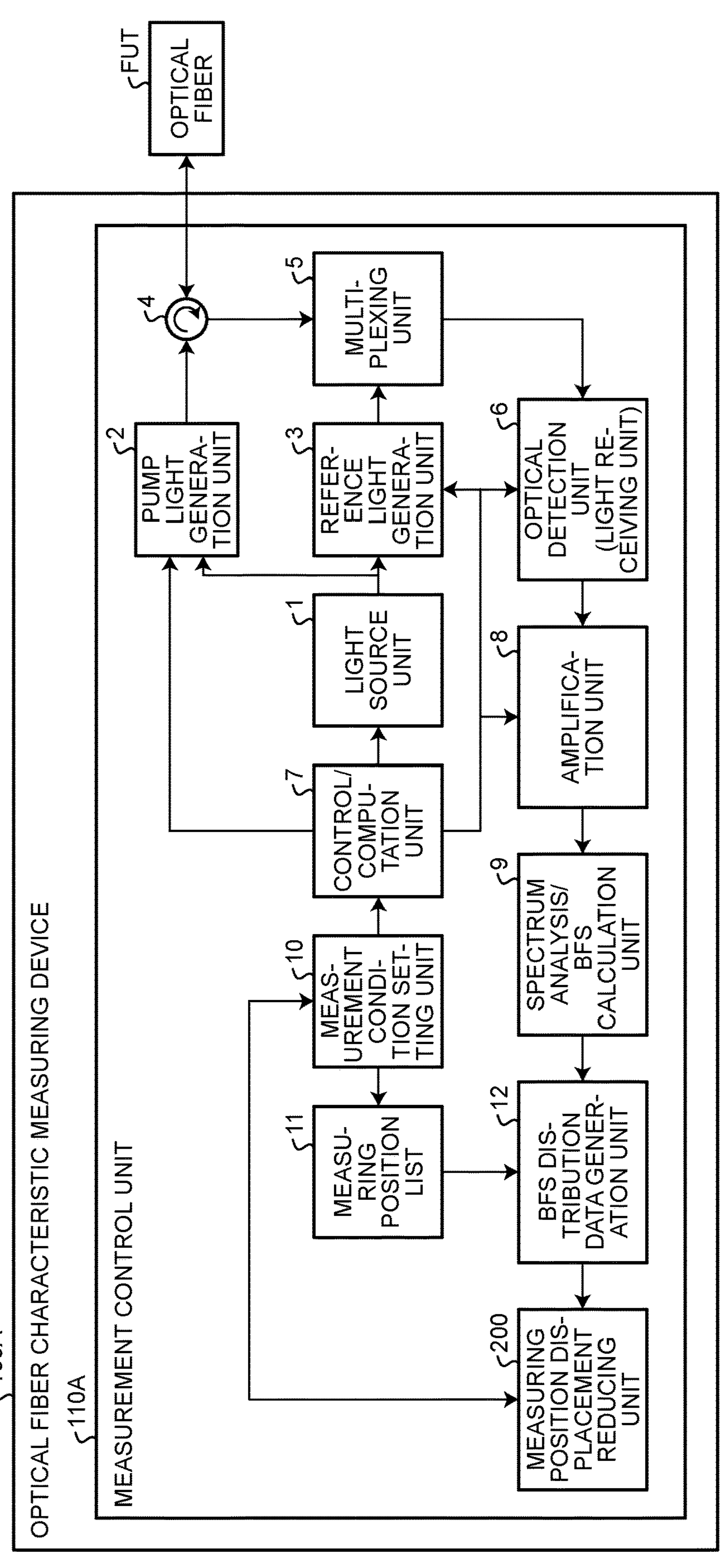
FIG.17
FUT
OPTICAL FIBER
100A
OPTICAL FIBER CHARACTERISTIC MEASURING DEVICE
110A
MEASUREMENT CONTROL UNIT
4
5
MULTI-PLEXING UNIT
2
PUMP LIGHT GENERA-TION UNIT
3
REFER-ENCE LIGHT GENERA-TION UNIT
6
OPTICAL DETECTION UNIT (LIGHT RE-CEIVING UNIT)
1
LIGHT SOURCE UNIT
8
AMPLIFICA-TION UNIT
7
CONTROL/ COMPU-TATION UNIT
9
SPECTRUM ANALYSIS/ BFS CALCULATION UNIT
10
MEAS-UREMENT CONDI-TION SET-TING UNIT
11
MEASU-RING POSITION LIST
12
BFS DIS-TRIBUTION DATA GENER-ATION UNIT
200
MEASURING POSITION DIS-PLACEMENT REDUCING UNIT

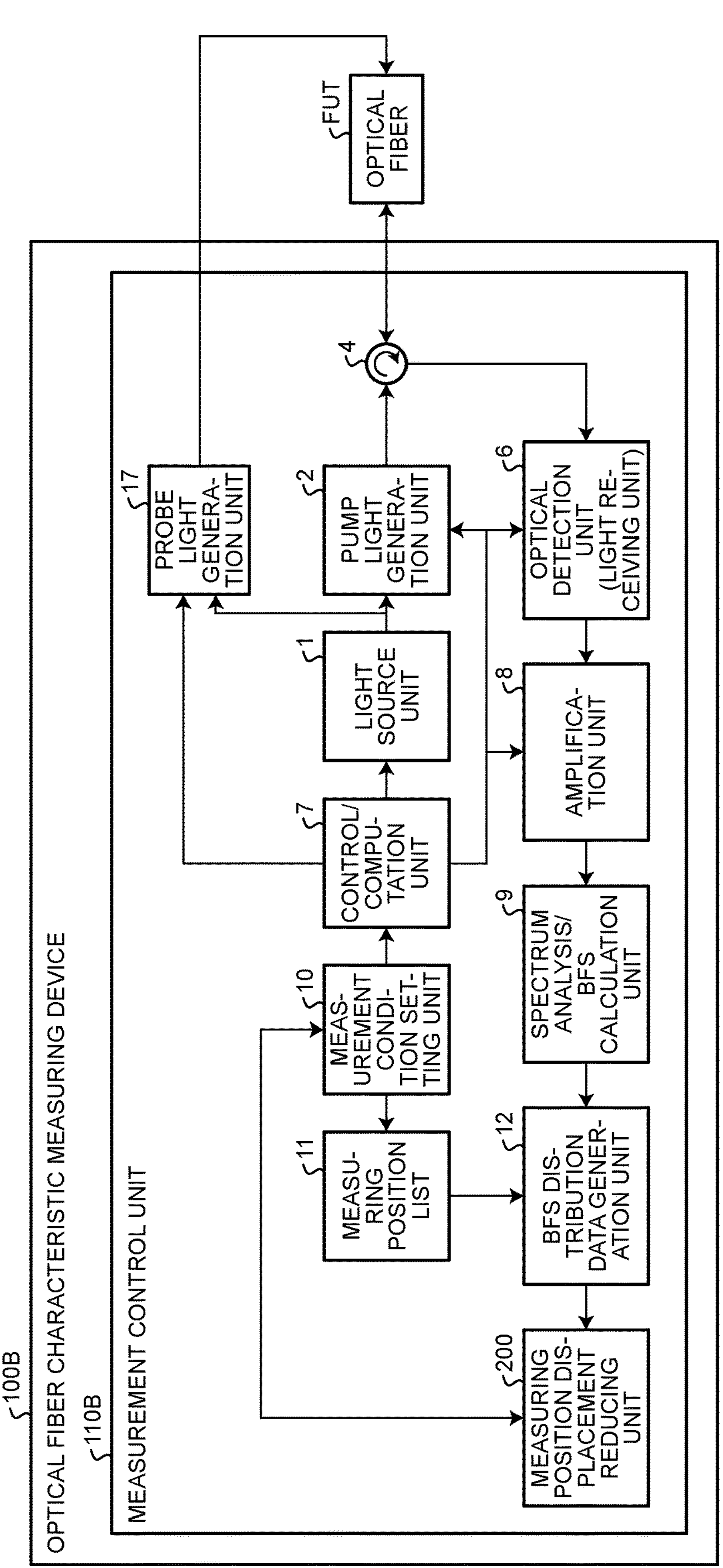
FIG.18
100B
OPTICAL FIBER CHARACTERISTIC MEASURING DEVICE
110B
MEASUREMENT CONTROL UNIT
FUT
OPTICAL FIBER
4
17
PROBE LIGHT GENERATION UNIT
2
PUMP LIGHT GENERATION UNIT
6
OPTICAL DETECTION UNIT (LIGHT RECEIVING UNIT)
1
LIGHT SOURCE UNIT
8
AMPLIFICATION UNIT
7
CONTROL/COMPUTATION UNIT
9
SPECTRUM ANALYSIS/BFS CALCULATION UNIT
10
MEASUREMENT CONDITION SETTING UNIT
11
MEASURING POSITION LIST
12
BFS DISTRIBUTION DATA GENERATION UNIT
200
MEASURING POSITION DISPLACEMENT REDUCING UNIT

FIG.25

| SIGN | |
|---|---|
| $L_1$ | 100 m |
| $L_2$ | 720 m |
| $n_{ref1}$ | 1.4679 |
| $n_{ref2}$ | 1.4679 |
| $L_{h1}'$ | 200 m |
| $L_{h2}'$ | 120 m |
| $T_{h1}$ | 800℃ |
| $T_{h2}$ | 600℃ |
| $T_a$ | 25℃ |
| $\alpha$ | $0.5\times10^{-6}$/℃ |
| A | 100 m |
| B | 300 m |
| C | 480 m |
| D | 600 m |
| E | 720 m |

FIG.26

| SIGN | |
|---|---|
| $n_{refh1}$ | 1.4826 |
| $n_{refh2}$ | 1.4774 |
| $L_{h1}$ | 198.017 |
| $L_{h2}$ | 119.228 |
| $\beta_{AB}$ | -1.9830 |
| $\beta_{CD}$ | -0.7716 |
| $R_{AB}$ | -0.0099 |
| $R_{CD}$ | -0.0064 |
| $\beta_{AB}+\beta_{CD}$ | -2.7546 |
| $L_{s1}$ | 197.940 |
| $L_{s2}$ | 119.194 |
| $\Delta L_{s1}$ | 0.077 |
| $\Delta L_{s2}$ | 0.034 |

FIG.27

| MEASURING POSITION [m] | TEMPER-ATURE [℃] | MEASURING POSITION DISPLACEMENT AMOUNT [m] | ACTUAL MEASURING POSITION [m] |
|---|---|---|---|
| 0 | 25 | 0.000 | 0.000 |
| 50 | 25 | 0.000 | 50.000 |
| 100 | 800 | 0.000 | 100.000 |
| 150 | 800 | -0.496 | 149.504 |
| 200 | 800 | -0.992 | 199.008 |
| 250 | 800 | -1.487 | 248.513 |
| 300 | 800 | -1.983 | 298.017 |
| 350 | 25 | -1.983 | 348.017 |
| 400 | 25 | -1.983 | 398.017 |
| 480 | 600 | -1.983 | 478.017 |
| 550 | 600 | -2.433 | 547.567 |
| 600 | 600 | -2.755 | 597.245 |
| 650 | 25 | -2.755 | 647.245 |
| 720 | 25 | -2.755 | 717.245 |
| 722.7546 | 25 | -2.755 | 720.000 |
| 722.8656 | 25 | -2.755 | 720.111 |

FIG.32

| SIGN | |
|---|---|
| $L_1$ | 1000 m |
| $L_2$ | 720 m |
| $L_3$ | 80 m |
| $n_{ref1}$ | 1.4679 |
| $n_{ref2}$ | 1.4679 |
| $n_{ref3}$ | 1.4679 |
| $L_{h1}'$ | 200 m |
| $L_{h2}'$ | 120 m |
| $T_{h1}$ | 800℃ |
| $T_{h2}$ | 600℃ |
| $T_a$ | 25℃ |
| $\alpha$ | $0.5\times10^{-6}$/℃ |
| A | 100 m |
| B | 300 m |
| C | 480 m |
| D | 600 m |
| E | 720 m |

FIG.33

| SIGN | |
|---|---|
| $n_{refh1}$ | 1.4826 |
| $n_{refh2}$ | 1.4774 |
| $L_{h1}$ | 198.012 |
| $L_{h2}$ | 119.229 |
| $\beta_{(+)AB}$ | 1.0322 |
| $\beta_{(-)AB}$ | -0.9555 |
| $\beta_{(+)CD}$ | 0.4027 |
| $\beta_{(-)CD}$ | -0.3685 |
| $R_{AB}$ | -0.0099 |
| $R_{CD}$ | -0.0064 |
| $\beta_{(+)AB}+\beta_{(+)CD}$ | 1.4349 |
| $\beta_{(-)AB}+\beta_{(+)CD}$ | -0.5527 |
| $\beta_{(-)AB}+\beta_{(-)CD}$ | -1.3240 |
| $L_{s1}$ | 197.936 |
| $L_{s2}$ | 119.195 |
| $\Delta L_{s1}$ | 0.077 |
| $\Delta L_{s2}$ | 0.034 |

FIG.34

| MEASURING POSITION [m] | TEMPER-ATURE [℃] | MEASURING POSITION DISPLACEMENT AMOUNT [m] | ACTUAL MEASURING POSITION [m] |
|---|---|---|---|
| -1.435 | 25 | 1.435 | 0.000 |
| 0 | 25 | 1.435 | 1.435 |
| 10 | 25 | 1.435 | 11.435 |
| 50 | 25 | 1.435 | 51.435 |
| 100 | 800 | 1.435 | 101.435 |
| 150 | 800 | 0.938 | 150.938 |
| 200 | 800 | 0.441 | 200.441 |
| 250 | 800 | -0.056 | 249.944 |
| 300 | 800 | -0.553 | 299.447 |
| 350 | 25 | -0.553 | 349.447 |
| 400 | 25 | -0.553 | 399.447 |
| 480 | 600 | -0.553 | 479.447 |
| 550 | 600 | -1.003 | 548.997 |
| 600 | 600 | -1.324 | 598.676 |
| 650 | 25 | -1.324 | 648.676 |
| 720 | 25 | -1.324 | 718.676 |
| 721.324 | 25 | -1.324 | 720.000 |
| 721.435 | 25.000 | -1.323965595 | 720.111 |

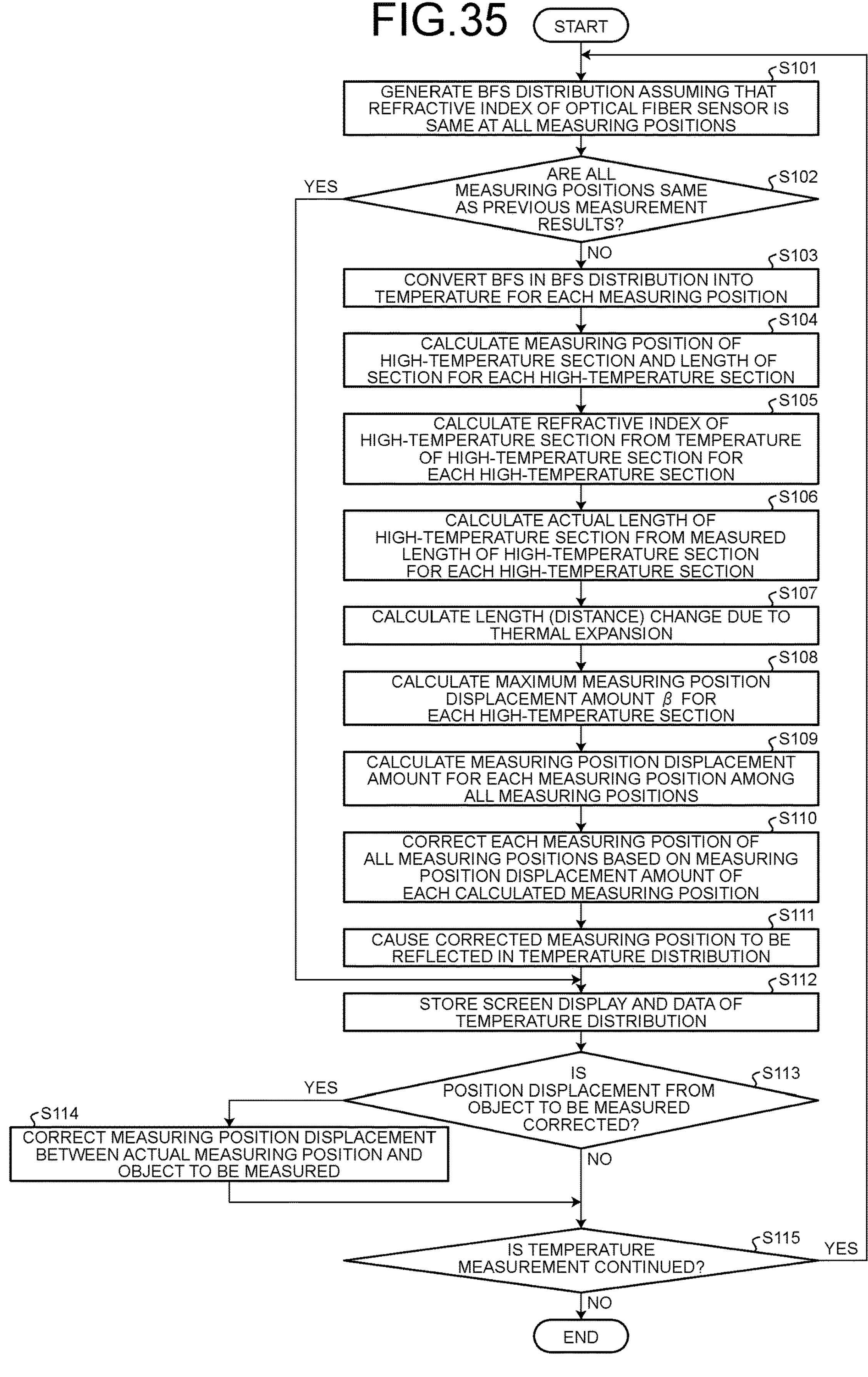
FIG.35
START
S101
GENERATE BFS DISTRIBUTION ASSUMING THAT REFRACTIVE INDEX OF OPTICAL FIBER SENSOR IS SAME AT ALL MEASURING POSITIONS
S102
ARE ALL MEASURING POSITIONS SAME AS PREVIOUS MEASUREMENT RESULTS?
YES
NO
S103
CONVERT BFS IN BFS DISTRIBUTION INTO TEMPERATURE FOR EACH MEASURING POSITION
S104
CALCULATE MEASURING POSITION OF HIGH-TEMPERATURE SECTION AND LENGTH OF SECTION FOR EACH HIGH-TEMPERATURE SECTION
S105
CALCULATE REFRACTIVE INDEX OF HIGH-TEMPERATURE SECTION FROM TEMPERATURE OF HIGH-TEMPERATURE SECTION FOR EACH HIGH-TEMPERATURE SECTION
S106
CALCULATE ACTUAL LENGTH OF HIGH-TEMPERATURE SECTION FROM MEASURED LENGTH OF HIGH-TEMPERATURE SECTION FOR EACH HIGH-TEMPERATURE SECTION
S107
CALCULATE LENGTH (DISTANCE) CHANGE DUE TO THERMAL EXPANSION
S108
CALCULATE MAXIMUM MEASURING POSITION DISPLACEMENT AMOUNT β FOR EACH HIGH-TEMPERATURE SECTION
S109
CALCULATE MEASURING POSITION DISPLACEMENT AMOUNT FOR EACH MEASURING POSITION AMONG ALL MEASURING POSITIONS
S110
CORRECT EACH MEASURING POSITION OF ALL MEASURING POSITIONS BASED ON MEASURING POSITION DISPLACEMENT AMOUNT OF EACH CALCULATED MEASURING POSITION
S111
CAUSE CORRECTED MEASURING POSITION TO BE REFLECTED IN TEMPERATURE DISTRIBUTION
S112
STORE SCREEN DISPLAY AND DATA OF TEMPERATURE DISTRIBUTION
S113
IS POSITION DISPLACEMENT FROM OBJECT TO BE MEASURED CORRECTED?
YES
NO
S114
CORRECT MEASURING POSITION DISPLACEMENT BETWEEN ACTUAL MEASURING POSITION AND OBJECT TO BE MEASURED
S115
IS TEMPERATURE MEASUREMENT CONTINUED?
YES
NO
END

MEASURING DEVICE, MEASURING METHOD, AND COMPUTER-READABLE RECORDING MEDIUM

CROSS-REFERENCE TO RELATED APPLICATION

The present application claims priority to and incorporates by reference the entire contents of Japanese Patent Application No. 2023-063506 filed in Japan on Apr. 10, 2023.

FIELD

The present invention relates to a measuring device, a measuring method, and a computer-readable recording medium.

BACKGROUND

An optical fiber characteristic measuring device is a device configured to measure characteristics such as a temperature, astrain, or a vibration of a measuring object based on a physical quantity change of an optical fiber by using, as a sensor, the optical fiber disposed in the measuring object (as appropriate, referred to as an "object to be measured") such as a bridge or a building. The optical fiber characteristic measuring device measures characteristics of the measuring object by using a property of Brillouin Frequency Shift (BFS), which is a physical quantity of the optical fiber, such that a frequency changes depending on a temperature or a strain of the optical fiber. The related technologies are described, for example, in: Japanese Patent No. 5654891; and Japanese Patent No. 6686423.

However, in the optical fiber characteristic measuring device, accuracy of a measuring position for the characteristics of the measuring object may be lowered. For example, in a case in which the optical fiber includes a high-temperature section, a refractive index or a length of the optical fiber is changed, so that the measuring position is displaced. A high-temperature condition is not often satisfied in a general building and the like, but it is difficult to accurately measure characteristics of a measuring object that is expected to satisfy the high-temperature condition such as a blade of an aircraft, a fuel tank, an iron blast furnace in an iron mill, a heat transfer pipe of a power plant boiler, and a reactor in a chemical plant.

The present invention is made in view of such a situation, and aims at suppressing lowering of accuracy of the measuring position for the characteristics of the measuring object.

SUMMARY

According to an aspect of the embodiments, a measuring device includes a measurement control unit, the measurement control unit being configured to acquire each Brillouin Frequency Shift from each measuring position of an optical fiber disposed in a measuring object, generate temperature distribution in a longitudinal direction of the optical fiber by converting each Brillouin Frequency Shift into a temperature, calculate a physical property change of the optical fiber based on the temperature distribution, and correct each measuring position of the optical fiber based on the physical property change.

According to an aspect of the embodiments, a measuring method includes acquiring each Brillouin Frequency Shift from each measuring position of an optical fiber disposed in a measuring object, generating temperature distribution in a longitudinal direction of the optical fiber by converting each Brillouin Frequency Shift into a temperature, calculating a physical property change of the optical fiber based on the temperature distribution, and correcting each measuring position of the optical fiber based on the physical property change.

According to an aspect of the embodiments, a computer-readable recording medium having stored therein a measuring program that causes a computer to perform processing includes acquiring each Brillouin Frequency Shift from each measuring position of an optical fiber disposed in a measuring object, generating temperature distribution in a longitudinal direction of the optical fiber by converting each Brillouin Frequency Shift into a temperature, calculating a physical property change of the optical fiber based on the temperature distribution, and correcting each measuring position of the optical fiber based on the physical property change.

BRIEF DESCRIPTION OF THE DRAWINGS

FIG. 15 is a diagram for explaining a specific example 2 of temperature measurement processing with a high-temperature section in the correlation domain scheme (BOCDA) according to the reference technique;

FIG. 16 is a diagram for explaining adjustment of a measuring position displacement according to the reference technique;

FIG. 17 is a block diagram illustrating a configuration example 1 of an optical fiber characteristic measuring device according to the embodiment;

FIG. 18 is a block diagram illustrating a configuration example 2 of the optical fiber characteristic measuring device according to the embodiment;

FIG. 25 is a diagram illustrating a specific example of preconditions in the time domain scheme and the correlation domain scheme (BOCDR) according to the embodiment;

FIG. 26 is a diagram illustrating a specific example of calculation results in the time domain scheme and the correlation domain scheme (BOCDR) according to the embodiment;

FIG. 27 is a diagram illustrating a specific example of temperature distribution after correction in the time domain scheme and the correlation domain scheme (BOCDR) according to the embodiment;

FIG. 32 is a diagram illustrating a specific example of preconditions in the correlation domain scheme (BOCDA) according to the embodiment;

FIG. 33 is a diagram illustrating a specific example of calculation results in the correlation domain scheme (BOCDA) according to the embodiment;

FIG. 34 is a diagram illustrating a specific example of temperature distribution after correction in the correlation domain scheme (BOCDA) according to the embodiment;

FIG. 35 is a flowchart illustrating an example of a procedure of the entire optical fiber characteristic measurement processing in the time domain scheme and the correlation domain scheme (BOCDR) according to the embodiment;

DETAILED DESCRIPTION OF THE PREFERRED EMBODIMENTS

The following describes a measuring device, a measuring method, and a computer-readable recording medium according to an embodiment of the present invention in detail with reference to the drawings. The present invention is not limited to the embodiment described below.

EMBODIMENT

The following describes a configuration and processing of an optical fiber characteristic measuring system 1000 according to the present embodiment, a configuration and processing of an optical fiber characteristic measuring device 100, specific examples of pieces of the processing of the optical fiber characteristic measuring device 100, and a processing procedure of the optical fiber characteristic measuring system 1000 in this order, and lastly describes effects of the embodiment.

1. Configuration of Optical Fiber Characteristic Measuring System 1000

Figure 1:
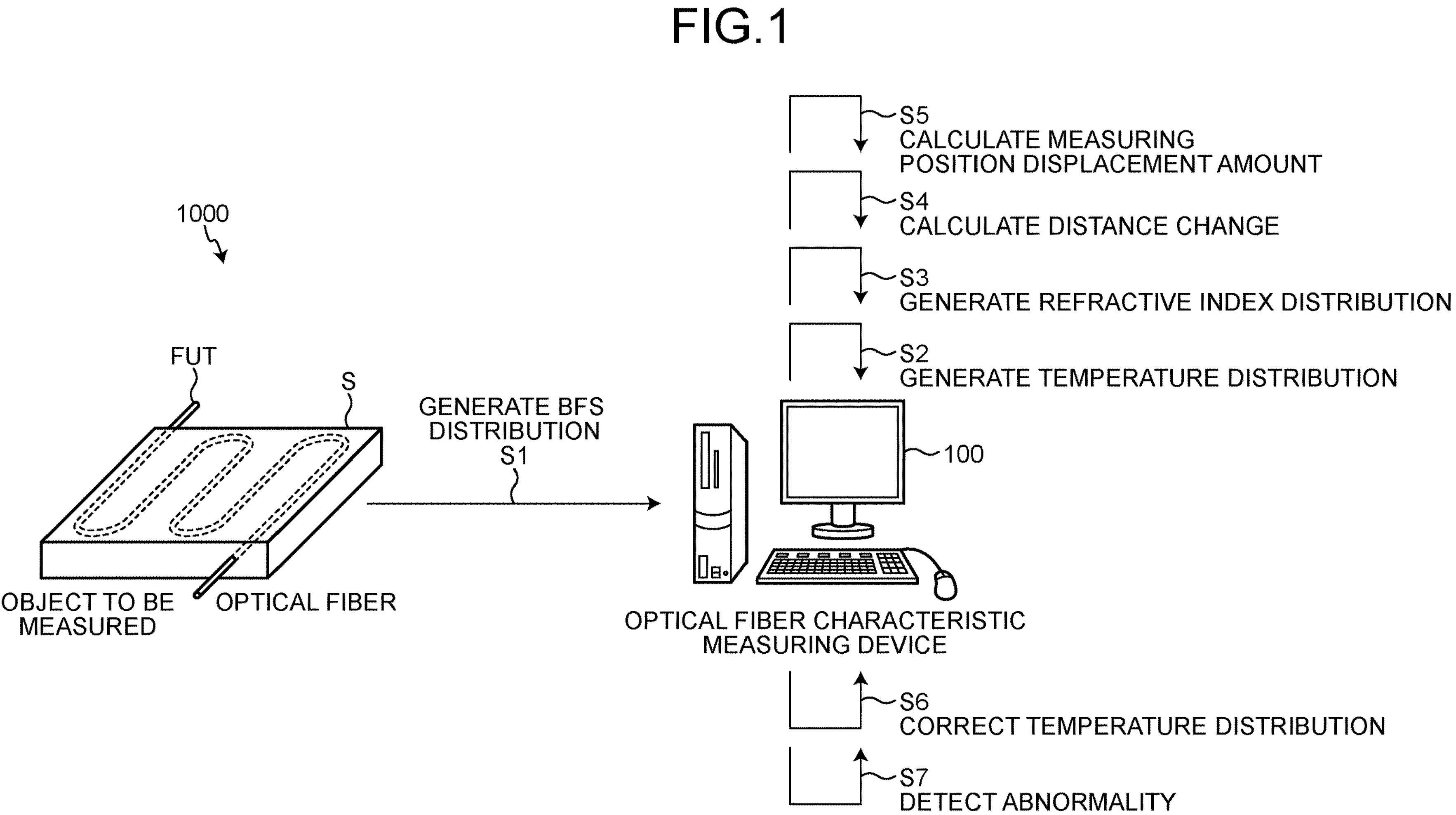
FIG. 1 is a diagram illustrating a configuration example and a processing example of an optical fiber characteristic measuring system according to an embodiment.

The following describes a configuration and processing of the optical fiber characteristic measuring system 1000 according to the embodiment in detail with reference to FIG. 1. FIG. 1 is a diagram illustrating a configuration example and a processing example of the optical fiber characteristic measuring system 1000 according to the embodiment. The following describes the configuration example of the entire optical fiber characteristic measuring system 1000, the processing example of the optical fiber characteristic measuring system 1000, a processing example of an optical fiber characteristic measuring device 100P according to a reference technique, and problems in the reference technique in this order, and lastly describes effects of the optical fiber characteristic measuring system 1000.

1-1. Configuration Example of Entire Optical Fiber Characteristic Measuring System 1000

The optical fiber characteristic measuring system 1000 includes the optical fiber characteristic measuring device 100 and an optical fiber FUT disposed in an object S to be measured. Herein, the optical fiber characteristic measuring device 100 is an example of an information processing device configured to measure characteristics such as a temperature, a strain, and a vibration of the object S to be measured such as a blade of an aircraft, a fuel tank, an iron blast furnace in an iron mill, a heat transfer pipe of a power plant boiler, and a reactor in a chemical plant in addition to an architecture such as a bridge, a building, and a dam. The optical fiber FUT is an example of a sensor (as appropriate, referred to as an "optical fiber sensor") disposed for measuring characteristics of the object S to be measured. The optical fiber characteristic measuring system 1000 illustrated in FIG. 1 may include a plurality of the optical fiber characteristic measuring devices 100 or a plurality of the optical fibers FUT. In the example of FIG. 1, exemplified is a case in which the optical fiber characteristic measuring device 100 is implemented by a desktop personal computer (PC), but may be implemented by a server device, a cloud system, or the like.

The optical fiber characteristic measuring device 100 and the optical fiber FUT are connected to be able to communicate with each other in a wired or wireless manner via a predetermined communication network (network) (not illustrated). As the predetermined communication network, various types of communication networks such as the Internet or a private line can be employed.

1-2. Processing Example of Entire Optical Fiber Characteristic Measuring System 1000

The following describes the processing of the entire optical fiber characteristic measuring system 1000 as described above. The following describes BFS distribution generation processing, temperature distribution generation processing, refractive index distribution generation processing, distance change calculation processing, measuring position displacement amount calculation processing, temperature distribution correction processing, and abnormality detection processing in this order. The following pieces of processing may be performed in different order. Some of the following pieces of processing may be omitted.

1-2-1. BFS Distribution Generation Processing

The optical fiber characteristic measuring device 100 generates BFS distribution (Step S1). For example, the optical fiber characteristic measuring device 100 acquires a power spectrum of Brillouin scattering light corresponding to a measuring position of the optical fiber FUT using a time domain scheme or a correlation domain scheme, calculates a BFS, and generates BFS distribution in a longitudinal direction of the optical fiber FUT. At this point, as a scheme of causing light to be incident on the optical fiber FUT, the optical fiber characteristic measuring device 100 can employ a single-end incident scheme or a double-end incident scheme.

1-2-2. Temperature Distribution Generation Processing

The optical fiber characteristic measuring device 100 generates temperature distribution (Step S2). For example, the optical fiber characteristic measuring device 100 converts a BFS in the BFS distribution into a temperature for each measuring position, and generates the temperature distribution in the longitudinal direction of the optical fiber FUT.

1-2-3. Refractive Index Distribution Generation Processing

The optical fiber characteristic measuring device 100 generates refractive index distribution (Step S3). For example, the optical fiber characteristic measuring device 100 specifies a high-temperature section from the temperature distribution, converts a temperature T into a refractive index $n_{refh}$ for each specified high-temperature section, and generates the refractive index distribution in the longitudinal direction of the optical fiber FUT.

1-2-4. Distance Change Calculation Processing

The optical fiber characteristic measuring device 100 calculates a distance change $\Delta L_s$ (Step S4). For example, the optical fiber characteristic measuring device 100 specifies a high-temperature section from the temperature distribution, and calculates the distance change $\Delta L_s$ in the longitudinal direction of the optical fiber FUT due to thermal expansion for each specified high-temperature section. In a case in which the optical fiber characteristic measuring device 100 is not required to consider the distance change $\Delta L_s$, the processing described above is omitted.

1-2-5. Measurement Position Displacement Amount Calculation Processing

The optical fiber characteristic measuring device 100 calculates a measuring position displacement amount $\Delta L_\beta$ (Step S5). For example, the optical fiber characteristic measuring device 100 calculates the measuring position displacement amount $\Delta L_\beta$ between the measuring position and an actual measuring position from the refractive index distribution for each high-temperature section.

1-2-6. Temperature Distribution Correction Processing

The optical fiber characteristic measuring device 100 corrects the temperature distribution (Step S6). For example, the optical fiber characteristic measuring device 100 corrects the measuring position based on the measuring position displacement amount $\Delta L_\beta$ and the distance change $\Delta L_s$, and generates temperature distribution after correction.

1-2-7. Abnormality Detection Processing

The optical fiber characteristic measuring device 100 detects abnormality (Step S7). For example, in a case in which a temperature indicated by the temperature distribution after correction is equal to or higher than a temperature threshold $X_T$, the optical fiber characteristic measuring device 100 detects that the temperature of the object S to be measured is in an abnormal state. At this point, the optical fiber characteristic measuring device 100 may display the fact that the temperature of the object S to be measured is in the abnormal state on a monitor and the like connected to the optical fiber characteristic measuring device 100, or notify the fact that the temperature of the object S to be measured is in the abnormal state to a terminal of a manager of the object S to be measured.

1-2-8. Others

The optical fiber characteristic measuring system 1000 described above can also be applied to processing of measuring strain distribution of the object S to be measured. In the processing at Steps S1 to S2 described above, the optical fiber characteristic measuring device 100 generates the temperature distribution in the longitudinal direction of the optical fiber FUT, converts a BFS in the BFS distribution into a strain for each measuring position, and generates the strain distribution in the longitudinal direction of the optical fiber FUT. Additionally, in the processing at Steps S3 to S6 described above, the optical fiber characteristic measuring device 100 generates the refractive index distribution in the longitudinal direction of the optical fiber FUT from the temperature distribution, calculates the distance change $\Delta L_s$ in the longitudinal direction of the optical fiber FUT due to thermal expansion, calculates the measuring position displacement amount $\Delta L_\beta$, corrects the measuring position, and generates the strain distribution after correction. Furthermore, in the processing at Step S7 described above, in a case in which a strain indicated by the strain distribution after correction is equal to or larger than a strain threshold $X_W$, the optical fiber characteristic measuring device 100 detects that the strain of the object S to be measured is in the abnormal state.

1-3. Processing Example of Optical Fiber Characteristic Measuring Device 100P By referring to FIG. 2 to FIG. 8 and using numerical expressions, the following describes a processing example of the optical fiber characteristic measuring device 100P in an optical fiber characteristic measuring system 1000P according to the reference technique. The following describes an outline of the processing of the optical fiber characteristic measuring device 100, and a scheme of calculating the measuring position in this order.

Figure 2:
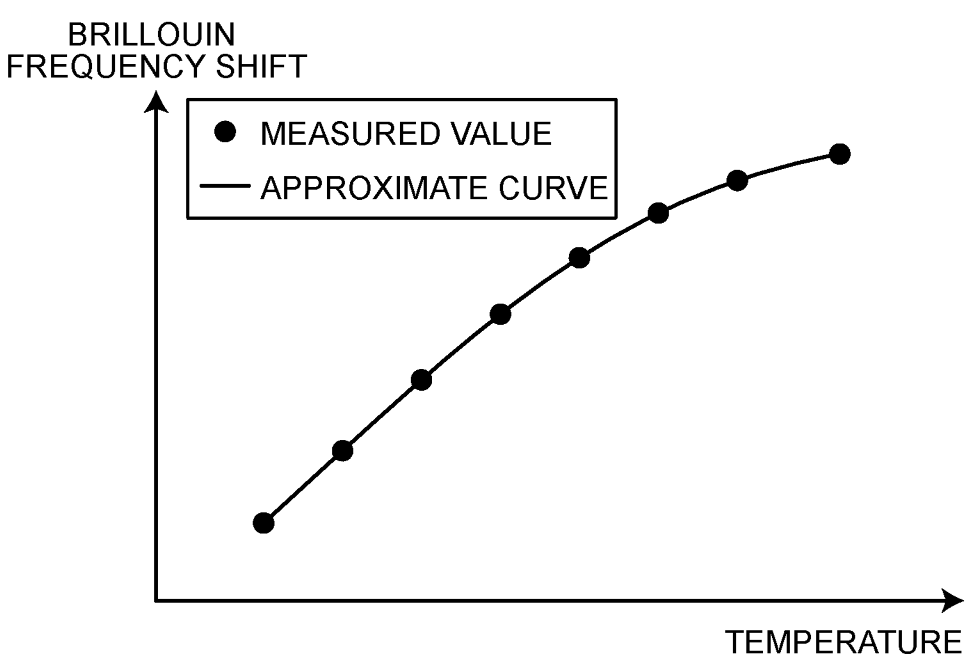
FIG. 2 is a diagram for explaining temperature dependency of Brillouin Frequency Shift according to a reference technique.
Figure 3:
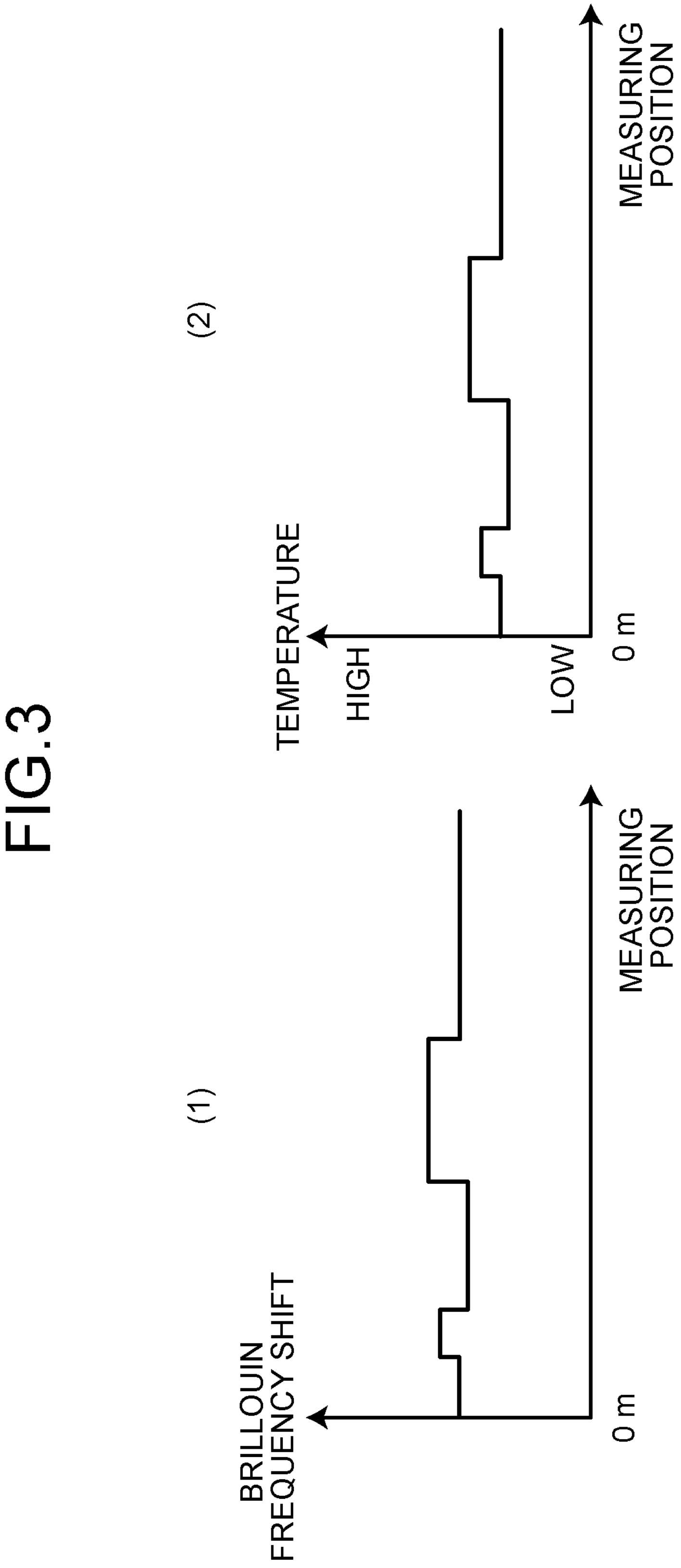
FIG. 3 is a diagram for explaining a measurement result according to the reference technique.

1-3-1. Outline of Processing of Optical Fiber Characteristic Measuring Device 100P By referring to FIG. 2 and FIG. 3 and using numerical expressions, the following describes the outline of the processing of the optical fiber characteristic measuring device 100P according to the reference technique. FIG. 2 is a diagram for explaining temperature dependency of Brillouin Frequency Shift according to the reference technique. FIG. 3 is a diagram for explaining a measurement result according to the reference technique.

1-3-1-1. A Processing Procedure of Optical Fiber Characteristic Measuring Device 100P The following describes a processing procedure of the optical fiber characteristic measuring device 100P that performs temperature distribution generation processing. First, the optical fiber characteristic measuring device 100P generates the BFS distribution in the longitudinal direction of the optical fiber FUT assuming that the refractive index of the optical fiber FUT as a sensor is the same at all measuring positions. Second, the optical fiber characteristic measuring device 100P converts a BFS into a temperature for each measuring position using the generated BFS distribution, and generates the temperature distribution in the longitudinal direction of the optical fiber FUT. Third, the optical fiber characteristic measuring device 100P displays the generated temperature distribution, and stores temperature distribution data. Fourth, the optical fiber characteristic measuring device 100P determines whether to continue the temperature distribution generation processing. At this point, in a case of not continuing the temperature distribution generation processing, the optical fiber characteristic measuring device 100P ends the temperature distribution generation processing. On the other hand, in a case of continuing the temperature distribution generation processing, the optical fiber characteristic measuring device 100P repeats the first processing to the fourth processing described above.

1-3-1-2. Outline of Calculation Processing of Optical Fiber Characteristic Measuring Device 100P The optical fiber characteristic measuring device 100P converts the BFS into the temperature using a BFS-temperature conversion expression calculated from a relation between the BFS and the temperature of the optical fiber FUT measured in advance as illustrated in FIG. 2. The following expression (1) represents the BFS-temperature conversion expression.

$$T = d \times BFS^2 + e \times BFS + f \tag{1}$$

$$\begin{pmatrix} BFS\text{: Measured Brillouin Frequency Shift} \\ d, e\text{: Coefficient} \quad f\text{: Constant} \end{pmatrix}$$

The optical fiber characteristic measuring device 100P also generates the temperature distribution as illustrated in FIG. 3. The example of FIG. 3 (1) is the BFS distribution indicating a relation between the measuring position and the BFS. The example of FIG. 3 (2) is the temperature distribution indicating a relation between the measuring position and the temperature converted from the BFS.

1-3-2. Scheme of Calculating Measuring Position of Optical Fiber Characteristic Measuring Device 100P By referring to FIG. 4 to FIG. 8 and using numerical expressions, the following describes a method for calculating the measuring position of the optical fiber characteristic measuring device 100P according to the reference technique. The following describes the time domain scheme and the correlation domain scheme in this order.

1-3-2-1. Time Domain Scheme

Figure 4:
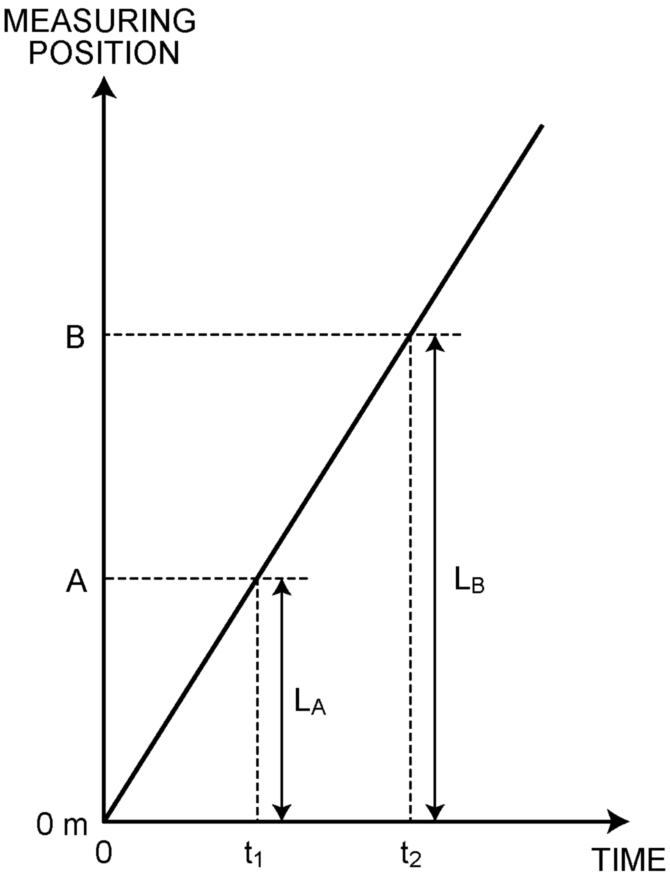
FIG. 4 is a diagram for explaining a specific example 1 of measuring position calculation processing in a time domain scheme according to the reference technique.
Figure 5:
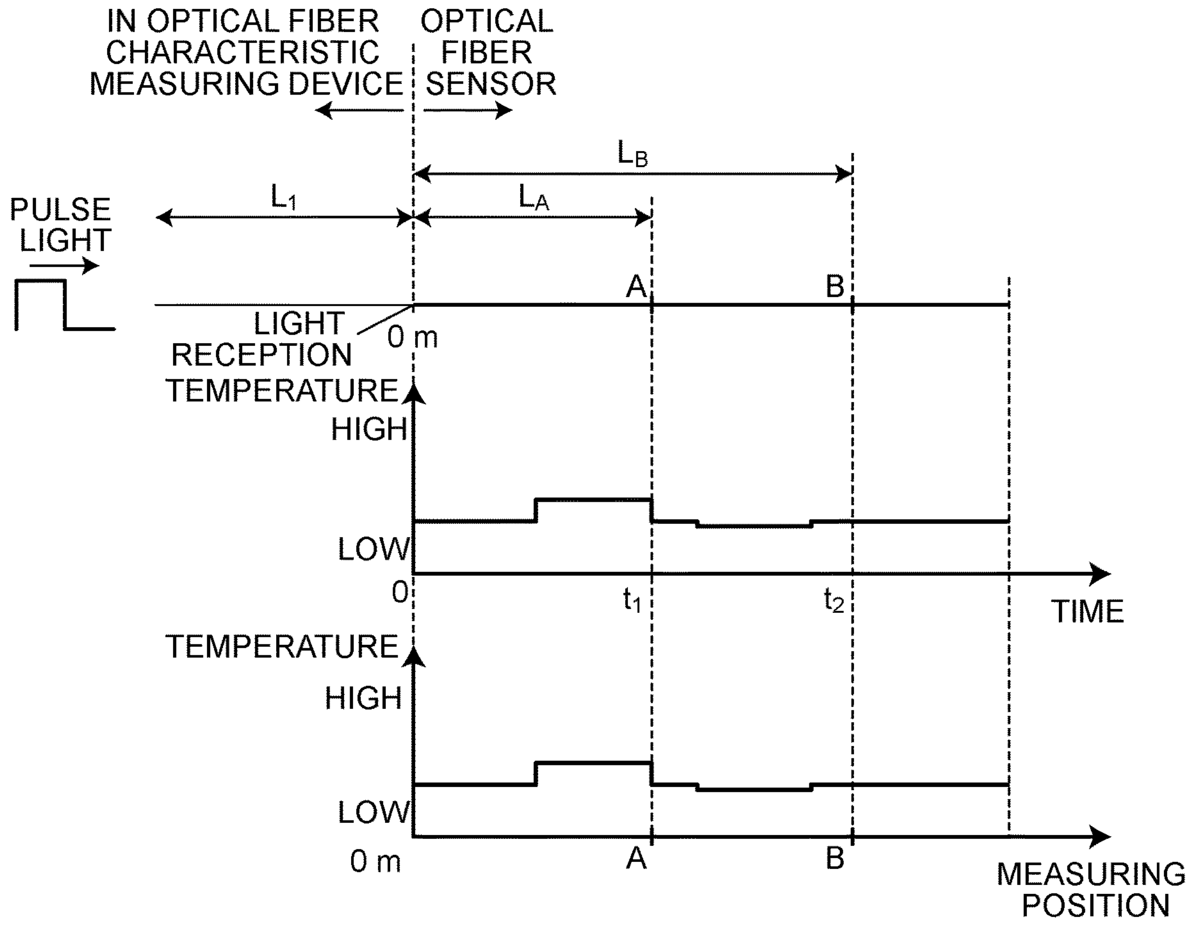
FIG. 5 is a diagram for explaining a specific example 2 of measuring position calculation processing in a time domain scheme (BOTDR) according to the reference technique.

By referring to FIG. 4 and FIG. 5 and using numerical expressions, the following describes the time domain scheme as the method for calculating the measuring position of the optical fiber characteristic measuring device 100P according to the reference technique. FIG. 4 and FIG. 5 are diagrams for explaining specific examples of measuring position calculation processing in the time domain scheme according to the reference technique.

The time domain scheme (BOTDR, BOTDA, and the like) is a scheme of calculating the measuring position from a reciprocation time until a transmitted light pulse returns to a light reception side, and measuring distribution of a temperature, a strain, a vibration, and the like.

The example of FIG. 4 indicates a relation between the measuring position (0 m-A position-B position- . . . ) and time ($0$-$t_1$-$t_2$- . . . ) in the time domain scheme. A distance in the longitudinal direction from 0 m to the A position of the optical fiber FUT as a sensor portion is $L_A$, and a distance in the longitudinal direction from 0 m to the B position of the optical fiber FUT as the sensor portion is $L_B$. The example of FIG. 5 indicates temperature distribution at each measuring position (0 m-A position-B position- . . . ) and time ($0$-$t_1$-$t_2$- . . . ) in the time domain scheme (BOTDR). A distance in the longitudinal direction from a light source to 0 m of the optical fiber FUT inside the optical fiber characteristic measuring device 100P is $L_1$, a distance in the longitudinal direction from 0 m to the A position of the optical fiber FUT as the sensor portion is $L_A$, and a distance in the longitudinal direction from 0 m to the B position of the optical fiber FUT as the sensor portion is $L_B$.

In the time domain scheme, in a case of ignoring a propagation time of a light pulse from the inside of the optical fiber characteristic measuring device 100P to the optical fiber FUT and a propagation time thereof until being received from the optical fiber FUT, a relation between the measuring position and the time can be represented by the following expression (2). Herein, in the following expression (2), c indicates a velocity of light, $n_{ref}$ indicates a refractive index of the optical fiber FUT, and t indicates a time during which the light pulse reciprocates in the optical fiber FUT.

$$\text{Measuring position} = c/n_{ref} \times t/2 \tag{2}$$

By using the expression (2) described above, the measuring position can be calculated from the time during which the light pulse reciprocates in the optical fiber FUT. A signal received after $t_1$ hours have elapsed after transmitting the light pulse is the BFS at the A position, and a signal received after $t_2$ hours have elapsed is the BFS measured at the B position. This is expressed by the following expression (3) and expression (4) as numerical expressions.

$$A\ \text{position} = c/n_{ref} \times t_1/2 \tag{3}$$

$$B\ \text{position} = c/n_{ref} \times t_2/2 \tag{4}$$

However, in the method for calculating the measuring position using the time domain scheme described above, the calculated measuring position of the optical fiber FUT is different from the measuring position of the optical fiber FUT where measurement is actually performed if the refractive index of the optical fiber FUT is not correct. Furthermore, in the calculation method described above, in a case of using the optical fiber FUT in a high-temperature environment, it is required to consider a length (distance) change in the longitudinal direction of the optical fiber FUT due to thermal expansion.

1-3-2-2. Correlation Domain Scheme

Figure 6:
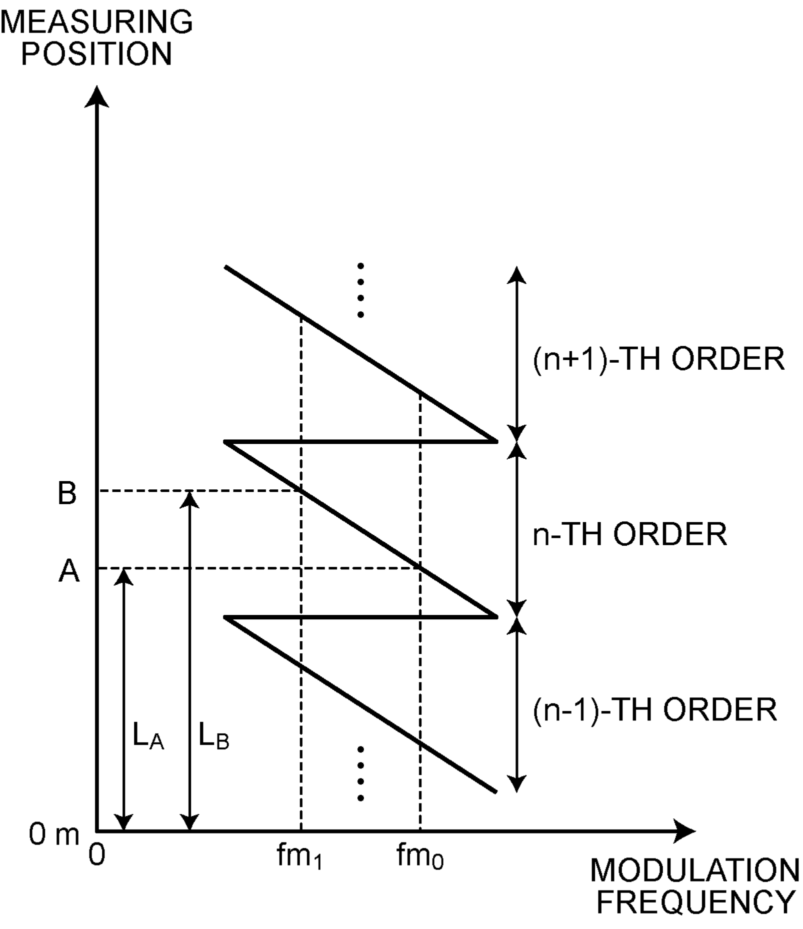
FIG. 6 is a diagram for explaining a specific example 1 of measuring position calculation processing in a correlation domain scheme according to the reference technique.
Figure 7:
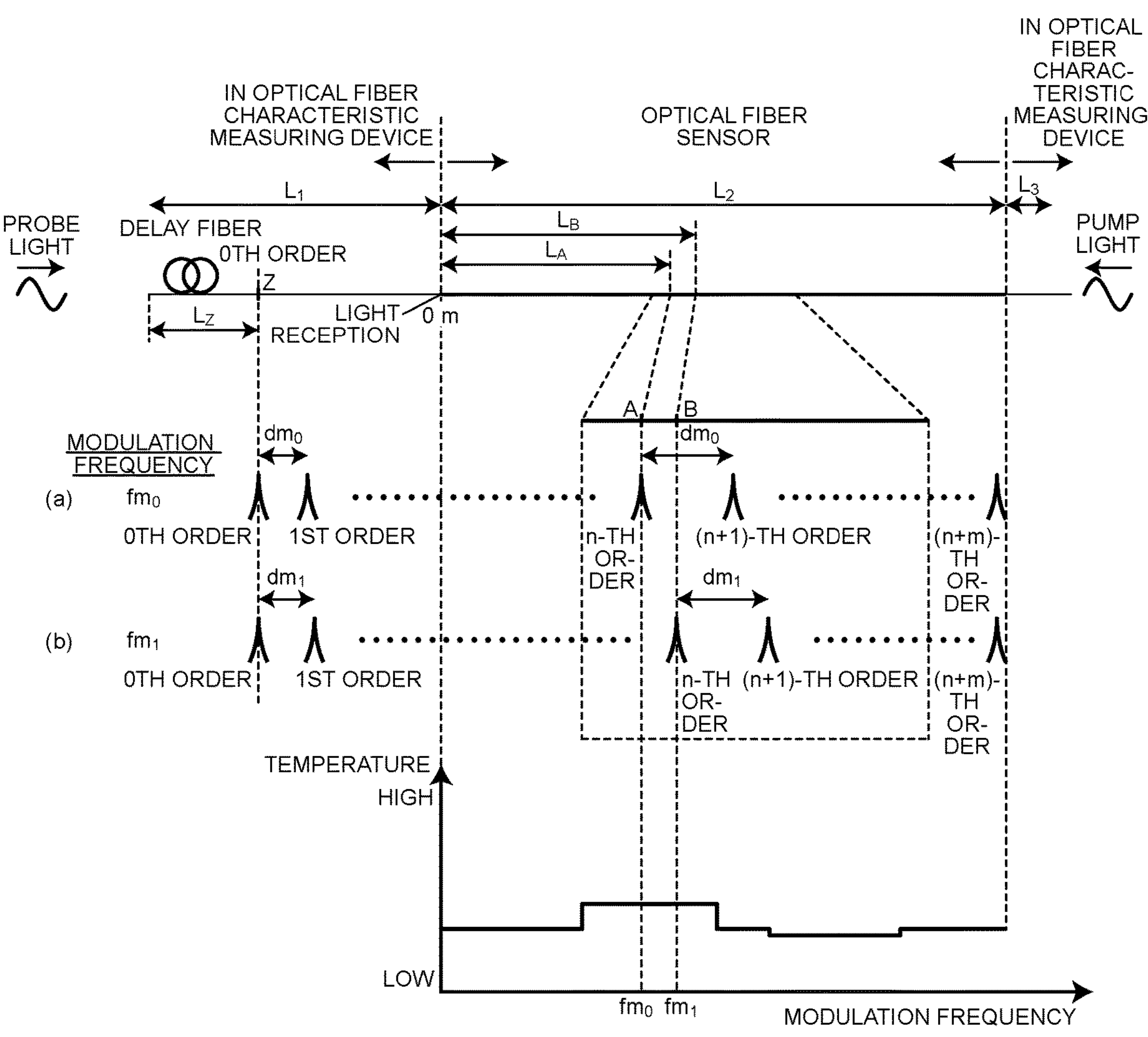
FIG. 7 is a diagram for explaining a specific example 2 of measuring position calculation processing in a correlation domain scheme (BOCDA) according to the reference technique.
Figure 8:
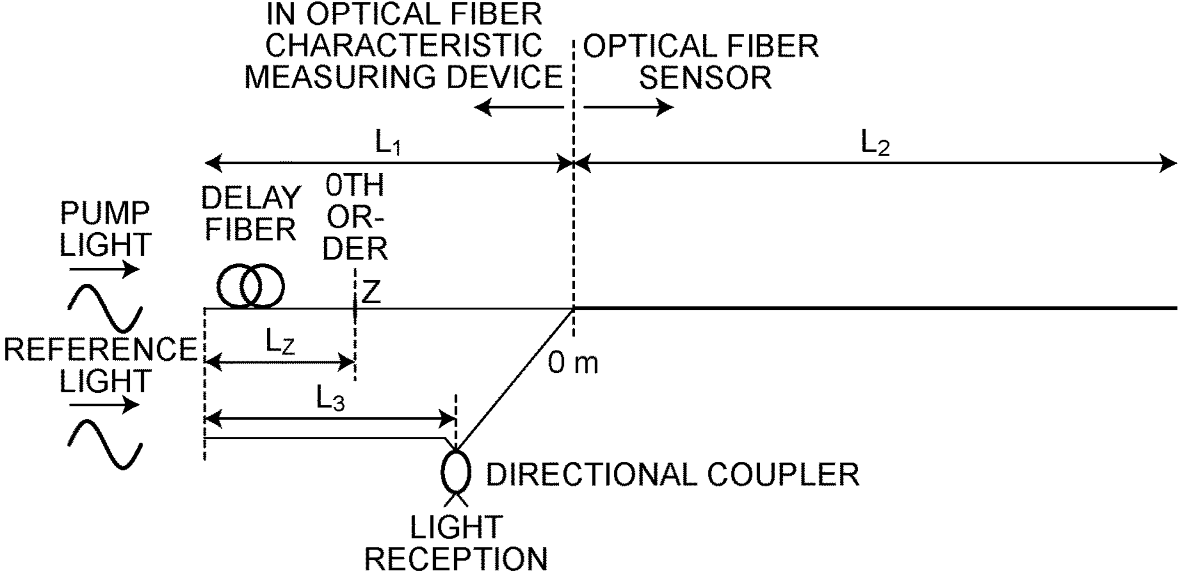
FIG. 8 is a diagram for explaining a 0th order correlation peak position in a correlation domain scheme (BOCDR) according to the reference technique.

By referring to FIG. 6 to FIG. 8 and using numerical expressions, the following describes the correlation domain scheme as the method for calculating the measuring position of the optical fiber characteristic measuring device 100P according to the reference technique. FIG. 6 and FIG. 7 are diagrams for explaining specific examples of the measuring position calculation processing in the correlation domain scheme according to the reference technique. FIG. 8 is a diagram for explaining a 0th order correlation peak position in the correlation domain scheme (BOCDR) according to the reference technique.

The correlation domain scheme (BOCDA, BOCDR, and the like) is a scheme of calculating a set correlation peak position as the measuring position, and measuring distribution of a temperature, a strain, a vibration, and the like. Herein, the correlation peak position is calculated from a modulation frequency modulating the light source, the refractive index of the optical fiber FUT, and the 0th order correlation peak position. The measuring position can be measured in a distributed manner by moving the correlation peak position.

The example of FIG. 6 indicates a relation between the measuring position (0 m-A position-B position- . . . ) and the modulation frequency ($0$-$fm_1$-$fm_0$- . . . ) in the correlation domain scheme. A distance in the longitudinal direction from 0 m to the A position of the optical fiber FUT as the sensor portion is $L_A$, and a distance in the longitudinal direction from 0 m to the B position of the optical fiber FUT as the sensor portion is $L_B$. Herein, the 0th order correlation peak position is assumed to be present between a probe light (pump light in a case of the correlation domain scheme (BOCDR)) emitting end and an incident end (0 m position) of the optical fiber FUT as the sensor portion for probe light (pump light). The example of FIG. 7 indicates temperature distribution at each measuring position (0 m-the A position-the B position- . . . ) and modulation frequency ($0$-$fm_1$-$fm_0$- . . . ) in the correlation domain scheme (BOCDA). A distance in the longitudinal direction from the light source to 0 m of the optical fiber inside the optical fiber characteristic measuring device 100P is $L_1$, a distance in the longitudinal direction from 0 m to the A position of the optical fiber FUT as the sensor portion is $L_A$, and a distance in the longitudinal direction from 0 m to the B position of the optical fiber FUT as the sensor portion is $L_B$.

In the correlation domain scheme (BOCDA), with a correlation peak in which an optical path difference between the pump light and the probe light is not zero (0th order correlation peak), correlation peak interval dm can be changed by adjusting a modulation frequency fm modulating the light source based on the following expression (5). By changing the correlation peak interval dm, the correlation peak position can be moved. In a case of the correlation domain scheme (BOCDA), the 0th order correlation peak is not present in the optical fiber FUT as the sensor portion under a condition indicated by the following expression (6) or expression (7). Herein, in the following expression (6) and expression (7), $L_1$ indicates a length of the optical fiber from the probe light emitting end to the incident end (0 m position) of the optical fiber FUT as the sensor portion for the probe light, $L_2$ indicates a length of the optical fiber FUT as the sensor portion, and $L_3$ indicates a length of the optical fiber from the pump light emitting end to the incident end of the optical fiber FUT as the sensor portion for the pump light.

$$dm = \frac{c/n_{ref}}{2 \times fm} \tag{5}$$

$$L_1 > L_2 + L_3 \tag{6}$$

$$L_1 + L_2 < L_3 \tag{7}$$

A length (distance) $L_Z$ from the probe light emitting end to the 0th order correlation peak position can be represented by the following expression (8). In a case in which the expression (6) described above is established, the 0th order correlation peak position is present between the probe light emitting end and the incident end (0 m position) of the optical fiber FUT as the sensor portion for the probe light. In a case in which the expression (7) described above is established, the 0th order correlation peak position is present between the pump light emitting end and the incident end of the optical fiber FUT as the sensor portion for the pump light. FIG. 7 assumes a case in which the expression (6) described above is established.

$$L_Z = \frac{L_1 + L_2 + L_3}{2} \tag{8}$$

In the expression (6) to the expression (8) described above, it is assumed that the refractive index of the optical fiber from the probe light emitting end to the incident end (0 m position) of the optical fiber FUT for the probe light, the refractive index of the optical fiber FUT as the sensor portion, and the refractive index of the optical fiber from the pump light emitting end to the incident end of the optical fiber FUT for the pump light are the same.

The following exemplifies a case in which the expression (6) described above is established. The measuring position can be represented by the following expression (9) using the correlation peak interval dm, an order n (n is a natural number) of the correlation peak, $L_1$, and $L_Z$.

$$\text{Measuring position} = dm \times n - (L_1 - L_Z) \tag{9}$$

Based on the expression (9), a relation between the measuring position and the fm frequency can be represented by the following expression (10) using a light velocity c and a refractive index $n_{ref}$ of the optical fiber FUT.

$$\text{Measuring position} = \frac{c/n_{ref}}{2 \times fm} \times n - (L_1 - L_Z) \tag{10}$$

By using the expression (10) described above, an optional measuring position can be selected based on the modulation frequency and the order of the correlation peak. By setting the modulation frequency $fm_0$ and the order n, the BFS at the A position can be measured. Similarly, by setting the modulation frequency $fm_1$ and the order n, the BFS at the B position can be measured. Furthermore, distribution can also be measured by setting the modulation frequency and the order of the correlation peak in accordance with the measuring position. This is expressed by the following expression (11) and expression (12) as numerical expressions.

$$A \text{ position} = \frac{c/n_{ref}}{2 \times fm_0} \times n - (L_1 - L_Z) \tag{11}$$

$$B \text{ position} = \frac{c/n_{ref}}{2 \times fm_1} \times n - (L_1 - L_Z) \tag{12}$$

However, in the calculation method using the correlation domain scheme described above, similarly to the time domain scheme, the calculated measuring position of the optical fiber FUT is different from the measuring position of the optical fiber FUT where measurement is actually performed if the refractive index of the optical fiber FUT is not correct. Additionally, it is required to similarly consider a length (distance) change in the longitudinal direction of the optical fiber FUT due to thermal expansion.

As the calculation method using the correlation domain scheme described above, the correlation domain scheme (BOCDA) of a double-end light incident scheme has been described above. The expression (9) to the expression (12) described above can also be applied to the correlation domain scheme (BOCDR) of a single-end light incident scheme except that a calculation expression for the 0th order correlation peak position is different.

In the example of FIG. 8, a distance in the longitudinal direction from the light source of the pump light of the optical fiber inside the optical fiber characteristic measuring device 100P to the Z position as the 0th order correlation peak position is $L_Z$, and a distance in the longitudinal direction from the light source of reference light of the optical fiber inside the optical fiber characteristic measuring device 100P to a light receiving position of a directional coupler is $L_3$.

In a case of the correlation domain scheme (BOCDR), the 0th order correlation peak is not present in the optical fiber FUT as the sensor portion under a condition indicated by the following expression (13) or the expression (7) described above. Herein, in the following expression (13) and the expression (7) described above, $L_1$ indicates a length of the optical fiber from the pump light emitting end to the incident end (0 m position) of the optical fiber FUT for the pump light, $L_2$ indicates a length of the optical fiber FUT as the sensor portion, and $L_3$ indicates a length of the optical fiber from a reference light emitting end to an incident end of the directional coupler.

$$L_1 > L_3 \tag{13}$$

In a case in which the expression (13) described above is established, the length $L_Z$ from the pump light emitting end to the 0th order correlation peak position can be represented by the following expression (14), and the 0th order correlation peak position is present between the pump light emitting end and the incident end (0 m position) of the optical fiber FUT as the sensor portion for the pump light. FIG. 8 assumes a case in which the expression (13) described above is established.

$$L_Z = L_3 \tag{14}$$

In the expression (13), the expression (7), and the expression (14) described above, it is assumed that the refractive index of the optical fiber from the pump light emitting end to the incident end (0 m position) of the optical fiber FUT for the pump light, the refractive index of the optical fiber FUT as the sensor portion, and the refractive index of the optical fiber from the reference light emitting end to an incident end of the directional coupler are the same.

1-4. Problems in Reference Technique

By referring to FIG. 9 to FIG. 16 and using numerical expressions, the following describes the problems in the reference technique. The following describes problems common to the time domain scheme and the correlation domain scheme, and describes problems in the time domain scheme and problems in the correlation domain scheme in this order.

(1-4-1. Common Problems)

Figure 9:
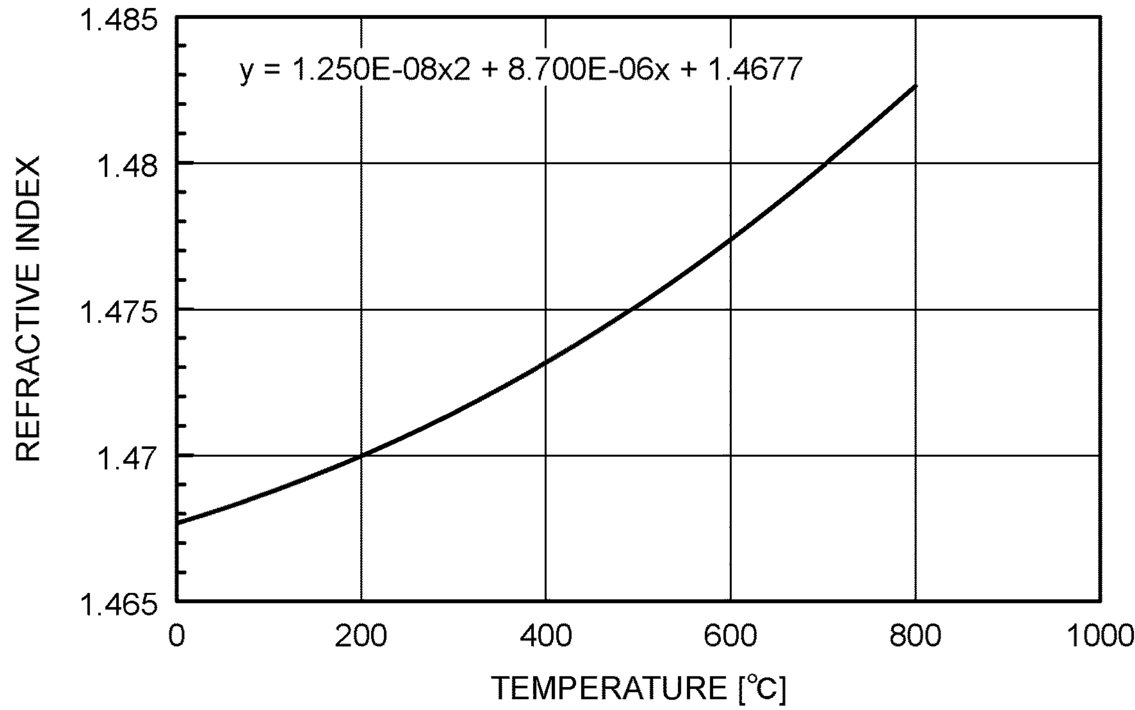
FIG. 9 is a diagram for explaining a relation between a temperature and a refractive index according to the reference technique.
Figures 10, 11:
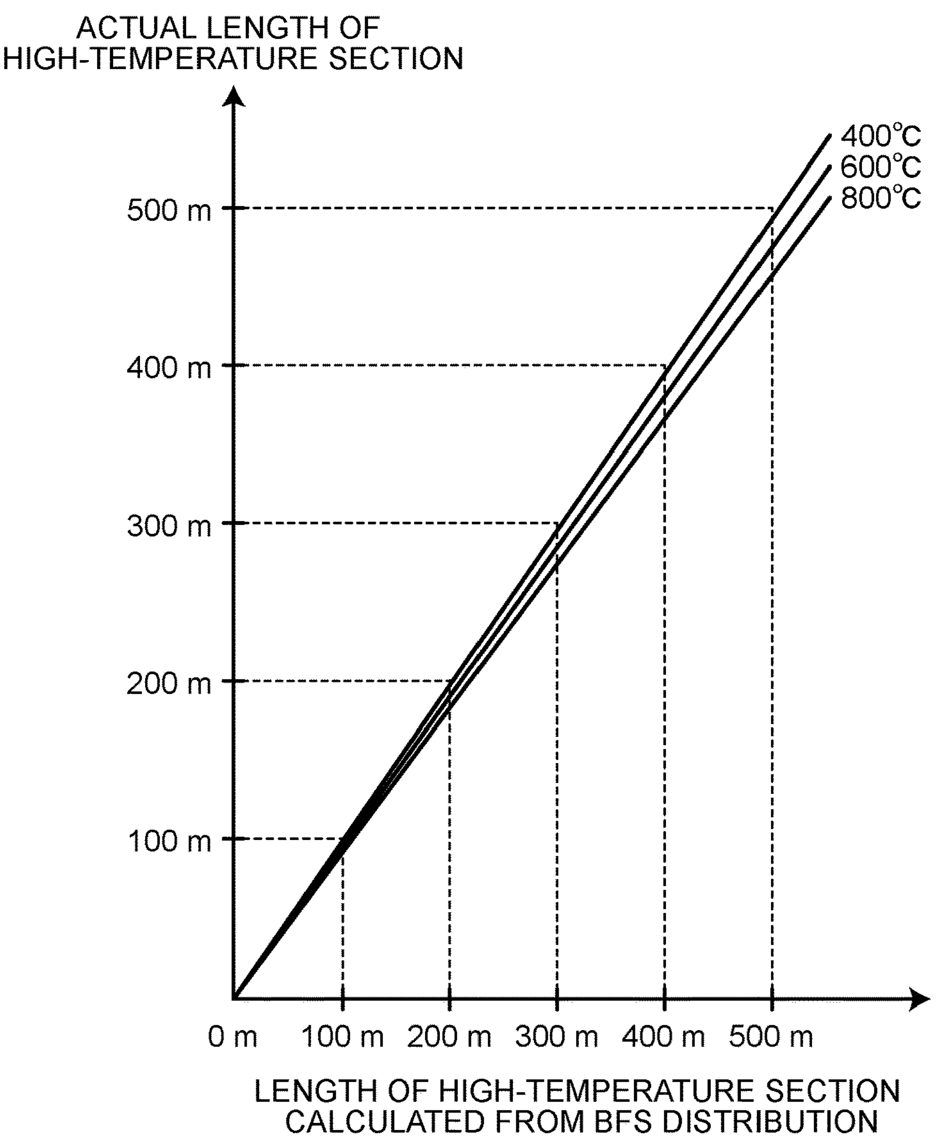
FIG. 10 is a diagram for explaining a relation between a measured length of a high-temperature section and an actual length of the high-temperature section according to the reference technique.
FIG. 11 is a diagram for explaining a concept of + and − of a measuring position displacement according to the reference technique.

With reference to FIG. 9 to FIG. 11, the following describes the problems common to the time domain scheme and the correlation domain scheme. FIG. 9 is a diagram for explaining a relation between the temperature and the refractive index according to the reference technique. FIG. 10 is a diagram for explaining a relation between the measured length of the high-temperature section and the actual length of the high-temperature section according to the reference technique. FIG. 11 is a diagram for explaining a concept of + and − of the measuring position displacement according to the reference technique.

According to the reference technique described above, in both of the time domain scheme and the correlation domain scheme, in a case of not considering a refractive index change of the optical fiber FUT (refer to FIG. 9) following a temperature change of the optical fiber FUT and a length (distance) change in the longitudinal direction due to thermal expansion of the optical fiber FUT, a BFS at a position different from the calculated measuring position (position desired to be measured) is measured, and displacement of the measuring position is caused. As a result, in the reference technique, a length of a section to be measured (for example, the high-temperature section) becomes longer than the actual length of the high-temperature section (refer to FIG. 10). Particularly, in a case in which the optical fiber FUT is used in a high-temperature environment and the length of the optical fiber FUT subjected to the high-temperature environment is long, displacement of the measuring position cannot be ignored in a case in which high spatial resolution (cm order) measurement is required, for example. In the reference technique, use in the high-temperature environment is not assumed, so that a refractive index change of the optical fiber FUT and a length change in the longitudinal direction are not considered at the time of BFS distribution generation processing.

Herein, as illustrated in FIG. 11, a measuring position displacement on the + side means a case in which the measuring position where measurement is actually performed is displaced from the calculated measuring position toward the opposite side of a 0 m position direction. On the other hand, the measuring position displacement on the − side means a case in which the measuring position where measurement is actually performed is displaced from the calculated measuring position toward the 0 m position direction side.

1-4-2. Problems in Time Domain Scheme

Figure 12:
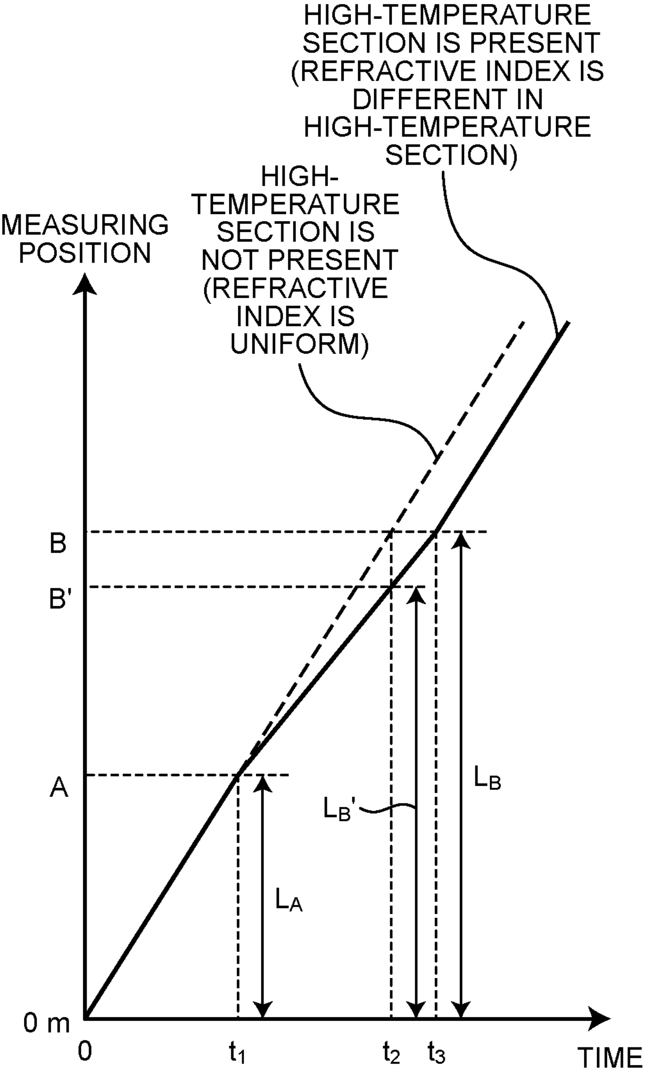
FIG. 12 is a diagram for explaining a specific example 1 of temperature measurement processing with a high-temperature section in the time domain scheme according to the reference technique.
Figure 13:
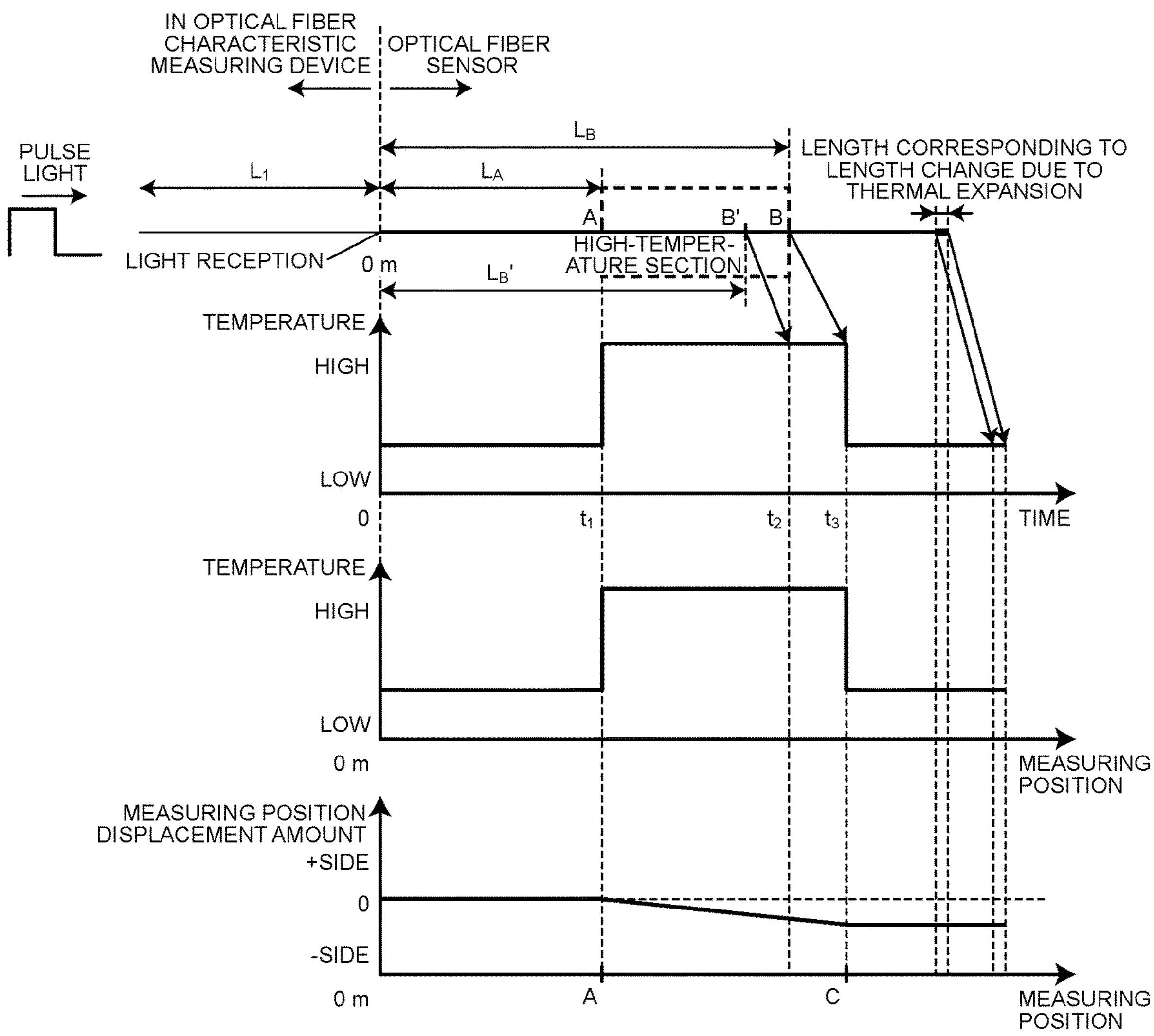
FIG. 13 is a diagram for explaining a specific example 2 of temperature measurement processing with a high-temperature section in the time domain scheme (BOTDR) according to the reference technique.

By referring to FIG. 12 and FIG. 13 and using numerical expressions, the following describes the problems in the time domain scheme according to the reference technique. FIG. 12 and FIG. 13 are diagrams for explaining specific examples of temperature measurement with the high-temperature section in the time domain scheme according to the reference technique. As illustrated in FIG. 12 and FIG. 13, in a case in which the high-temperature section is present, the temperature distribution is different from actual temperature distribution due to a measuring position displacement in temperature measurement using the time domain scheme. The examples of FIG. 12 and FIG. 13 are diagrams for explaining an outline of the time domain scheme (BOTDR) of the single-end light incident scheme, but the same applies to the time domain scheme (BOTDA) of the double-end light incident scheme.

Herein, it is assumed that the high-temperature section is a section from the A position to the B position in the optical fiber FUT as the sensor portion. In the high-temperature section, the refractive index of the optical fiber FUT is larger as compared with that at the ordinary temperature (for example, 25° C.) (herein, assumed to be $n_{refh}$). Thus, a velocity of light propagating in the optical fiber FUT slows down in the high-temperature section. As a result, a signal received at a time $t_2$ indicated by the following expression (15) is not a BFS at the B position but a BFS at a B' position. To measure the B position, a signal received at a time $t_3$ indicated by the following expression (16) is used. However, the optical fiber characteristic measuring device 100P according to the reference technique cannot recognize the displacement described above, and determines that the signal received at the time $t_2$ is the BFS at the B position.

$$B' \text{ position} = c/n_{ref} \times t_1/2 + c/n_{refh} \times (t_2 - t_1)/2 \tag{15}$$

$$B \text{ position} = c/n_{ref} \times t_1/2 + c/n_{refh} \times (t_3 - t_1)/2 \tag{16}$$

As described above, in a case of not considering a refractive index change of the optical fiber FUT following a temperature change of the optical fiber FUT, the BFS at the position different from the calculated measuring position (position desired to be measured) is measured, and the length of the high-temperature section becomes longer than the actual high-temperature section (from the A position to a C position in FIG. 13) as a measurement result of the high-temperature section. Furthermore, even in sections subsequent to the high-temperature section, a BFS at a position different from the calculated measuring position (position desired to be measured) is similarly measured. In the example of FIG. 13, the measuring position displacement amount is 0 m (no displacement) up to the A position. The measuring position displacement amount is increased toward the − side from the A position in the high-temperature section, reaches the maximum measuring position displacement amount on the − side at the C position, and the maximum measuring position displacement amount on the − side is maintained at subsequent measuring positions. This measuring position displacement amount for each measuring position is a displacement between the calculated measuring position and the actual measuring position. Furthermore, in a case of not considering a length (distance) change in the longitudinal direction due to thermal expansion of the optical fiber FUT, a problem may be caused such that a positional relation between the optical fiber FUT subsequent to the high-temperature section and the object S to be measured is displaced depending on a method for laying the optical fiber FUT, for example.

In a case of the time domain scheme described above, a distance range needs to be set as a measurement condition in performing the BFS distribution generation processing. The distance range does not mean "distance range=length of the optical fiber FUT", but is set to determine a length range to be measured. The distance range needs to be set as a range longer than the length of the optical fiber FUT, so that BFS distribution naturally includes a length change in the longitudinal direction due to thermal expansion of the optical fiber FUT. It is not necessary to correctly grasp the length of the optical fiber FUT, and it is sufficient that an approximate value is grasped.

1-4-3. Problems in Correlation Domain Scheme

Figure 14:
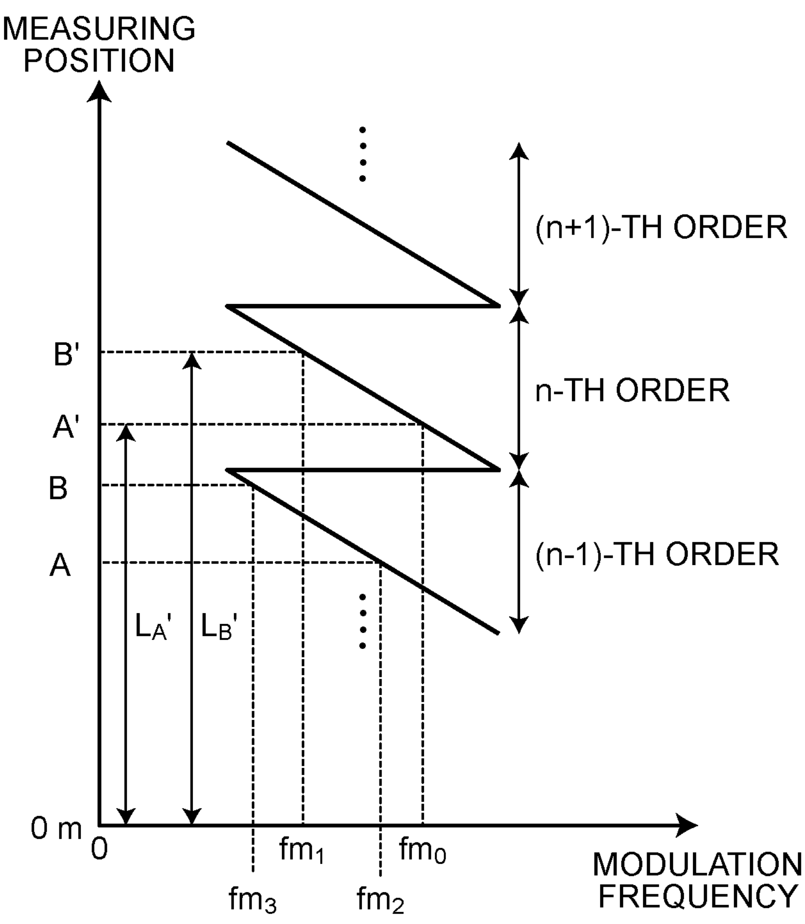
FIG. 14 is a diagram for explaining a specific example 1 of temperature measurement processing with a high-temperature section in the correlation domain scheme according to the reference technique.

By referring to FIG. 14 to FIG. 16 and using numerical expressions, the following describes problems in the correlation domain scheme according to the reference technique. FIG. 14 and FIG. 15 are diagrams for explaining specific examples of temperature measurement with the high-temperature section in the correlation domain scheme according to the reference technique. FIG. 16 is a diagram for explaining adjustment of a measuring position displacement according to the reference technique. As described below with reference to FIG. 14 and FIG. 15, in a case in which the high-temperature section is present, the temperature distribution is different from the actual temperature distribution due to a measuring position displacement in the temperature measurement using the correlation domain scheme. The examples of FIG. 14 and FIG. 15 are diagrams for explaining an outline of the correlation domain scheme (BOCDA) of the double-end light incident scheme, but the same applies to the correlation domain scheme (BOCDR) of the single-end light incident scheme.

Herein, it is assumed that the high-temperature section is a section from the C position to a D position in the optical fiber FUT. In the high-temperature section, the refractive index of the optical fiber FUT is larger as compared with that at the ordinary temperature (for example, 25° C.) (herein, assumed to be $n_{refh}$). Thus, a velocity of light propagating in the optical fiber FUT slows down in the high-temperature section. Furthermore, the length in the longitudinal direction of the optical fiber FUT is changed due to thermal expansion. As a result, as represented by the following expression (18), the 0th order correlation peak position (herein, assumed to be $L_Z'$) and the correlation peak interval dm in the high-temperature section are changed, and an n-th order correlation peak position at the modulation frequency $fm_0$ does not become the A position but becomes A' position. Similarly, as represented by the following expression (19), the n-th order correlation peak position at the modulation frequency $fm_1$ does not become the B position but becomes B' position. As represented by the following expression (20) and expression (21), to set the correlation peak position at the A position and the B position, modulation frequencies need to be set to be $fm_2$ and $fm_3$, respectively. However, the optical fiber characteristic measuring device 100P cannot recognize the displacement described above, and determines that the n-th order correlation peak position at the modulation frequency $fm_0$ is the A position, and the n-th order correlation peak position at the modulation frequency $fm_1$ is the B position. In a case of the correlation domain scheme (BOCDA), unlike the time domain scheme and the correlation domain scheme (BOCDR), a measuring position displacement is not caused after the high-temperature section but the relation between the modulation frequency and the measuring position is different from an expected relation at all measuring positions, and a BFS is measured at a position different from the calculated measuring position (position desired to be measured). Herein, assuming that the correlation peak interval is dm and the refractive index is $n_{ref1}$ in an ordinary temperature section, the correlation peak interval is dm' and the refractive index is $n_{ref1h}$ in a section over the ordinary temperature section and the high-temperature section (actually, refractive indexes in the ordinary temperature section and the high-temperature section are mixed), and the correlation peak interval in the high-temperature section is dm", the measuring position in the high-temperature section can be represented by the following expression (17). Herein, p represents an order of the correlation peak, and p order<n order is satisfied.

$$\text{Measuring position} = dm \times (p-1) + dm' \times p + dm'' \times (n-p) - (L_1 - L_Z') \tag{17}$$

$$A' \text{ position} = \frac{c/n_{ref1}}{2 \times fm_0} \times (p-1) + \frac{c/n_{ref1h}}{2 \times fm_0} \times p + \frac{c/n_{refh}}{2 \times fm_0} \times (n-p) - (L_1 - L_Z') \tag{18}$$

-continued $$B' \text{ position} = \frac{c/n_{ref1}}{2 \times fm_1} \times (p-1) + \frac{c/n_{ref1h}}{2 \times fm_1} \times p + \frac{c/n_{refh}}{2 \times fm_1} \times (n-p) - (L_1 - L_Z') \tag{19}$$

$$A \text{ position} = \frac{c/n_{ref1}}{2 \times fm_2} \times (p-1) + \frac{c/n_{ref1h}}{2 \times fm_2} \times p + \frac{c/n_{refh}}{2 \times fm_2} \times (n-p) - (L_1 - L_Z') \tag{20}$$

$$B \text{ position} = \frac{c/n_{ref1}}{2 \times fm_3} \times (p-1) + \frac{c/n_{ref1h}}{2 \times fm_3} \times p + \frac{c/n_{refh}}{2 \times fm_3} \times (n-p) - (L_1 - L_Z') \tag{21}$$

As described above, in a case of not considering a refractive index change and a length change of the optical fiber FUT following a temperature change of the optical fiber FUT, a BFS at the position different from the calculated measuring position is measured, and the length of the high-temperature section becomes longer than the actual high-temperature section (from an E position to an F position in FIG. 15) as a measurement result of the high-temperature section. Furthermore, at all of the measuring positions, a BFS at a position different from the calculated measuring position (position desired to be measured) is similarly measured. In the example of FIG. 15, the measuring position displacement amount remains constant at the maximum measuring position displacement amount on the + side up to the E position. The measuring position displacement amount is increased from the + side toward the − side from the E position, reaches the maximum measuring position displacement amount on the − side at the F position, and the maximum measuring position displacement amount on the − side is maintained at subsequent measuring positions. This measuring position displacement amount for each measuring position is a displacement between the calculated measuring position and the actual measuring position. Furthermore, in a case of not considering the length change in the longitudinal direction due to thermal expansion of the optical fiber FUT, a problem may be caused such that a positional relation between the optical fiber FUT subsequent to the high-temperature section and the object S to be measured is displaced depending on a method for laying the optical fiber FUT, for example.

In a case of the correlation domain scheme (BOCDA) described above, the length of the optical fiber FUT needs to be correctly grasped in performing the BFS distribution generation processing unlike the time domain scheme and the correlation domain scheme (BOCDR). This is because the 0th order correlation peak position is displaced as described above. The length of the optical fiber FUT is correctly grasped, so that a length to be measured is typically set to be the length of the optical fiber FUT as the sensor portion.

On the other hand, the 0th order correlation peak position in a case of the correlation domain scheme (BOCDR) is independent of the length of the optical fiber FUT, so that the 0th order correlation peak position is not changed even if the optical fiber FUT is used in the high-temperature environment. However, the correlation peak interval dm in the high-temperature section is changed. Herein, the measuring position in the high-temperature section is represented by the following expression (22). Alternatively, the expression 18 to the expression 21 can be applied if $L_z'$ is replaced with $L_z$. The 0th order correlation peak position is independent of the length of the optical fiber FUT, so that it is not necessary to correctly grasp the length of the optical fiber FUT similarly to the time domain scheme, and it is sufficient that an approximate value is grasped.

$$\text{Measuring position} = dm\times(p-1)+dm'\times p+dm''\times(n-p)-(L_1-L_Z) \quad (22)$$

Unlike the correlation domain scheme (BOCDA), the measuring position displacement amount is 0 m (no displacement) up to the C position (refer to FIG. 15). The measuring position displacement amount is increased toward the − side from the C position in the high-temperature section, reaches the maximum measuring position displacement amount on the − side at the F position, and the maximum measuring position displacement amount on the − side is maintained at subsequent measuring positions.

1-4-4. Others

With reference to FIG. 16, the following describes other problems in the reference technique. The following describes problems in the reference technique that provides an optical fiber characteristic distribution sensor having a structure for reducing an error in measurement of a position in measuring characteristic distribution such as temperature distribution or strain distribution.

The reference technique described above is a technique of reducing a measuring position displacement using the correlation domain scheme (BOCDA) as an example. However, this is a technique of reducing a measuring position displacement caused by the optical fiber characteristic measuring device itself, and a measuring position displacement caused by a refractive index change of the optical fiber FUT itself as a sensor or a length change due to thermal expansion is not considered. In the reference technique described above, a phase between two light sources (between the probe light and the pump light) is adjusted based on a predetermined calculation result, and processing of causing a known BFS distribution position of the optical fiber mounted in the device to match a previously acquired position is performed. In the processing described above, the measuring position is merely shifted toward the + side or the − side in the longitudinal direction of the optical fiber FUT.

As illustrated in FIG. 16, in the reference technique described above, in a case in which the high-temperature section is present in the optical fiber FUT, even if the phase is adjusted and the BFS distribution position is caused to match the previously acquired position, a BFS at a position different from the calculated measuring position is measured, and the length of the high-temperature section becomes longer than the actual high-temperature section as a measurement result of the high-temperature section. Furthermore, in the reference technique described above, at all of the measuring positions, a BFS at a position different from the calculated measuring position is similarly measured. As described above, the reference technique described above does not result in reduction of the measuring position displacement.

1-5. Effects of Optical Fiber Characteristic Measuring System 1000

The following describes an outline of the optical fiber characteristic measuring system 1000, and describes effects of the optical fiber characteristic measuring system 1000 thereafter.

1-5-1. Outline of Optical Fiber Characteristic Measuring System 1000

As described above, the optical fiber characteristic measuring system 1000 performs the following processing. First, the optical fiber characteristic measuring device 100 acquires a power spectrum of Brillouin scattering light corresponding to the measuring position of the optical fiber FUT using the time domain scheme or the correlation domain scheme, calculates the BFS, and generates BFS distribution in the longitudinal direction of the optical fiber FUT. Second, the optical fiber characteristic measuring device 100 converts the BFS in the BFS distribution into the temperature for each measuring position, and generates the temperature distribution in the longitudinal direction of the optical fiber FUT. Third, the optical fiber characteristic measuring device 100 specifies the high-temperature section from the temperature distribution, converts the temperature T into the refractive index $n_{refh}$ for each specified high-temperature section, and generates the refractive index distribution in the longitudinal direction of the optical fiber FUT. Fourth, the optical fiber characteristic measuring device 100 specifies the high-temperature section from the temperature distribution, and calculates the distance change $\Delta L_s$ in the longitudinal direction of the optical fiber FUT due to thermal expansion for each specified high-temperature section. Fifth, the optical fiber characteristic measuring device 100 calculates the measuring position displacement amount $\Delta L_\beta$ between the measuring position and the actual measuring position from the refractive index distribution for each high-temperature section. Sixth, the optical fiber characteristic measuring device 100 corrects the measuring position based on the measuring position displacement amount $\Delta L_\beta$ and the distance change $\Delta L_s$, and generates the temperature distribution after correction. Seventh, in a case in which the temperature indicated by the temperature distribution after correction is equal to or higher than the temperature threshold $X_T$, the optical fiber characteristic measuring device 100 detects that the temperature of the object S to be measured is in the abnormal state.

Furthermore, the optical fiber characteristic measuring system 1000 described above can also be applied to processing of generating strain distribution of the object S to be measured.

1-5-2. Effects of Optical Fiber Characteristic Measuring System 1000

In a case of using the optical fiber FUT for the temperature distribution generation processing in the high-temperature environment, the optical fiber characteristic measuring system 1000 can reduce the measuring position displacement caused between the previously calculated measuring position and the measuring position where measurement is actually performed due to a refractive index change of the optical fiber FUT and a length change in the longitudinal direction of the optical fiber FUT caused by thermal expansion. That is, the optical fiber characteristic measuring system 1000 can suppress lowering of accuracy of the measuring position for the characteristics such as a temperature or a strain of the measuring object.

2. Configuration and Processing of Optical Fiber Characteristic Measuring Device 100

By referring to FIG. 17 to FIG. 36 and numerical expressions, the following describes a configuration and processing of the optical fiber characteristic measuring device 100 included in the optical fiber characteristic measuring system 1000 illustrated in FIG. 1. The following describes a configuration example of the entire optical fiber characteristic measuring system 1000, and further describes a configuration example of the optical fiber characteristic measuring device 100, a processing example of the optical fiber characteristic measuring device 100, and specific examples of pieces of processing of the optical fiber characteristic measuring device 100.

2-1. Configuration Example of Entire Optical Fiber Characteristic Measuring System 1000

With reference to FIG. 17 and FIG. 18, the following describes the configuration example of the entire optical fiber characteristic measuring system 1000. FIG. 17 and FIG. 18 are block diagrams illustrating configuration examples of the optical fiber characteristic measuring device 100 according to the embodiment. As illustrated in FIG. 17 and FIG. 18, the optical fiber characteristic measuring system 1000 includes an optical fiber characteristic measuring device 100 (100A, 100B) as a measuring device, and the optical fiber FUT as a sensor. Herein, the optical fiber characteristic measuring device 100A illustrated in FIG. 17 is the optical fiber characteristic measuring device 100 using the single-end light incident scheme (BOTDR, BOCDR, and the like) in which light is incident from only one end of the optical fiber FUT. The optical fiber characteristic measuring device 100B illustrated in FIG. 18 is the optical fiber characteristic measuring device 100 using the double-end light incident scheme (BOTDA, BOCDA, and the like) in which light is incident from both ends of the optical fiber FUT.

The optical fiber FUT is a sensor unit, and implemented by a fiber to be measured for measuring a temperature, a strain, and the like. The optical fiber FUT is constituted of a single mode fiber, a multimode fiber, or the like, and a coating type for protecting the optical fiber FUT from damage is different depending on an environment in which it is used.

2-2. Configuration Example of Optical Fiber Characteristic Measuring Device 100

Figure 19:
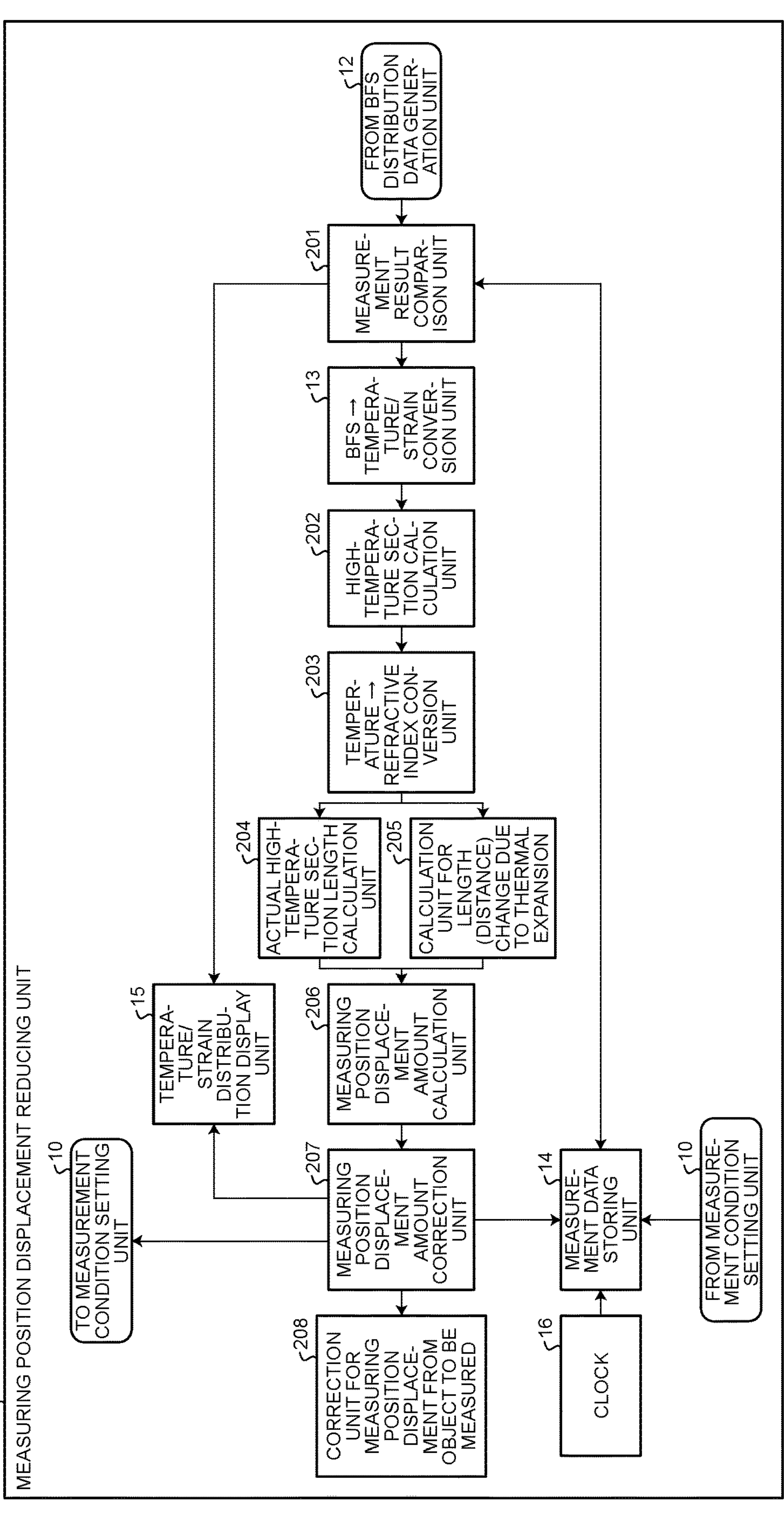
FIG. 19 is a block diagram illustrating a configuration example of a measuring position displacement reducing unit according to the embodiment.

With reference to FIG. 17 to FIG. 19, the following describes configuration examples of the optical fiber characteristic measuring device 100. The following describes a configuration example of the optical fiber characteristic measuring device 100A using the single-end light incident scheme, a configuration example of the optical fiber characteristic measuring device 100B using the double-end light incident scheme, and a configuration example of a measuring position displacement reducing unit of the optical fiber characteristic measuring device 100.

2-2-1. Configuration Example of Optical Fiber Characteristic Measuring Device 100A With reference to FIG. 17, the following describes the configuration example of the optical fiber characteristic measuring device 100A using the single-end light incident scheme. The optical fiber characteristic measuring device 100A includes a measurement control unit 110A. The optical fiber characteristic measuring device 100A may also include an input unit (for example, a keyboard, a mouse, and the like) configured to receive various operations from a manager and the like of the optical fiber characteristic measuring device 100A, a display unit (for example, a liquid crystal display and the like) for displaying various kinds of information, a communication unit configured to control data communication with other devices, and a storage unit that stores various kinds of information referred to by the measurement control unit 110A at the time of operation or various kinds of information acquired by the measurement control unit 110A at the time of operation.

The measurement control unit 110A includes a light source unit 1, a pump light generation unit 2, a reference light generation unit 3, an optical circulator 4, a multiplexing unit 5, an optical detection unit (light receiving unit) 6, a control/computation unit 7, an amplification unit 8, a spectrum analysis/BFS calculation unit 9, a measurement condition setting unit 10, a measuring position list 11, a BFS distribution data generation unit 12, and a measuring position displacement reducing unit 200.

2-2-1-1. Light Source Unit 1

The light source unit 1 is, for example, constituted of a semiconductor laser, a temperature control circuit, a drive circuit, a frequency modulation circuit, a signal generator, a directional coupler (optical coupler), and the like. The light source unit 1 emits continuous light from the semiconductor laser in the time domain scheme. The light source unit 1 also emits continuous light subjected to frequency modulation from the semiconductor laser in the correlation domain scheme.

2-2-1-2. Pump Light Generation Unit 2

The pump light generation unit 2 is, for example, constituted of a light pulse generation circuit, a polarization controller, an optical switch, an optical isolator, an optical amplifier, a delay fiber, a phase adjuster, an optical frequency shifter, an optical attenuator, a signal generator, and the like, and generates pump light. The pump light generation unit 2 converts the continuous light emitted from the light source unit 1 into a light pulse. In the correlation domain scheme, the continuous light is used in some cases. As the optical frequency shifter, a Single Side Band Modulation (SSB) modulator or the like may be used. The delay fiber and the phase adjuster are used for adjusting an optical path length of the pump light, and a space optical system may be used instead of the optical fiber.

2-2-1-3. Reference Light Generation Unit 3

The reference light generation unit 3 is, for example, constituted of a polarization controller, an optical isolator, an optical amplifier, a delay fiber, a phase adjuster, and the like, and generates reference light. Herein, the reference light is reference light in a case of performing optical heterodyne detection, optical homodyne detection, or the like. The delay fiber and the phase adjuster are used for adjusting an optical path length of the reference light, and a space optical system may be used instead of the optical fiber.

2-2-1-4. Optical Circulator 4

The optical circulator 4 causes light to be incident on the optical fiber FUT as a sensor unit. The optical circulator 4 also emits scattered light returned from the optical fiber FUT as the sensor unit to the optical detection unit 6. At this point, a directional coupler may be used as the optical circulator 4.

2-2-1-5. Multiplexing Unit 5

The multiplexing unit 5 is, for example, constituted of a directional coupler and the like of an isometric type.

2-2-1-6. Optical Detection Unit 6

The optical detection unit 6 is constituted of a photodiode such as an avalanche photodiode, a PIN-type photodiode, and a differential-type balanced photodiode incorporating two photodiodes having matching characteristics, an optical attenuator, a transimpedance amplifier circuit, and the like, and converts an optical signal into an electric signal.

2-2-1-7. Control/Computation Unit 7

The control/computation unit 7 computes setting parameters so that the optical fiber characteristic measuring device 100A can perform the BFS distribution generation processing in accordance with a measurement condition based on a command from the measurement condition setting unit 10, and outputs a signal for controlling or driving the light source unit 1, the pump light generation unit 2, the reference light generation unit 3, the optical detection unit 6, the amplification unit 8, and the like. The control/computation unit 7 controls processing for causing the optical fiber characteristic measuring device 100A to normally operate such as starting or stopping measurement. The control/computation unit 7 calculates a relation between the measuring position (position desired to be measured) and a time during which the light pulse reciprocates in the optical fiber FUT, a relation between the measuring position and the modulation frequency, and the like.

2-2-1-8. Amplification Unit 8

The amplification unit 8 is an electronic circuit constituted of an OP amplifier, a resistance element, a capacitor, and the like, and amplifies a weak electric signal. The amplification unit 8 may also include a lock-in amplifier, a noise filter, and the like.

2-2-1-9. Spectrum Analysis/BFS Calculation Unit 9

The spectrum analysis/BFS calculation unit 9 analyzes a power spectrum of Brillouin scattering light returned from each position of the optical fiber FUT as the sensor unit, and calculates a peak frequency (BFS). The spectrum analysis/BFS calculation unit 9 may use a spectrum analyzer, an oscilloscope, a voltmeter, and the like for spectrum analysis.

2-2-1-10. Measurement Condition Setting Unit 10

The measurement condition setting unit 10 sets conditions for measuring spatial resolution, a measurement distance range, a measuring position interval (distance sampling), a measurement velocity, an average number of times, and the like.

2-2-1-11. Measuring Position List 11

The measuring position list 11 stores a list of measuring positions set by the measurement condition setting unit 10.

2-2-1-12. BFS Distribution Data Generation Unit 12

The BFS distribution data generation unit 12 associates the BFS calculated by the spectrum analysis/BFS calculation unit 9 with the measuring position corresponding to the calculated BFS.

2-2-1-13. Measuring Position Displacement Reducing Unit 200

The measuring position displacement reducing unit 200 performs various kinds of processing for reducing the measuring position displacement. Details about the measuring position displacement reducing unit 200 will be described later in (2-2-3. Configuration example of measuring position displacement reducing unit 200).

2-2-2. Configuration Example of Optical Fiber Characteristic Measuring Device 100B With reference to FIG. 18, the following describes a configuration example of the optical fiber characteristic measuring device 100B using the double-end light incident scheme. The optical fiber characteristic measuring device 100B includes a measurement control unit 110B. Description will be omitted for the configuration common to the configuration example of the optical fiber characteristic measuring device 100A described above.

The measurement control unit 110B includes the light source unit 1, the pump light generation unit 2, the optical circulator 4, the multiplexing unit 5, the optical detection unit (light receiving unit) 6, the control/computation unit 7, the amplification unit 8, the spectrum analysis/BFS calculation unit 9, the measurement condition setting unit 10, the measuring position list 11, the BFS distribution data generation unit 12, a probe light generation unit 17, and the measuring position displacement reducing unit 200.

2-2-2-1. Probe Light Generation Unit 17

The probe light generation unit 17 is, for example, constituted of a polarization controller, an optical switch, an optical isolator, an optical amplifier, a delay fiber, a phase adjuster, an optical frequency shifter, an optical attenuator, a signal generator, and the like, and generates probe light. As the optical frequency shifter, an SSB modulator or the like may be used. The delay fiber and the phase adjuster are used for adjusting an optical path length of the pump light, and a space optical system may be used instead of the optical fiber.

2-2-3. Configuration Example of Measuring Position Displacement Reducing Unit 200

With reference to FIG. 19, the following describes a configuration example of the measuring position displacement reducing unit 200 constituting a measurement control unit 110 of the optical fiber characteristic measuring device 100. FIG. 19 is a block diagram illustrating the configuration example of the measuring position displacement reducing unit 200 according to the embodiment. The measuring position displacement reducing unit 200 includes a BFS-temperature/strain conversion unit 13, a measurement data storing unit 14, a temperature/strain distribution display unit 15, a clock 16, a measurement result comparison unit 201, a high-temperature section calculation unit 202, a temperature-refractive index conversion unit 203, an actual high-temperature section length calculation unit 204, a calculation unit 205 for a length (distance) change due to thermal expansion, a measuring position displacement amount calculation unit 206, a measuring position displacement amount correction unit 207, and a correction unit 208 for a measuring position displacement from an object to be measured. The configuration and the processing of the measuring position displacement reducing unit 200 are the same for the optical fiber characteristic measuring device 100A using the single-end light incident scheme and the optical fiber characteristic measuring device 100B using the double-end light incident scheme. The configuration and the processing of the measuring position displacement reducing unit 200 are the same in the time domain scheme and the correlation domain scheme.

2-2-3-1. BFS-Temperature/Strain Conversion Unit 13

The BFS-temperature/strain conversion unit 13 converts a BFS into a temperature using a relational expression of BFS-temperature dependency. The BFS→temperature/strain conversion unit 13 also converts a BFS into a strain using a relational expression of BFS-strain dependency. Herein, the BFS-temperature/strain conversion unit 13 can generate temperature distribution, strain distribution, and the like from the BFS distribution as a measurement result.

2-2-3-2. Measurement Data Storing Unit 14

The measurement data storing unit 14 stores Brillouin scattering light spectrum data for each measuring position, and data such as a BFS, a converted temperature, a converted strain, date and time of measurement, and measurement conditions. The measurement data storing unit 14 may be implemented by a storage device such as a hard disk drive (HDD), a solid state drive (SDD), or a Universal Serial Bus (USB) memory.

2-2-3-3. Temperature/Strain Distribution Display Unit 15

The temperature/strain distribution display unit 15 displays measurement results such as the generated temperature distribution, strain distribution, and the like on a measurement screen. The temperature/strain distribution display unit 15 may be implemented by a liquid crystal display, an organic electroluminescent (EL) display device, or the like.

2-2-3-4. Clock 16

The clock 16 records the date and time of measurement.

2-2-3-5. Measurement Result Comparison Unit 201

The measurement result comparison unit 201 compares the BFS distribution with previous (last) BFS distribution to determine whether they are the same for all measuring positions. If the measurement result comparison unit 201 determines that the BFS distribution is the same as the previous BFS distribution, subsequent pieces of processing performed by the measuring position displacement reducing unit 200 are skipped. The measurement result comparison unit 201 also outputs, to the measurement data storing unit 14, a command to copy and store the measurement data acquired at the time of previous BFS distribution generation processing. The measurement result comparison unit 201 also outputs, to the temperature/strain distribution display unit 15, a command to display measurement results such as previous temperature distribution and previous strain distribution on the measurement screen.

2-2-3-6. High-Temperature Section Calculation Unit 202

The high-temperature section calculation unit 202 calculates a measuring position of the high-temperature section, and a length and a temperature of the section for each high-temperature section based on the temperature distribution obtained by converting the generated BFS distribution into temperatures. The high-temperature section calculation unit 202 determines whether the section is the high-temperature section in accordance with a condition defined in advance.

2-2-3-7. Temperature-Refractive Index Conversion Unit 203

The temperature-refractive index conversion unit 203 converts the temperature of the high-temperature section into the refractive index for each high-temperature section using a relational expression between the refractive index and the temperature.

2-2-3-8. Actual High-Temperature Section Length Calculation Unit 204

The actual high-temperature section length calculation unit 204 calculates the actual length of the high-temperature section from the measured length of the high-temperature section for each high-temperature section using a relational expression.

2-2-3-9. Calculation Unit 205 for Length Change Due to Thermal Expansion

The calculation unit 205 for a length change due to thermal expansion calculates a length change due to thermal expansion for each high-temperature section using a relational expression based on the actual length and temperature of the high-temperature section.

2-2-3-10. Measuring Position Displacement Amount Calculation Unit 206

The measuring position displacement amount calculation unit 206 calculates the maximum measuring position displacement amount from the refractive index of the high-temperature section and the actual length of the high-temperature section for each high-temperature section using a relational expression. The measuring position displacement amount calculation unit 206 then calculates the measuring position displacement amount for each measuring position for all of the measuring positions for the BFS distribution.

2-2-3-11. Measuring Position Displacement Amount Correction Unit 207

The measuring position displacement amount correction unit 207 corrects all of the measuring positions based on the measuring position displacement amount for each calculated measuring position.

2-2-3-12. Correction Unit 208 for Measuring Position Displacement from Object to be Measured The correction unit 208 for a measuring position displacement from an object to be measured corrects a measuring position displacement between the actual measuring position and the object to be measured based on a length change in the longitudinal direction due to thermal expansion of the optical fiber FUT. In a case in which correction is not required depending on the method for laying the optical fiber FUT, the correction unit 208 for a measuring position displacement from the object to be measured does not perform correction.

2-3. Processing Example of Optical Fiber Characteristic Measuring Device 100

With reference to FIG. 17 to FIG. 19, the following describes a processing example of the optical fiber characteristic measuring device 100 (100A, 100B). The following describes BFS acquisition processing, measurement result generation processing, physical property change calculation processing, measurement result correction processing, and abnormality detection processing performed by the measurement control unit 110 of the optical fiber characteristic measuring device 100 in this order.

2-3-1. BFS Acquisition Processing

The following describes the BFS acquisition processing performed by the measurement control unit 110. The measurement control unit 110 acquires each Brillouin Frequency Shift (BFS) from each measuring position of the optical fiber FUT disposed in the object S to be measured as a measuring object. For example, the measurement control unit 110 acquires each BFS from each measuring position of the optical fiber FUT by using the time domain scheme or the correlation domain scheme. The measurement control unit 110 also acquires each BFS from each measuring position of the optical fiber FUT by using the single-end light incident scheme or the double-end light incident scheme.

The BFS acquisition processing described above is performed by the optical detection unit 6, the control/computation unit 7, the amplifier 8, the spectrum analysis/BFS calculation unit 9, the measurement condition setting unit 10, the measuring position list 11, the BFS distribution data generation unit 12, and the like constituting the measurement control unit 110.

2-3-2. Measurement Result Generation Processing

The following describes the measurement result generation processing performed by the measurement control unit 110. The measurement control unit 110 generates temperature distribution as a measurement result. For example, the measurement control unit 110 generates temperature distribution in the longitudinal direction of the optical fiber FUT by converting each BFS acquired by the BFS acquisition processing into a temperature.

The measurement control unit 110 generates strain distribution as a measurement result. For example, the measurement control unit 110 generates temperature distribution by converting each BFS into a temperature, and generates strain distribution in the longitudinal direction of the optical fiber FUT by converting each BFS into a strain.

The measurement result generation processing described above is performed by the BFS→temperature/strain conversion unit 13 and the like constituting the measuring position displacement reducing unit 200 of the measurement control unit 110.

2-3-3. Physical Property Change Calculation Processing

The following describes the physical property change calculation processing performed by the measurement control unit 110. The measurement control unit 110 calculates a physical property change of the optical fiber FUT based on the temperature distribution generated by the measurement result generation processing. For example, the measurement control unit 110 calculates at least one of a change in the refractive index and a change in the distance in the longitudinal direction in a section having a temperature equal to or higher than a predetermined temperature of the optical fiber FUT using the temperature distribution.

The physical property change calculation processing described above is performed by the measurement result comparison unit 201, the high-temperature section calculation unit 202, the temperature-refractive index conversion unit 203, the actual high-temperature section length calculation unit 204, the calculation unit 205 for a length change due to thermal expansion, the measuring position displacement amount calculation unit 206, and the like constituting the measuring position displacement reducing unit 200 of the measurement control unit 110.

2-3-4. Measurement Result Correction Processing

The following describes the measurement result correction processing performed by the measurement control unit 110. The measurement control unit 110 corrects each measuring position of the optical fiber based on the physical property change calculated by the physical property change calculation processing. For example, the measurement control unit 110 corrects a displacement of each measuring position and corrects the temperature distribution by using at least one of a change in the refractive index and a change in the distance in the longitudinal direction. The measurement control unit 110 also corrects a displacement of each measuring position and corrects the strain distribution by using at least one of a change in the refractive index and a change in the distance in the longitudinal direction.

The measurement result correction processing described above is performed by the measuring position displacement amount correction unit 207, the correction unit 208 for a measuring position displacement from the object to be measured, and the like constituting the measuring position displacement reducing unit 200 of the measurement control unit 110.

2-3-5. Abnormality Detection Processing

The following describes the abnormality detection processing performed by the measurement control unit 110. The measurement control unit 110 detects abnormality based on the measurement result corrected by the measurement result correction processing.

For example, in a case in which the temperature indicated by the temperature distribution after correction is equal to or higher than a threshold, the measurement control unit 110 detects abnormality of the object S to be measured as a measuring object. Additionally, in a case in which the temperature indicated by the temperature distribution after correction or the strain indicated by the strain distribution after correction is larger than a threshold, the measurement control unit 110 detects abnormality of the object S to be measured as a measuring object.

As a specific example, in a case in which the temperature indicated by the temperature distribution after correction is equal to or higher than the temperature threshold $X_T$, the measurement control unit 110 detects that the temperature of the object S to be measured is in the abnormal state. Additionally, in a case in which the strain indicated by the strain distribution after correction is equal to or larger than the strain threshold $X_W$, the measurement control unit 110 detects that the strain of the object S to be measured is in the abnormal state. At this point, the measurement control unit 110 may display the fact that the temperature or the strain of the object S to be measured is in the abnormal state on a monitor and the like connected to the optical fiber characteristic measuring device 100, or may notify the fact that the temperature or the strain of the object S to be measured is in the abnormal state to the terminal of the manager of the object S to be measured.

The abnormality detection processing described above may be performed by the temperature/strain distribution display unit 15 and the like constituting the measuring position displacement reducing unit 200 of the measurement control unit 110.

2-4. Specific Examples of Pieces of Processing of Optical Fiber Characteristic Measuring Device 100

By referring to FIG. 20 to FIG. 36 and using numerical expressions, the following describes specific examples of pieces of processing of the optical fiber characteristic measuring device 100 (100A, 100B). The following describes specific examples in the time domain scheme and specific examples in the correlation domain scheme in this order.

2-4-1. Specific Examples in Time Domain Scheme

By referring to FIG. 20 to FIG. 27 and using numerical expressions, the following describes specific examples in the time domain scheme of the pieces of processing of the optical fiber characteristic measuring device 100. The following describes a specific example 1 including one high-temperature section, and a specific example 2 including two high-temperature sections in this order.

2-4-1-1. Specific Example 1

Figure 20:
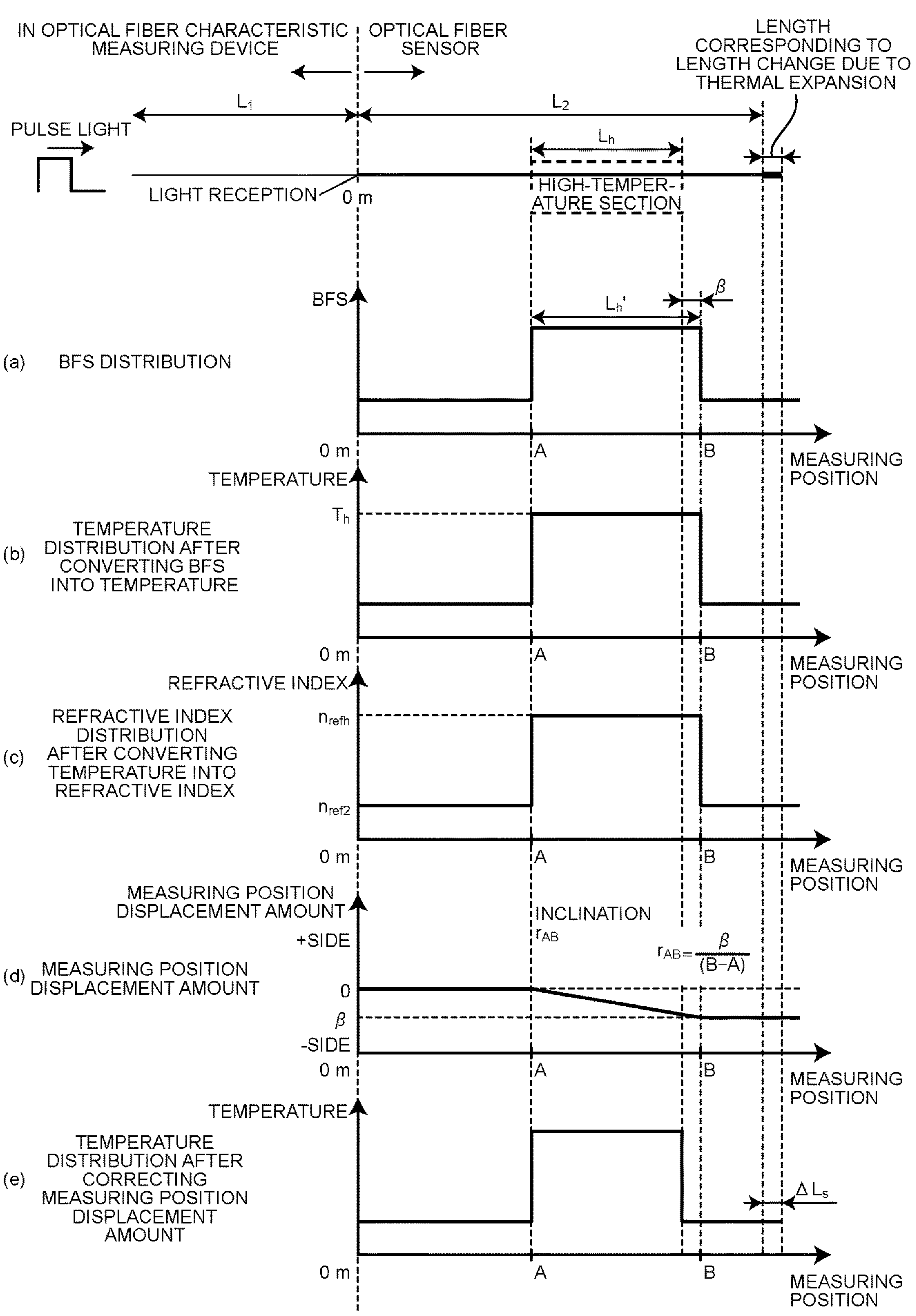
FIG. 20 is a diagram illustrating a specific example 1 of measurement results in the time domain scheme (BOTDR) according to the embodiment.
Figure 21:
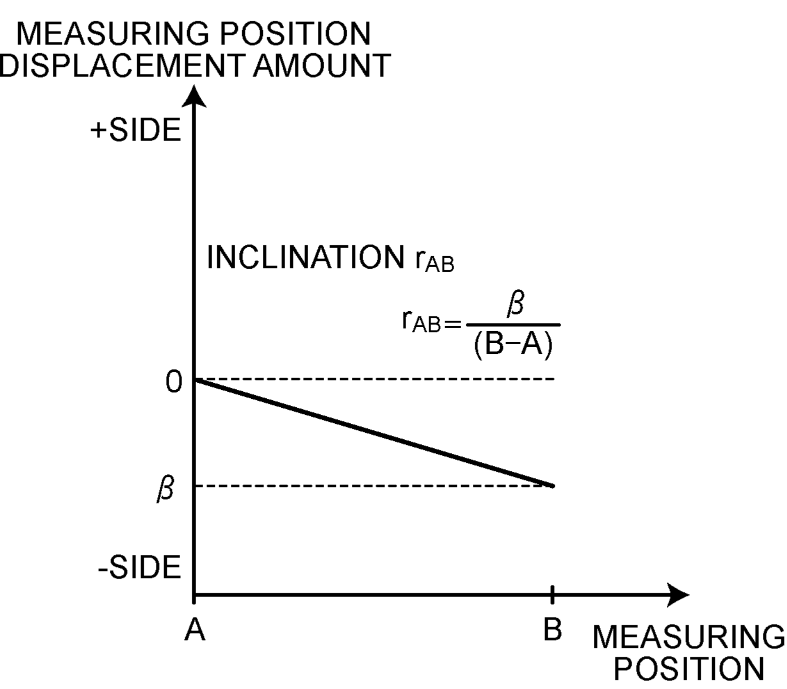
FIG. 21 is a diagram illustrating a specific example 1 of a relation between the measuring position and a measuring position displacement amount in the time domain scheme according to the embodiment.

By referring to FIG. 20 to FIG. 21 and using numerical expressions, the following describes the specific example 1 including one high-temperature section in the time domain scheme of the pieces of processing of the optical fiber characteristic measuring device 100. FIG. 20 is a diagram illustrating the specific example 1 of processing results in the time domain scheme according to the embodiment. FIG. 21 is a diagram illustrating the specific example 1 of a relation between the measuring position and the measuring position displacement amount in the time domain scheme according to the embodiment. The examples of FIG. 20 to FIG. 21 are application examples of the time domain scheme (BOTDR) of the single-end light incident scheme, but the same applies to the time domain scheme (BOTDA) of the double-end light incident scheme.

As illustrated in FIG. 20, even if the high-temperature section is present in the optical fiber FUT, in a case of generating BFS distribution using the refractive index $n_{ref2}$ of the optical fiber FUT before reaching a high temperature (at 25° C.), a length $$L'_h$$

to be measured of the high-temperature section becomes longer than an actual length $L_h$ of the high-temperature section. This is because the refractive index of the optical fiber FUT (herein, assumed to be $n_{refh}$) is larger as compared with that at the ordinary temperature (for example, 25° C.) in the high-temperature section, and the velocity of light propagating in the optical fiber FUT slows down in the high-temperature section. Herein, a relation between the refractive index $n_{ref}$ of the optical fiber FUT and the temperature T of the optical fiber FUT can be represented by the following expression (23) as a quadratic expression for calculating a relation between the refractive index and the temperature as illustrated in FIG. 9.

$$n_{ref} = a \times T^2 + b \times T + c \tag{23}$$

$$(a\text{: } 1.250e-8\ b\text{: } 8.700e-6\ c\text{: } 1.468)$$

By using the expression (23) described above, $n_{ref2}$ and $n_{refh}$ can be calculated as represented by the following expression (24) and expression (25). The temperature $T_h$ of the high-temperature section is obtained by converting, into the temperature, temperature dependency of the BFS illustrated in FIG. 2 that is previously acquired from the BFS distribution in the high-temperature section.

$$n_{ref2} = a \times 25^2 + b \times 25 + c \tag{24}$$

$$n_{refh} = a \times T_h^2 + b \times T_h + c \tag{25}$$

Assuming that a time during which a light pulse reciprocates in the high-temperature section is t, $$L'_h$$

and $L_h$ can be represented by the following expression (26) and expression (27).

$$L'_h = c / n_{ref2} \times t/2 \tag{26}$$

$$L_h = c / n_{refh} \times t/2 \tag{27}$$

Furthermore, based on the expression (26) and the expression (27) described above, Ln can be represented by the following expression (28) using $L'_h$.

$$L_h = n_{ref2}/n_{refh} \times L'_h \quad (28)$$

A difference between $L'_h$ and $L_h$ is the maximum measuring position displacement amount in the high-temperature section, and the maximum measuring position displacement amount can be represented as β by the following expression (29). The following expression (29) can be represented by the following expression (30) using the expression (28) described above. Herein, $n_{ref2}<n_{refh}$ is established, so that β<0 is satisfied.

$$\beta = L_h - L'_h \quad (29)$$

$$\beta = (n_{ref2}/n_{refh} - 1) \times L'_h \quad (30)$$

As illustrated in FIG. 21, the measuring position displacement amount for each measuring position in the high-temperature section can be calculated by using the following expression (31) and expression (32) based on the maximum measuring position displacement amount β. Herein, FAB represents inclination (rate of change) of the measuring position displacement amount in an AB section, and $\Delta L_{\beta AB}$ represents the measuring position displacement amount for each measuring position in the AB section.

$$r_{AB} = \frac{\beta}{(B - A)} \quad (31)$$

$$\Delta L_{\beta AB} = r_{AB} \times (\text{Measuring position} - A) \quad (32)$$

An actual measuring position can be calculated by correcting the measuring position using the following expression (33) based on the measuring position displacement amount $\Delta L_{\beta AB}$ calculated by using the expression (32) described above.

$$\text{Actual measuring position} = \text{Measuring position} + \Delta L_{\beta AB} \quad (33)$$

Herein, it is insufficient that the measuring position displacement is corrected only in the AB section of the measuring position, but the measuring position displacement needs to be corrected for all of the measuring positions subsequent to the high-temperature section of the optical fiber FUT. Specifically, numerical expressions represented by the following expression (34) to expression (36) are applied to respective sections.

$$0\text{ m} \leq \text{Measuring position} < A \quad (34)$$

$$\text{Actual measuring position} = \text{Measuring position}$$

$$A \leq \text{Measuring position} < B \quad (35)$$

$$\text{Actual measuring position} = \text{Measuring position} + \Delta L_{\beta AB}$$

$$B \leq \text{Measuring position} \quad (36)$$

$$\text{Actual measuring position} = \text{Measuring position} + \beta$$

Figure 22:
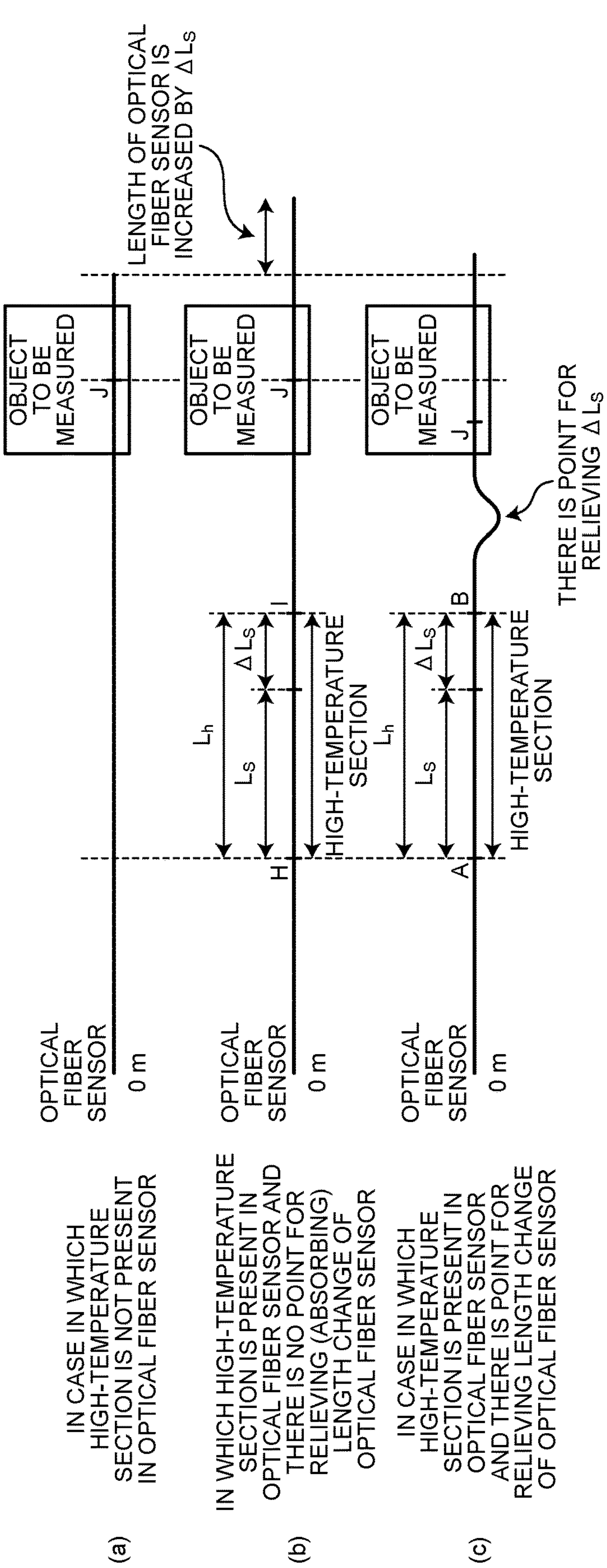
FIG. 22 is a diagram illustrating a specific example of a case of measuring a temperature at an optional position of an object S to be measured according to the embodiment.

Only the measuring position displacement of the optical fiber FUT itself has been described above, and displacement in a positional relation between the optical fiber FUT and the object S to be measured has not been described. The length in the longitudinal direction of the optical fiber FUT is changed due to thermal expansion in the high-temperature section. Thus, in a case of not considering this change, a problem may be caused such that a positional relation between the optical fiber FUT subsequent to the high-temperature section and the object S to be measured is displaced depending on the method for laying the optical fiber FUT as the sensor portion. The following describes an example of a case of measuring the temperature at an optional position of the object S to be measured by the optical fiber FUT as an example of the above description with reference to FIG. 22. FIG. 22 is a diagram illustrating a specific example of a case of measuring the temperature at an optional position of the object S to be measured according to the embodiment.

It is assumed that there is no high-temperature section in the optical fiber FUT, and the optional position of the object S to be measured matches a measuring position J of the optical fiber FUT (refer to FIG. 22A). Next, in a case in which a temperature of a section between an H position and an I position in the optical fiber FUT becomes high, the length of the optical fiber FUT is changed in the longitudinal direction due to thermal expansion in a high-temperature section HI. Assuming that the length change varies in the I position direction based on the H position, and there is no point for relieving the length change of the optical fiber FUT between the H position and a far end of the optical fiber FUT (refer to FIG. 22B), the optional position of the object S to be measured continuously matches the measuring position J of the optical fiber FUT. However, in a case in which there is a point for relieving the length change of the optical fiber FUT as the sensor portion between the H position and the object S to be measured (refer to FIG. 22C), the optional position of the object S to be measured does not match the measuring position J of the optical fiber FUT.

Description will be made using specific numerical values. The measuring position J is assumed to be a 100 m position of the optical fiber FUT. Even if the length in the longitudinal direction is changed due to thermal expansion, the optional position of the object S to be measured is measured when the measuring device measures the 100 m position based on the 0 m position. That is, the positional relation between the optical fiber FUT and the object to be measured is not displaced. However, in a case of FIG. 22C, the 100 m position is in front of the optional position of the object to be measured.

The following describes processing of correcting a position displacement between the actual measuring position and the object S to be measured in a case illustrated in FIG. 22C. The actual length $L_h$ of the high-temperature section can be represented by the following expression (37) using the length $L_s$ of the optical fiber before reaching a high temperature (at 25° C.) in the high-temperature section in the optical fiber FUT and the distance change $\Delta L_s$ of $L_s$ due to thermal expansion.

$$L_h = L_s + \Delta L_s \tag{37}$$

Furthermore, the expression (37) described above can be represented by the following expression (38) using a linear expansion coefficient α (in a case of quartz glass, $0.5\times10^{-6}$/° C.).

$$\Delta L_s = \frac{\alpha\times(T-25^\circ\text{ C.})}{1+\alpha\times(T-25^\circ\text{ C.})}\times L_h \tag{38}$$

Furthermore, it can be represented by the following expression (39) using the length $$L_h'$$

of the optical fiber in the high-temperature section in the optical fiber FUT calculated based on the BFS distribution.

$$\Delta L_s = \frac{\alpha\times(T-25^\circ\text{ C.})}{1+\alpha\times(T-25^\circ\text{ C.})}\times n_{ref2}/n_{refh}\times L_h' \tag{39}$$

Herein, if $\Delta L_s$ can be calculated, the measuring position displacement between the actual measuring position and the object S to be measured can be corrected by using the following expression (40).

$$\text{Measuring position for object to be measured} = \text{Actual measuring position} + \Delta L_s \tag{40}$$

The problem is not necessarily caused when a length change is not considered, so that it cannot be said that the problem is necessarily caused in the processing described above. However, in a case in which there is a point for relieving the length change depending on the method for laying the optical fiber FUT, the positional relation between the optical fiber FUT and the object S to be measured may be displaced corresponding to the length. Thus, it is possible to take a countermeasure against a position displacement by knowing that the length is changed due to thermal expansion.

As described above, the optical fiber characteristic measuring device 100 can reduce the measuring position displacement at the time of generating the BFS distribution by calculating the refractive index $n_{refh}$ of the optical fiber FUT in the high-temperature section from the temperature of the high-temperature section calculated at the time of BFS distribution generation processing, calculating the measuring position displacement amount for each measuring position based on the calculated refractive index $n_{refh}$ and the length $L_h'$ of the high-temperature section to correct the measuring position displacement for each measuring position, and calculating the actual measuring position. Furthermore, the optical fiber characteristic measuring device 100 can reduce the measuring position displacement at the time of BFS distribution generation processing by also correcting the measuring position displacement between the actual measuring position and the object S to be measured.

2-4-1-2. Signs Used in Specific Example 1

The following describes signs used in the drawings and numerical expressions in the specific example 1 using the time domain scheme described above. $L_1$ is the length of the optical fiber from the light pulse incident end to the incident end (0 m position) of the optical fiber FUT as the sensor portion. $L_2$ is the length of the optical fiber FUT as the sensor portion before reaching a high temperature (at 25° C.). Ln is the actual length of the high-temperature section in the optical fiber FUT as the sensor portion. $L_h'$ is the length of the optical fiber FUT in the high-temperature section in the optical fiber FUT as the sensor portion calculated by the BFS distribution generation processing. β is the maximum measuring position displacement amount. $L_s$ is the length of the optical fiber FUT before reaching a high temperature (at 25° C.) in the high-temperature section in the optical fiber FUT as the sensor portion. $\Delta L_s$ is the length (distance) change of $L_s$ due to thermal expansion. $n_{ref2}$ is the refractive index of the optical fiber FUT as the sensor portion before reaching a high temperature (at 25° C.). $n_{refh}$ is the refractive index of the optical fiber FUT in the high-temperature section. α is the linear expansion coefficient of quartz glass. A is the measuring position at the beginning of the high-temperature section calculated by the BFS distribution generation processing. B is the measuring position at the end of the high-temperature section calculated by the BFS distribution generation processing. $T_h$ is the temperature [° C.] of the optical fiber FUT in the high-temperature section. $n_{ref}$ is the refractive index of the optical fiber FUT. T is the temperature [° C.] of the optical fiber FUT. a and b are coefficients. c is a constant. $\Delta L_{\beta AB}$ is the measuring position displacement amount for each measuring position in the AB section. $r_{AB}$ is the inclination (rate of change) of the measuring position displacement amount in the AB section. t is the time during which the light pulse reciprocates in the high-temperature section of the optical fiber FUT as the sensor portion. H is the measuring position at the beginning of the high-temperature section calculated by the BFS distribution generation processing. I is the measuring position at the end of the high-temperature section calculated by the BFS distribution generation processing. J is the measuring position of the optical fiber FUT as the sensor portion measuring the temperature of the optional position of the object S to be measured.

2-4-1-3. Specific Example 2

Figure 23:
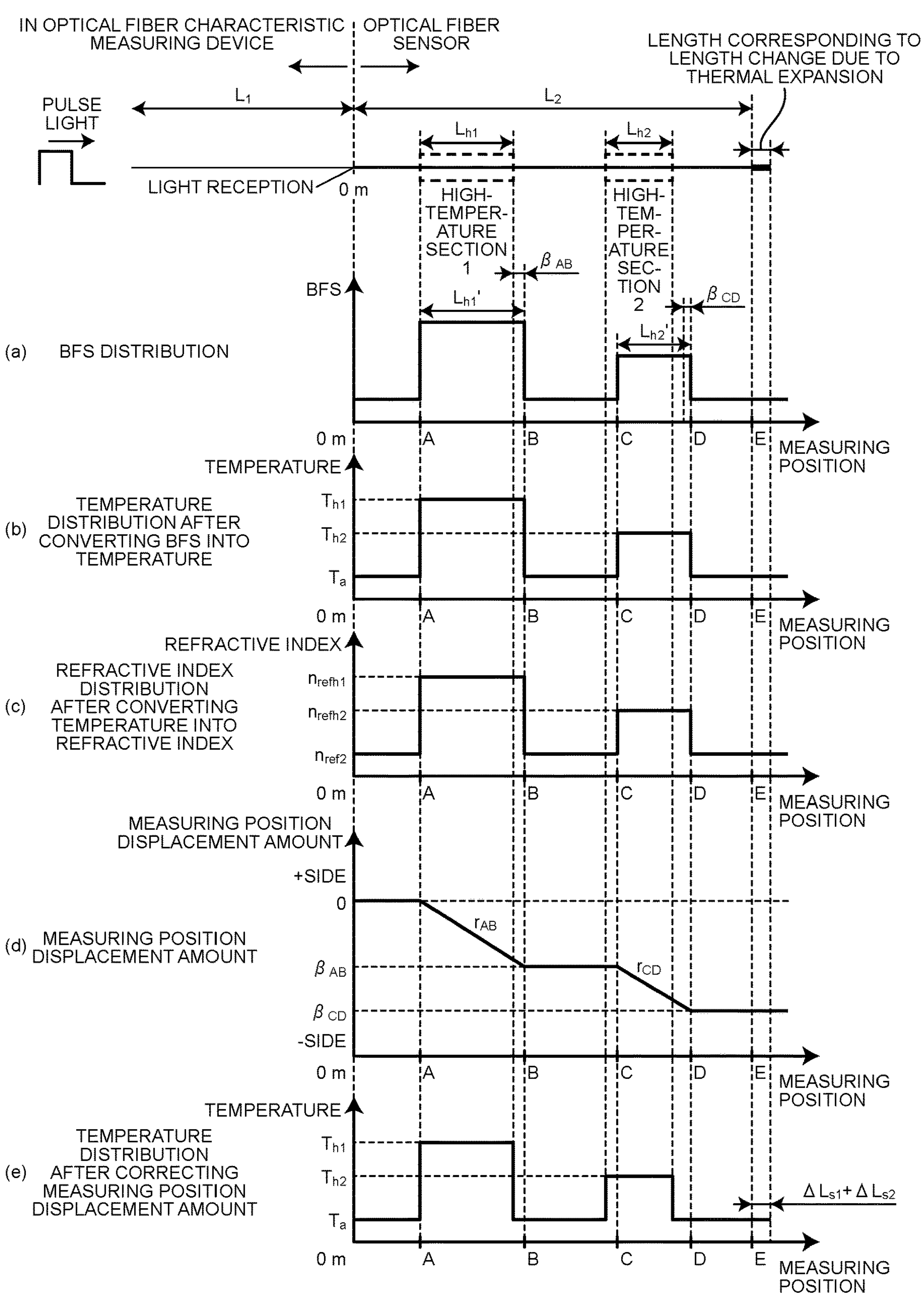
FIG. 23 is a diagram illustrating a specific example 2 of measurement results in the time domain scheme (BOTDR) according to the embodiment.
Figure 24:
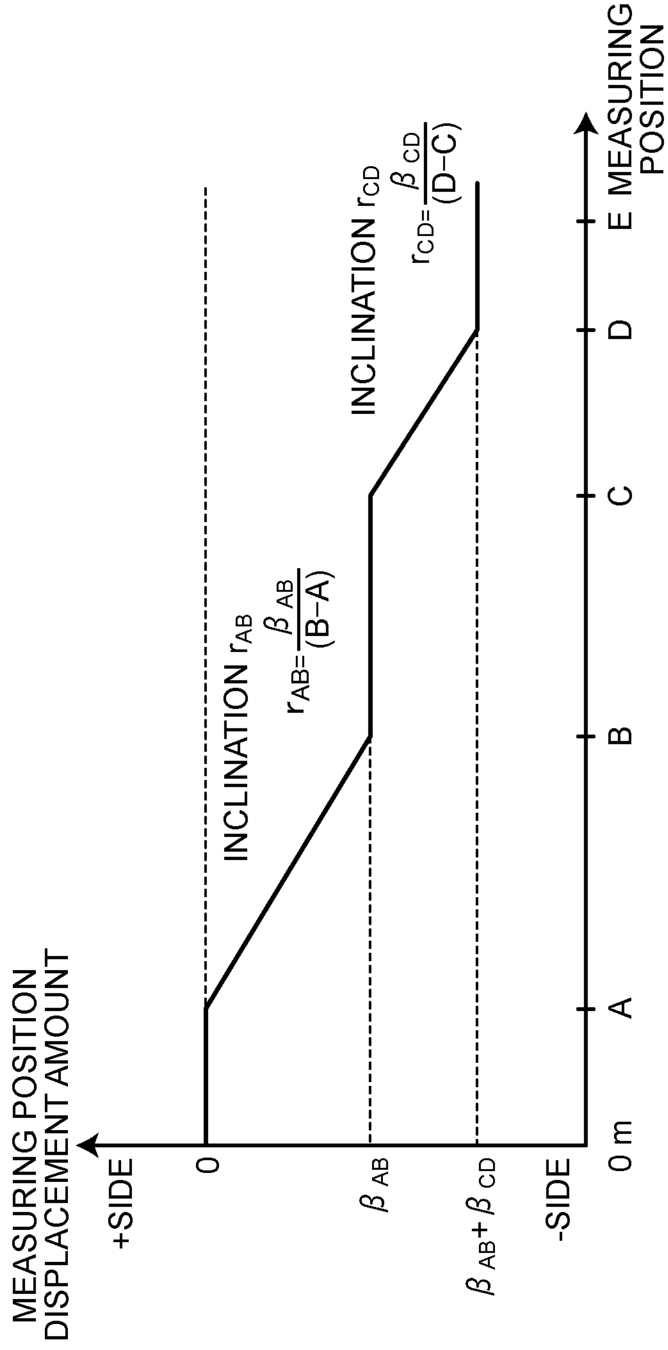
FIG. 24 is a diagram illustrating a specific example 2 of a relation between the measuring position and the measuring position displacement amount in the time domain scheme and the correlation domain scheme (BOCDR) according to the embodiment.

By referring to FIG. 23 to FIG. 27 and using numerical expressions, the following describes a specific example 2 including two high-temperature sections in the time domain scheme of the pieces of processing of the optical fiber characteristic measuring device 100. FIG. 23 is a diagram illustrating the specific example 2 of processing results in the time domain scheme according to the embodiment. FIG. 24 is a diagram illustrating the specific example 2 of the relation between the measuring position and the measuring position displacement amount in the time domain scheme and the correlation domain scheme according to the embodiment. FIG. 25 is a diagram illustrating a specific example of preconditions in the time domain scheme and the correlation domain scheme according to the embodiment. FIG. 26 is a diagram illustrating a specific example of calculation results in the time domain scheme and the correlation domain scheme according to the embodiment. FIG. 27 is a diagram illustrating a specific example of temperature distribution after correction in the time domain scheme and the correlation domain scheme according to the embodiment. The examples of FIG. 23 to FIG. 27 are application examples of the time domain scheme (BOTDR) of the single-end light incident scheme, but the same applies to the time domain scheme (BOTDA) of the double-end light incident scheme.

The following describes measurement results in the time domain scheme illustrated in FIG. 23 using specific numerical values. In the following description, it is assumed that the optical fiber FUT includes two high-temperature sections including a high-temperature section 1 (800° C., 200 m) and a high-temperature section 2 (600° C., 120 m). The temperature in the high-temperature sections including the high-temperature section 1 and the high-temperature section 2 is assumed to be uniform. Herein, a definition of a temperature determined to be a high temperature may be optionally determined in advance. As a measured temperature is higher, the high-temperature section is longer, and the number of the high-temperature sections is larger, the measuring position displacement amount is increased. For example, the maximum measuring position displacement amount β is about −1.00 m with the high-temperature section of 100 m in a case of 800° C., and the maximum measuring position displacement amount β is about −0.65 m with the high-temperature section of 100 m in a case of 600° C. Additionally, the maximum measuring position displacement amount β is about −0.14 m with the high-temperature section of 100 m in a case of 200° C. The maximum measuring position displacement amount β is linearly changed with respect to the length of the high-temperature section, so that it can be obtained by simply performing multiplication. For example, in a case of 800° C. and the high-temperature section of 200 m, the maximum measuring position displacement amount β is about −2.00 m.

As illustrated in FIG. 24, the maximum measuring position displacement amount in a case in which a plurality of the high-temperature sections are present is a sum of maximum position displacement amounts of the respective high-temperature sections. For example, in a case in which the length of the high-temperature section 1 (section from the A position to the B position) obtained by measurement is 100 m and the temperature is 800° C., and the length of the high-temperature section 2 (section from the C position to the D position) obtained by measurement is 100 m and the temperature is 600° C., the maximum measuring position displacement amount is about −1.65 m.

FIG. 25 illustrates preconditions for explanation using specific numerical values. FIG. 26 illustrates results of calculation using the expression (23) to expression (39) described above based on the preconditions illustrated in FIG. 25. Each of the expressions represented by the following expression (41) to expression (45) is applied to each section by using BAB, BCD, TAB, and $r_{CD}$ illustrated in FIG. 26. FIG. 27 illustrates the temperature distribution after correction. Furthermore, in a case in which there is the possibility that a measuring position displacement between the actual measuring position and the object S to be measured is caused, the countermeasure described above may be taken.

$$0\text{ m} \le \text{Measuring position} < A \tag{41}$$

$$\text{Actual measuring position} = \text{Measuring position}$$

$$A \le \text{Measuring position} < B \tag{42}$$

$$\text{Actual measuring position} = \text{Measuring position} + \Delta L_{\beta AB}$$

$$(\text{where } \Delta L_{\beta AB} = r_{AB} \times (\text{Measuring position} - A))$$

$$B \le \text{Measuring position} < C \tag{43}$$

$$\text{Actual measuring position} = \text{Measuring position} + \beta_{AB}$$

$$C \le \text{Measuring position} < D \tag{44}$$

$$\text{Actual measuring position} = \text{Measuring position} + \beta_{AB} + \Delta L_{\beta CD}$$

$$(\text{where } \Delta L_{\beta CD} = r_{CD} \times (\text{Measuring position} - C))$$

$$D \le \text{Measuring position} \tag{45}$$

$$\text{Actual measuring position} = \text{Measuring position} + \beta_{AB} + \beta_{CD}$$

2-4-1-4. Signs Used in Specific Example 2

The following describes signs used in the drawings and numerical expressions in the specific example 2 using the time domain scheme described above. $L_1$ is the length of the optical fiber from the light pulse incident end to the incident end (0 m position) of the optical fiber FUT as the sensor portion. $L_2$ is the length of the optical fiber FUT as the sensor portion before reaching a high temperature (at 25° C.). $T_{h1}$ is the temperature of the high-temperature section 1 converted by the BFS distribution generation processing. $T_{h2}$ is the temperature of the high-temperature section 2 converted by the BFS distribution generation processing. $T_a$ is a temperature of a section other than the high-temperature section 1 and the high-temperature section 2 converted by the BFS distribution generation processing. A is the measuring position at the beginning of the high-temperature section 1 calculated by the BFS distribution generation processing. B is the measuring position at the end of the high-temperature section 1 calculated by the BFS distribution generation processing. C is the measuring position at the beginning of the high-temperature section 2 calculated by the BFS distribution generation processing. D is the measuring position at the end of the high-temperature section 2 calculated by the BFS distribution generation processing. $n_{ref1}$ is the refractive index of the optical fiber from the light pulse incident end to the incident end (0 m position) of the optical fiber FUT as the sensor portion. $n_{ref2}$ is the refractive index of the optical fiber FUT as the sensor portion before reaching a high temperature (at 25° C.). $n_{refh1}$ is the refractive index of the optical fiber FUT in the high-temperature section 1. $n_{refh2}$ is the refractive index of the optical fiber FUT in the high-temperature section 2. $L_{h1}$ is the actual length of the high-temperature section 1 in the optical fiber FUT as the sensor portion. $L_{h2}$ is the actual length of the high-temperature section 2 in the optical fiber FUT as the sensor portion.

$$L'_{h1}$$

is the length of the optical fiber FUT in the high-temperature section 1 in the optical fiber FUT as the sensor portion calculated by the BFS distribution generation processing.

$$L'_{h2}$$

is the length of the optical fiber FUT in the high-temperature section 2 in the optical fiber FUT as the sensor portion calculated by the BFS distribution generation processing. BAB is the maximum measuring position displacement amount of the high-temperature section 1. $\beta_{CD}$ is the maximum measuring position displacement amount of the high-temperature section 2. $r_{AB}$ is the inclination (rate of change) of the measuring position displacement amount in the AB section. $r_{CD}$ is the inclination (rate of change) of the measuring position displacement amount in the CD section. $\Delta L_{\beta AB}$ is the measuring position displacement amount for each measuring position in the AB section. $\Delta L_{\beta CD}$ is the measuring position displacement amount for each measuring position in the CD section. $L_{s1}$ is the length of the optical fiber FUT before reaching a high temperature (at 25° C.) in the high-temperature section 1 in the optical fiber FUT as the sensor portion. $L_{s2}$ is the length of the optical fiber FUT before reaching a high temperature (at 25° C.) in the high-temperature section 2 in the optical fiber FUT as the sensor portion. $\Delta L_{s1}$ is the length (distance) change of $L_{s1}$ due to thermal expansion. $\Delta L_{s2}$ is the length (distance) change of $L_{s2}$ due to thermal expansion.

2-4-2. Specific Examples in Correlation Domain Scheme

By referring to FIG. 28 to FIG. 34 and using numerical expressions, the following describes specific examples in the correlation domain scheme of the pieces of processing of the optical fiber characteristic measuring device 100. The following describes a specific example 1 including one high-temperature section, and a specific example 2 including two high-temperature sections in this order.

2-4-2-1. Specific Example 1

Figure 28:
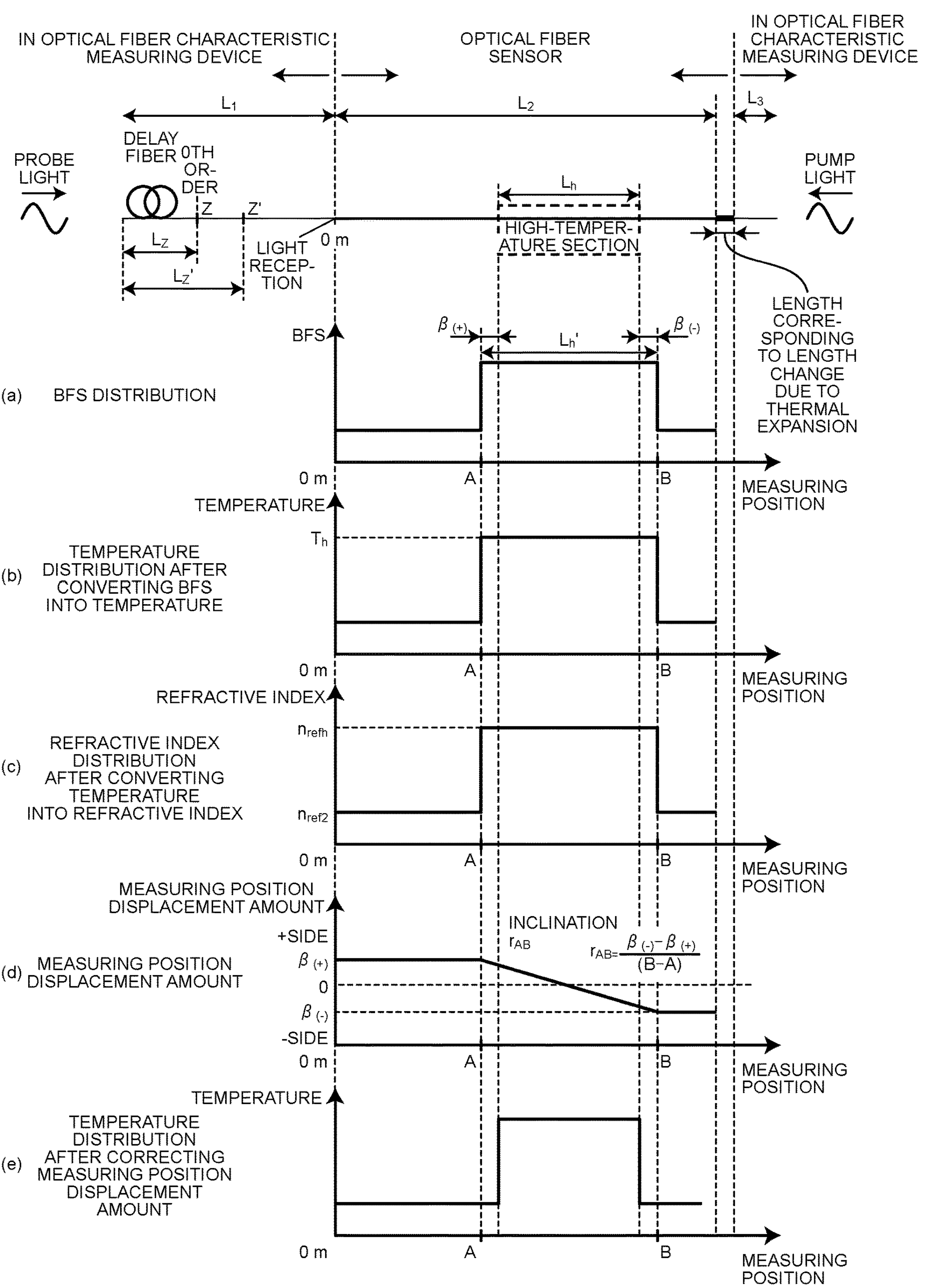
FIG. 28 is a diagram illustrating a specific example 1 of measurement results in the correlation domain scheme (BOCDA) according to the embodiment.
Figure 29:
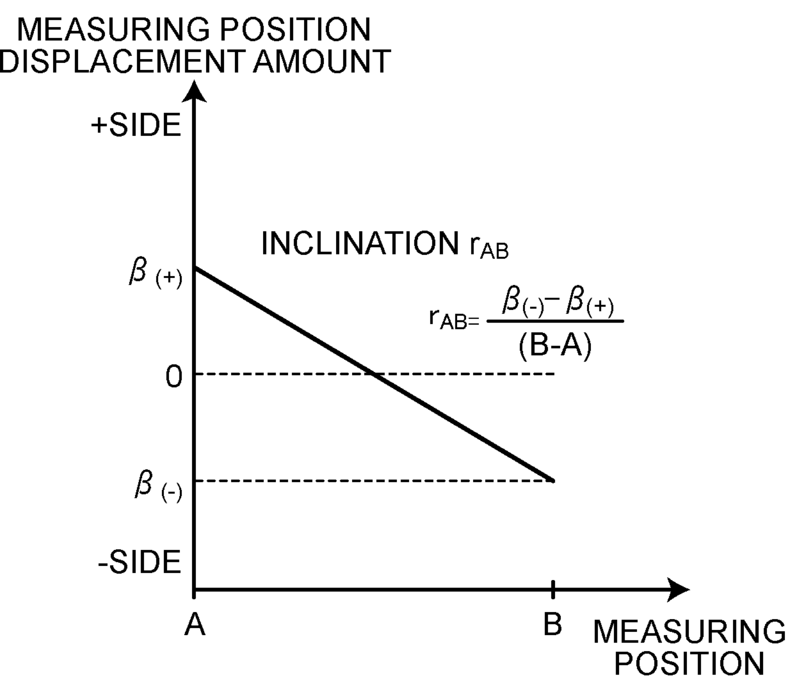
FIG. 29 is a diagram illustrating a specific example 1 of a relation between the measuring position and the measuring position displacement amount in the correlation domain scheme (BOCDA) according to the embodiment.

By referring to FIG. 28 and FIG. 29 and using numerical expressions, the following describes the specific example 1 including one high-temperature section in the correlation domain scheme of the pieces of processing of the optical fiber characteristic measuring device 100. FIG. 28 is a diagram illustrating the specific example 1 of measurement results in the correlation domain scheme according to the embodiment. FIG. 29 is a diagram illustrating the specific example 1 of a relation between the measuring position and the measuring position displacement amount in the correlation domain scheme according to the embodiment. The examples of FIG. 28 and FIG. 29 are application examples of the correlation domain scheme (BOCDA) of the double-end light incident scheme.

Even if the high-temperature section is present in the optical fiber FUT, in a case of performing the BFS distribution generation processing using the refractive index $n_{ref2}$ of the optical fiber FUT before reaching a high temperature (at 25° C.) without considering the length change of the optical fiber FUT due to thermal expansion, the length $L_h'$ to be measured of the high-temperature section becomes longer than the actual length $L_h$ of the high-temperature section. The refractive index of the optical fiber (herein, assumed to be $n_{refh}$) is larger as compared with that at the ordinary temperature (for example, 25° C.) in the high-temperature section, and the velocity of light propagating in the optical fiber FUT slows down in the high-temperature section. Furthermore, the length of the optical fiber FUT is changed due to thermal expansion. This is because the 0th order correlation peak position and the correlation peak interval are changed.

Assuming that the refractive index of the optical fiber from the probe light incident end to the incident end (0 m position) of the optical fiber FUT is $n_{ref1}$, the refractive index of the optical fiber FUT as the sensor portion is $n_{ref2}$, and the refractive index of the optical fiber from the pump light incident end to the incident end of the optical fiber FUT is $n_{ref3}$, $L_Z$ can be represented by the following expression (46).

$$L_Z = \frac{n_{ref1} \times L_1 + n_{ref2} \times L_2 + n_{ref3} \times L_3}{2 \times n_{ref1}} \tag{46}$$

However, if $n_{ref1} \times L_1 \le n_{ref2} \times L_2 + n_{ref3} \times L_3$ is satisfied, the 0th order correlation peak position is present between the probe light emitting end and the incident end (0 m position) of the optical fiber FUT as the sensor portion for the probe light.

Assuming that there is no high-temperature section in the optical fiber FUT as the sensor portion and refractive indexes of all optical fibers including the optical fiber FUT as the sensor portion are the same ($n_{ref1}=n_{ref2}=n_{ref3}$), $L_Z$ can be represented by the following expression (47). In the following description, it is assumed that $n_{ref1}=n_{ref2}=n_{ref3}$ is satisfied, and the refractive index is $n_{ref1}$.

$$L_Z = \frac{(L_1 + L_2 + L_3)}{2} \tag{47}$$

In a case in which the high-temperature section is present in the optical fiber FUT as the sensor portion and the refractive index of the optical fiber FUT in the high-temperature section is $n_{refh}$, $$L'_z$$

can be represented by the following expression (48). Herein, $n_{ref1}$ and $n_{refh}$ may be calculated by using the expression (23) described above.

$$L'_Z = \frac{L_1 + (L_2 - L_s) + L_3 + n_{refh}/n_{ref1} \times L_h}{2} \tag{48}$$

The length $L_s$ of the optical fiber FUT before reaching a high temperature (at 25° C.) in the high-temperature section in the optical fiber FUT as the sensor portion can be represented by the following expression (49) using the expression (37) and the expression (38) described above.

$$L_s = \frac{L_h}{1 + \alpha \times (T - 25^\circ \text{ C.})} \tag{49}$$

According to a numerical simulation, it has been found that, even if the high-temperature section is present in the optical fiber FUT as the sensor portion, the length $$L_h'$$

of the high-temperature section, which is calculated in a case of generating the BFS distribution using the reference technique without considering the refractive index of the optical fiber FUT in the high-temperature section and the length change of the optical fiber FUT due to thermal expansion, becomes a length obtained by adding the maximum measuring position displacement amount on the + side $\beta_{(+)}$ and the maximum measuring position displacement amount on the − side $\beta_{(-)}$ to the actual length $L_h$ of the high-temperature section. As a result, the calculated length $$L_h'$$

of the high-temperature section is longer than the actual length $L_h$ of the high-temperature section. This is expressed by the following expression (50) as a numerical expression.

$$L_h' = L_h + \beta_{(+)} + (-\beta_{(-)}) \tag{50}$$

Furthermore, according to a numerical simulation, it has been found that the maximum measuring position displacement amount on the + side $\beta_{(+)}$ matches a difference between $L_Z$ and $$L_z'$$

at the 0th order correlation peak position, and the maximum measuring position displacement amount on the − side $\beta_{(-)}$ matches a difference between $\Delta L_s$ and $\beta_{(+)}$. This is expressed by the following expression (51) and expression (52) as numerical expressions. Herein, $\Delta L_s<\beta_{(+)}$ is satisfied, so that $\beta_{(-)}<0$ is satisfied.

$$\begin{aligned}\beta_{(+)} &= L_Z' - L_Z \\ &= \frac{n_{refh}/n_{ref1} \times L_h - L_s}{2} \\ &= \frac{n_{refh}/n_{ref1} \times L_h}{2} - \frac{L_h}{2 \times \{1 + \alpha \times (T - 25^\circ\text{ C.})\}}\end{aligned} \tag{51}$$

$$\begin{aligned}\beta_{(-)} &= \Delta L_s - \beta_{(+)} \\ &= (L_h - L_s) - \beta_{(+)} \\ &= \left(L_h - \frac{L_h}{1 + \alpha \times (T - 25^\circ\text{ C.})}\right) - \beta_{(+)}\end{aligned} \tag{52}$$

Based on the expression (50), the expression (51), and the expression (52) described above, the actual length $L_h$ of the high-temperature section can be represented by the following expression (53) using the calculated length $$L_h'$$

of the high-temperature section.

$$L_h = n_{ref1}/n_{refh} \times L_h' \tag{53}$$

By using the expression (53) described above, the actual length $L_h$ of the high-temperature section can be calculated from the length $$L_h'$$

of the high-temperature section calculated at the time of BFS distribution generation processing, so that the maximum measuring position displacement amount on the + side $\beta_{(+)}$ and the maximum measuring position displacement amount on the − side $\beta_{(-)}$ can be calculated by using the expression (51) and the expression (52) described above. The expression (53) described above is the same as the expression (28) described above in the time domain scheme.

As illustrated in FIG. 29, the measuring position displacement amount for each measuring position in the high-temperature section can be calculated from the maximum measuring position displacement amount on the + side $\beta_{(+)}$ and the maximum measuring position displacement amount on the − side $\beta_{(-)}$ using the following expression (54) and expression (55). Herein, AB represents the inclination (rate of change) of the measuring position displacement amount in the AB section, and $\Delta L_{\beta AB}$ is the measuring position displacement amount for each measuring position in the AB section.

$$r_{AB} = \frac{\beta_{(-)} - \beta_{(+)}}{(B - A)} \tag{54}$$

$$\Delta L_{\beta AB} = r_{AB} \times (\text{Measuring position} - A) \tag{55}$$

An actual measuring position can be calculated by correcting the measuring position using the following expression (56) based on the measuring position displacement amount $\Delta L_{\beta AB}$ calculated by using the expression (55) described above.

$$\text{Actual measuring position} = \text{Measuring position} + \Delta L_{\beta AB} \tag{56}$$

Herein, it is insufficient that the measuring position displacement is corrected only in the AB section of the measuring position, but the measuring position displacement needs to be corrected for all of the measuring positions of the optical fiber FUT (for reference: measuring positions subsequent to the high-temperature section in a case of the time domain scheme and the correlation domain scheme (BOCDR)). Specifically, numerical expressions represented by the following expression (57) to expression (59) are applied to respective sections.

$$0\text{ m} \le \text{Measuring position} < A \tag{57}$$

$$\text{Actual measuring position} = \text{Measuring position} + \beta_{(+)}$$

-continued $$A \leq \text{Measuring position} < B \tag{58}$$

$$\text{Actual measuring position} = \text{Measuring position} + \beta_{(+)} + \Delta L_{\beta AB}$$

$$B \leq \text{Measuring position} \tag{59}$$

$$\text{Actual measuring position} = \text{Measuring position} + \beta_{(-)}$$

Only the measuring position displacement of the optical fiber FUT itself has been described above, and displacement in a positional relation between the optical fiber FUT and the object S to be measured has not been described. The length in the longitudinal direction of the optical fiber FUT is changed due to thermal expansion in the high-temperature section. Thus, in a case of not considering this change, a problem may be caused such that the positional relation between the optical fiber FUT subsequent to the high-temperature section and the object S to be measured is displaced depending on the method for laying the optical fiber FUT. However, the same countermeasure as that in the time domain scheme described above may be taken for this problem.

As described above, the optical fiber characteristic measuring device 100 can reduce the measuring position displacement at the time of BFS distribution generation processing by calculating the refractive index $n_{refh}$ of the optical fiber FUT in the high-temperature section from the temperature of the high-temperature section calculated by the BFS distribution generation processing, calculating the measuring position displacement amount for each measuring position based on the calculated refractive index $n_{refh}$ and the length $L_h'$ of the high-temperature section, correcting the measuring position displacement for each measuring position, and calculating the actual measuring position. Furthermore, the optical fiber characteristic measuring device 100 can reduce the measuring position displacement at the time of BFS distribution generation processing by also correcting the measuring position displacement between the actual measuring position and the object S to be measured.

Regarding the correlation domain scheme (BOCDR), similarly to the correlation domain scheme (BOCDA), in the method for calculating the measuring position of the optical fiber FUT, the set correlation peak position becomes the measuring position, and the correlation peak position is calculated from the modulation frequency modulating the light source, the refractive index of the optical fiber FUT, and the 0th order correlation peak position. However, in a case in which the expression (13) described above is established, the length $L_Z$ from the pump light emitting end to the 0th order correlation peak position can be represented by the expression (14) described above, and the 0th order correlation peak position is independent of the length of the optical fiber FUT as the sensor portion, so that the 0th order correlation peak position is not changed even if the high-temperature section is present in the optical fiber FUT. Thus, as expressions for calculating the measuring position displacement amount in the correlation domain scheme (BOCDR), the expression (28), the expression (30), the expression (35), and the expression (36) described above can be applied similarly to the time domain scheme.

2-4-2-2. Signs Used in Specific Example 1

The following describes signs used in the drawings and numerical expressions in the specific example 1 using the correlation domain scheme described above. $L_1$ is the length of the optical fiber from the probe light incident end to the incident end (0 m position) of the optical fiber FUT as the sensor portion. $L_2$ is the length of the optical fiber FUT as the sensor portion before reaching a high temperature (at 25° C.). $L_3$ is the length of the optical fiber from the pump light incident end to the incident end of the optical fiber FUT as the sensor portion. $L_h$ is the actual length of the high-temperature section in the optical fiber FUT as the sensor portion. $L_Z$ is the length of the optical fiber from the probe light incident end to the 0th order correlation peak position in a case in which there is no high-temperature section in the optical fiber FUT as the sensor portion.

$$L_z'$$

is the length of the optical fiber from the probe light incident end to the 0th order correlation peak position in a case in which the high-temperature section is present in the optical fiber FUT as the sensor portion.

$$L_h'$$

is the length of the optical fiber in the high-temperature section in the optical fiber FUT as the sensor portion calculated by the BFS distribution generation processing. $\beta_{(+)}$ is the maximum measuring position displacement amount on the + side. $\beta_{(-)}$ is the maximum measuring position displacement amount on the − side. $L_s$ is the length of the optical fiber FUT before reaching a high temperature (at 25° C.) in the high-temperature section in the optical fiber FUT as the sensor portion. $\Delta L_s$ is the length change of $L_s$ due to thermal expansion. $n_{ref1}$ is the refractive index of the optical fiber from the probe light incident end to the incident end (0 m position) of the optical fiber FUT as the sensor portion. $n_{ref2}$ is the refractive index of the optical fiber FUT as the sensor portion before reaching a high temperature (at 25° C.). $n_{ref3}$ is the refractive index of the optical fiber from the pump light incident end to the incident end of the optical fiber FUT as the sensor portion. $n_{refh}$ is the refractive index of the optical fiber FUT in the high-temperature section. $\alpha$ is the linear expansion coefficient of quartz glass. T is the temperature [° C.] of the optical fiber FUT. A is the measuring position at the beginning of the high-temperature section calculated by the BFS distribution generation processing. B is the measuring position at the end of the high-temperature section calculated by the BFS distribution generation processing. $\Delta L_{\beta AB}$ is the measuring position displacement amount for each measuring position in the AB section. $r_{AB}$ is the inclination (rate of change) of the measuring position displacement amount in the AB section.

2-4-2-3. Specific Example 2

Figure 30:
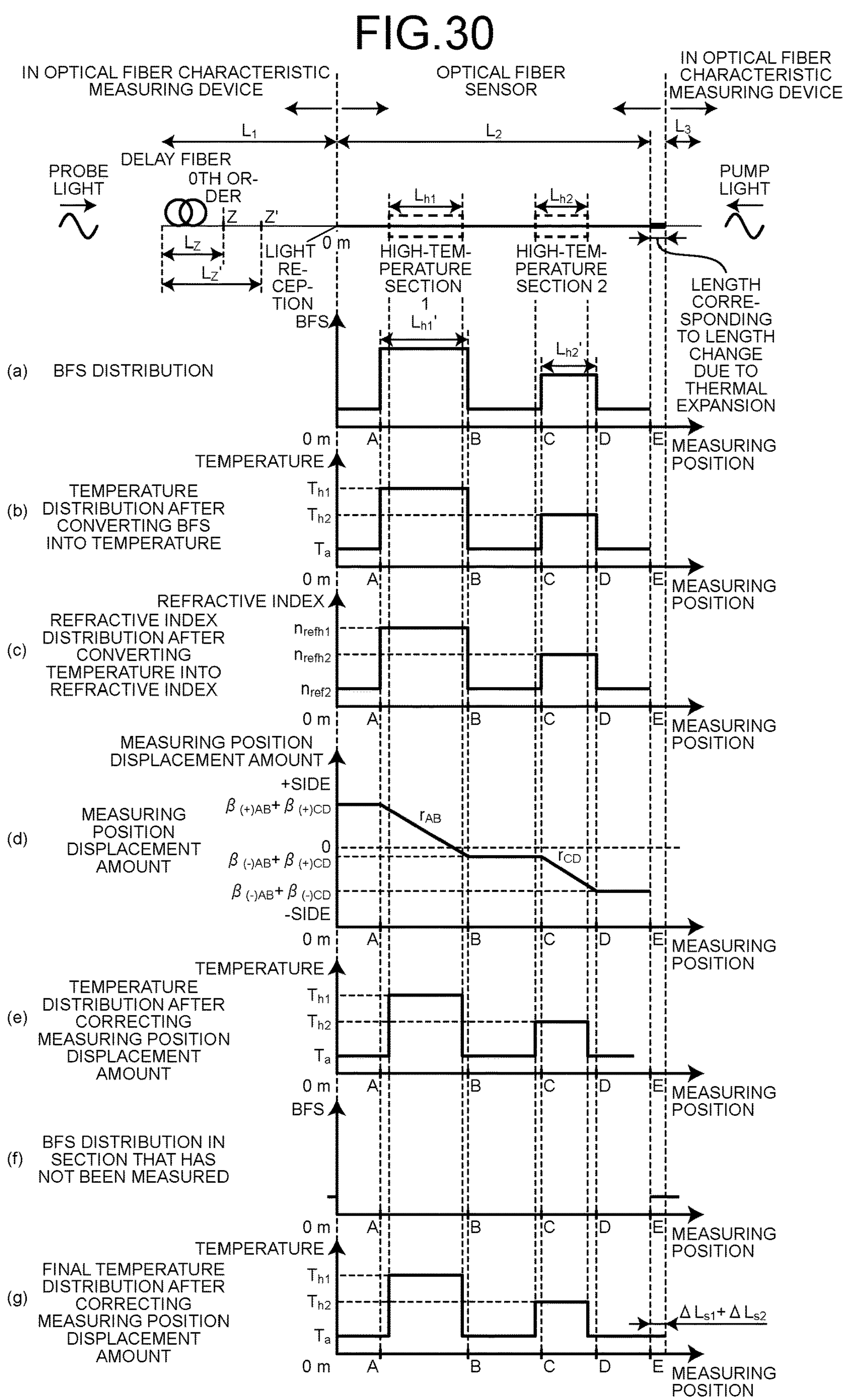
FIG. 30 is a diagram illustrating a specific example 2 of measurement results in the correlation domain scheme (BOCDA) according to the embodiment.
Figure 31:
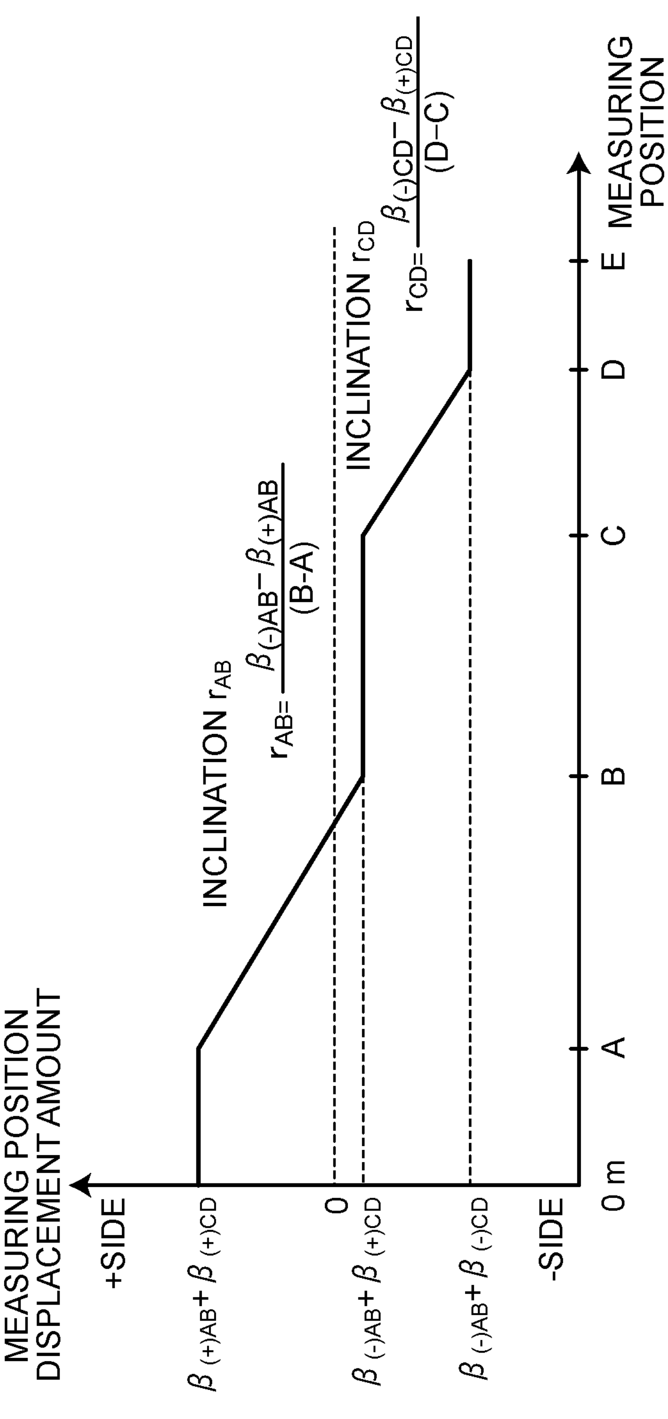
FIG. 31 is a diagram illustrating a specific example 2 of a relation between the measuring position and the measuring position displacement amount in the correlation domain scheme (BOCDA) according to the embodiment.

By referring to FIG. 30 to FIG. 34 and using numerical expressions, the following describes the specific example 2 including two high-temperature sections in the correlation domain scheme of the pieces of processing of the optical fiber characteristic measuring device 100. FIG. 30 is a diagram illustrating the specific example 2 of measurement results in the correlation domain scheme according to the embodiment. FIG. 31 is a diagram illustrating the specific example 2 of a relation between the measuring position and the measuring position displacement amount in the correlation domain scheme according to the embodiment. FIG. 32 is a diagram illustrating a specific example of preconditions in the correlation domain scheme according to the embodiment. FIG. 33 is a diagram illustrating a specific example of calculation results in the correlation domain scheme according to the embodiment. FIG. 34 is a diagram illustrating a specific example of temperature distribution after correction in the correlation domain scheme according to the embodiment. The examples of FIG. 30 to FIG. 34 are application examples of the correlation domain scheme (BOCDA) of the double-end light incident scheme.

The following describes measurement results in the correlation domain scheme illustrated in FIG. 30 using specific numerical values. In the following description, it is assumed that the optical fiber FUT as the sensor portion includes two high-temperature sections including a high-temperature section 1 (800° C., 200 m) and a high-temperature section 2 (600° C., 120 m). The temperature in the high-temperature sections including the high-temperature section 1 and the high-temperature section 2 is assumed to be uniform. Herein, a definition of a temperature determined to be a high temperature may be optionally determined in advance. As a measured temperature is higher, the high-temperature section is longer, and the number of the high-temperature sections is larger, the measuring position displacement amount is increased. For example, in a case of 800° C. and the high-temperature section of 100 m, the maximum measuring position displacement amount on the + side $\beta_{(+)}$ is about 0.52 m and the maximum measuring position displacement amount on the − side $\beta_{(-)}$ is about −0.48 m. In a case of 600° C. and the high-temperature section of 100 m, the maximum measuring position displacement amount on the + side $\beta_{(+)}$ is about 0.34 m, and the maximum measuring position displacement amount on the − side $\beta_{(-)}$ is about −0.31 m. In a case of 200° C. and the high-temperature section of 100 m, the maximum measuring position displacement amount on the + side $\beta_{(+)}$ is about 0.07 m, and the maximum measuring position displacement amount on the − side $\beta_{(-)}$ is about −0.06 m. The maximum measuring position displacement amount $\beta_{(+)}$ ($\beta_{(-)}$) is linearly changed with respect to the length of the high-temperature section, so that it can be obtained by simply performing multiplication. For example, in a case of 800° C. and the high-temperature section of 200 m, the maximum measuring position displacement amount on the + side $\beta_{(+)}$ is about 1.04 m, and the maximum measuring position displacement amount on the − side $\beta_{(-)}$ is about −0.97 m.

As illustrated in FIG. 31, in a case in which a plurality of the high-temperature sections are present, the maximum measuring position displacement amount on the + side is a sum of maximum position displacement amounts on the + side of the respective high-temperature sections, and the maximum measuring position displacement amount on the − side is a sum of maximum position displacement amounts on the − side of the respective high-temperature sections. For example, in a case in which the length of the high-temperature section 1 (section from the A position to the B position) obtained by measurement is 100 m and the temperature is 800° C., and the length of the high-temperature section 2 (section from the C position to the D position) obtained by measurement is 100 m and the temperature is 600° C., the maximum measuring position displacement amount on the + side is about 0.86 m, and the maximum measuring position displacement amount on the − side is about −0.79 m.

FIG. 32 illustrates preconditions for explanation using specific numerical values. FIG. 33 illustrates results of calculation using the expression (23), the expression (37), the expression (38), and the expression (46) to the expression (59) described above based on the preconditions illustrated in FIG. 32. Each of the expressions represented by the following expression (60) to expression (64) is applied to each section by using $\beta_{(+)AB}$, $\beta_{(-)AB}$, $\beta_{(+)CD}$, $\beta_{(-)CD}$, $r_{AB}$, and $r_{CD}$ illustrated in FIG. 33. FIG. 34 illustrates the temperature distribution after correction.

$$0\text{ m} \le \text{Measuring position} < A \tag{60}$$

$$\text{Actual measuring position} = \text{Measuring position} + \beta_{(+)AB} + \beta_{(+)CD}$$

$$A \le \text{Measuring position} < B \tag{61}$$

$$\text{Actual measuring position} = \text{Measuring position} + \beta_{(+)AB} + \beta_{(+)CD} + \Delta L_{\beta AB}$$

$$(\text{where } \Delta L_{\beta AB} = r_{AB} \times (\text{Measuring position} - A))$$

$$B \le \text{Measuring position} < C \tag{62}$$

$$\text{Actual measuring position} = \text{Measuring position} + \beta_{(-)AB} + \beta_{(+)CD}$$

$$C \le \text{Measuring position} < D \tag{63}$$

$$\text{Actual measuring position} = \text{Measuring position} + \beta_{(-)AB} + \beta_{(+)CD} + \Delta L_{\beta CD}$$

$$(\text{where } \Delta L_{\beta CD} = r_{CD} \times (\text{Measuring position} - C))$$

$$D \le \text{Measuring position} \tag{64}$$

$$\text{Actual measuring position} = \text{Measuring position} + \beta_{(-)AB} + \beta_{(-)CD}$$

2-4-2-4. Signs Used in Specific Example 2

The following describes signs used in the drawings and numerical expressions in the specific example 2 using the correlation domain scheme described above. $L_1$ is the length of the optical fiber from the probe light incident end to the incident end (0 m position) of the optical fiber FUT as the sensor portion. $L_2$ is the length of the optical fiber FUT as the sensor portion before reaching a high temperature (at 25° C.). $L_3$ is the length of the optical fiber from the pump light incident end to the incident end of the optical fiber FUT as the sensor portion. $T_{h1}$ is the temperature of the high-temperature section 1 converted by the BFS distribution generation processing. $T_{h2}$ is the temperature of the high-temperature section 2 converted by the BFS distribution generation processing. $T_a$ is a temperature of a section other than the high-temperature section 1 and the high-temperature section 2 converted by the BFS distribution generation processing. A is the measuring position at the beginning of the high-temperature section 1 calculated by the BFS distribution generation processing. B is the measuring position at the end of the high-temperature section 1 calculated by the BFS distribution generation processing. C is the measuring position at the beginning of the high-temperature section 2 calculated by the BFS distribution generation processing. D is the measuring position at the end of the high-temperature section 2 calculated by the BFS distribution generation processing. $n_{ref1}$ is the refractive index of the optical fiber from the probe light incident end to the incident end (0 m position) of the optical fiber FUT as the sensor portion. $n_{ref2}$ is the refractive index of the optical fiber FUT as the sensor portion before reaching a high temperature (at 25° C.). $n_{ref3}$ is the refractive index of the optical fiber from the pump light incident end to the incident end of the optical fiber FUT as the sensor portion. $n_{refh1}$ is the refractive index of the optical fiber FUT in the high-temperature section 1. $n_{refh2}$ is the refractive index of the optical fiber FUT in the high-temperature section 2. $L_{h1}$ is the actual length of the high-temperature section 1 in the optical fiber FUT as the sensor portion. $L_{h2}$ is the actual length of the high-temperature section 2 in the optical fiber FUT as the sensor portion.

$$L'_{h1}$$

is the length of the optical fiber FUT in the high-temperature section 1 in the optical fiber FUT as the sensor portion calculated by the BFS distribution generation processing.

$$L'_{h2}$$

is the length of the optical fiber FUT in the high-temperature section 1 in the optical fiber FUT as the sensor portion calculated by the BFS distribution generation processing. $\beta_{(+)AB}$ is the maximum measuring position displacement amount on the + side of the high-temperature section 1. $\beta_{(-)AB}$ is the maximum measuring position displacement amount on the − side of the high-temperature section 1. $\beta_{(+)CD}$ is the maximum measuring position displacement amount on the + side of the high-temperature section 2. $\beta_{(-)CD}$ is the maximum measuring position displacement amount on the − side of the high-temperature section 2. $r_{AB}$ is the inclination (rate of change) of the measuring position displacement amount in the AB section. $r_{CD}$ is the inclination (rate of change) of the measuring position displacement amount in the CD section. $\Delta L_{\beta AB}$ is the measuring position displacement amount for each measuring position in the AB section. $\Delta L_{\beta CD}$ is the measuring position displacement amount for each measuring position in the CD section. $L_{s1}$ is the length of the optical fiber FUT before reaching a high temperature (at 25° C.) in the high-temperature section 1 in the optical fiber FUT as the sensor portion. $L_{s2}$ is the length of the optical fiber FUT before reaching a high temperature (at 25° C.) in the high-temperature section 2 in the optical fiber FUT as the sensor portion. $\Delta L_{s1}$ is the length (distance) change of $L_{s1}$ due to thermal expansion. $\Delta L_{s2}$ is the length (distance) change of $L_{s2}$ due to thermal expansion.

3. Processing Procedure of Optical Fiber Characteristic Measuring System 1000

Figure 36:
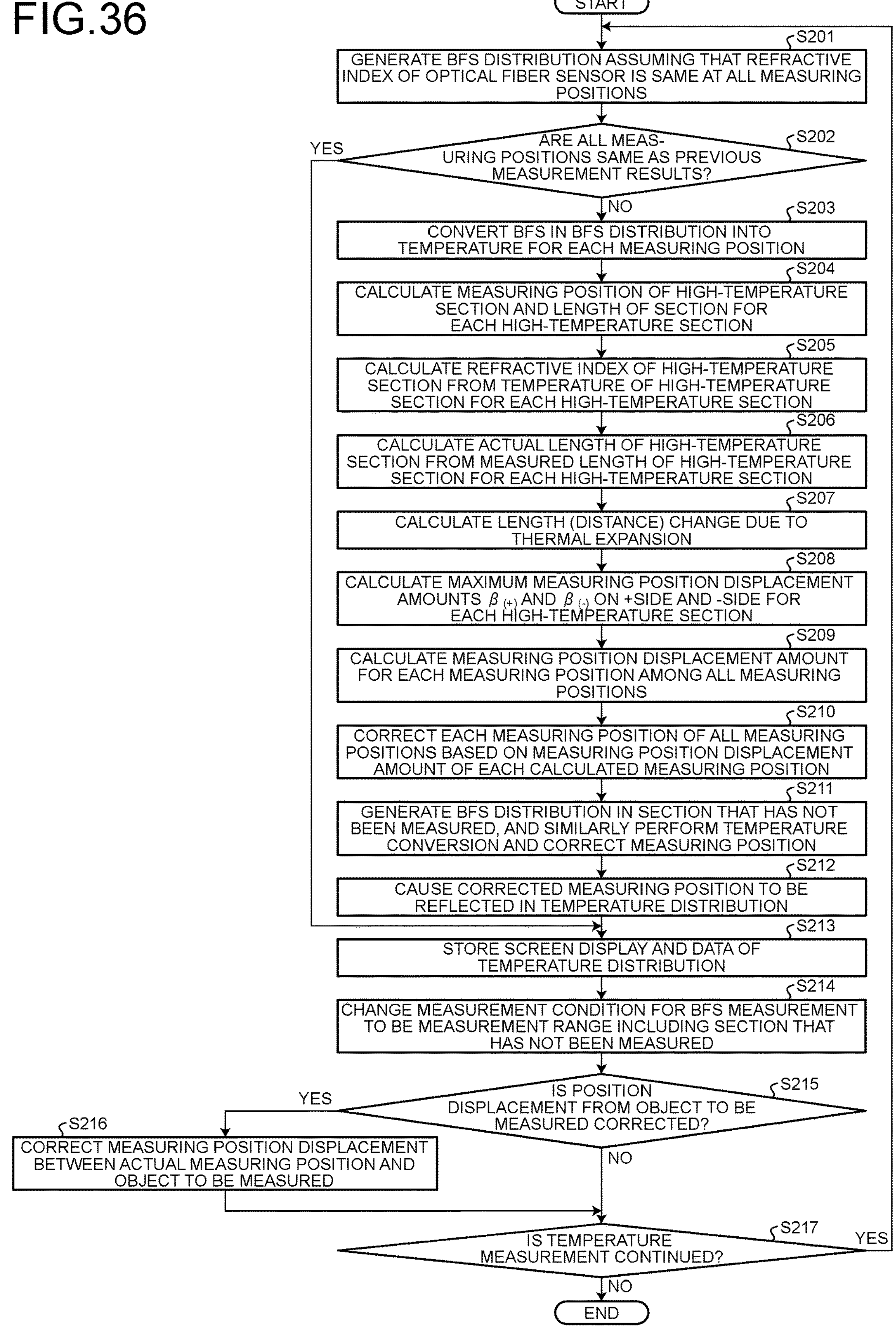
FIG. 36 is a flowchart illustrating an example of a procedure of the entire optical fiber characteristic measurement processing in the correlation domain scheme (BOCDA) according to the embodiment.

With reference to FIG. 35 and FIG. 36, the following describes a processing procedure of the optical fiber characteristic measuring system 1000 according to the embodiment. The following describes a procedure of the entire optical fiber characteristic measurement processing in the time domain scheme and the correlation domain scheme (BOCDR), and a procedure of the entire optical fiber characteristic measurement processing in the correlation domain scheme (BOCDA) in this order.

3-1. Procedure of Entire Optical Fiber Characteristic Measurement Processing in Time Domain Scheme and Correlation Domain Scheme (BOCDR)

With reference to FIG. 35, the following describes the procedure of the entire optical fiber characteristic measurement processing in the time domain scheme and the correlation domain scheme (BOCDR). FIG. 35 is a flowchart illustrating an example of the procedure of the entire optical fiber characteristic measurement processing in the time domain scheme and the correlation domain scheme (BOCDR) according to the embodiment. The following pieces of processing at Step S101 to S115 may be performed in different order. Some of the following pieces of processing at Step S101 to S115 may be omitted.

The optical fiber characteristic measuring device 100 generates the BFS distribution assuming that the refractive index of the optical fiber FUT as the sensor portion is the same at all of the measuring positions (Step S101). The optical fiber characteristic measuring device 100 determines whether all of the measuring positions are the same as previous measurement results (Step S102). At this point, if it is determined that all of the measuring positions are not the same as the previous measurement results (No at Step S102), the optical fiber characteristic measuring device 100 advances the process to the processing at Step S103. On the other hand, if it is determined that all of the measuring positions are the same as the previous measurement results (Yes at Step S102), the optical fiber characteristic measuring device 100 advances the process to the processing at Step S112.

The optical fiber characteristic measuring device 100 converts the BFS in the BFS distribution into the temperature for each measuring position, and generates the temperature distribution (Step S103). The optical fiber characteristic measuring device 100 calculates the measuring position of the high-temperature section and the length of the section for each high-temperature section (Step S104). The optical fiber characteristic measuring device 100 calculates the refractive index of the high-temperature section from the temperature of the high-temperature section for each high-temperature section (Step S105). The optical fiber characteristic measuring device 100 calculates the actual length of the high-temperature section from the measured length of the high-temperature section for each high-temperature section (Step S106). The optical fiber characteristic measuring device 100 calculates a length (distance) change due to thermal expansion (Step S107). The optical fiber characteristic measuring device 100 calculates the maximum measuring position displacement amount β for each high-temperature section (Step S108). The optical fiber characteristic measuring device 100 calculates the measuring position displacement amount for each measuring position among all of the measuring positions (Step S109). The optical fiber characteristic measuring device 100 corrects each measuring position of all of the measuring positions based on the measuring position displacement amount of each calculated measuring position (Step S110). The optical fiber characteristic measuring device 100 causes the corrected measuring position to be reflected in the temperature distribution (Step S111). The optical fiber characteristic measuring device 100 stores screen display and data of the temperature distribution (Step S112).

The optical fiber characteristic measuring device 100 determines whether to correct a position displacement from the object S to be measured (Step S113). At this point, if it is determined not to correct the position displacement from the object S to be measured (No at Step S113), the optical fiber characteristic measuring device 100 advances the process to the processing at Step S115. On the other hand, if it is determined to correct the position displacement from the object S to be measured (Yes at Step S113), the optical fiber characteristic measuring device 100 corrects the measuring position displacement between the actual measuring position and the object S to be measured (Step S114), and advances the process to the processing at Step S115.

The optical fiber characteristic measuring device 100 determines whether to continue the temperature measurement (Step S115). At this point, if it is determined not to continue the temperature measurement (No at Step S115), the optical fiber characteristic measuring device 100 ends the optical fiber characteristic measurement processing. On the other hand, if it is determined to continue the temperature measurement (Yes at Step S115), the optical fiber characteristic measuring device 100 advances the process to the processing at Step S101, and repeats the optical fiber characteristic measurement processing.

The above processing procedure describes the optical fiber characteristic measurement processing related to temperature measurement processing of generating the temperature distribution, but can also be applied to the optical fiber characteristic measurement processing for performing strain measurement processing of generating strain distribution. That is, in a case of performing the strain measurement processing, at Step S103 described above, the optical fiber characteristic measuring device 100 converts the BFS in the BFS distribution into the temperature for each measuring position to generate the temperature distribution, and converts the BFS into the strain for each measuring position to generate the strain distribution. At Step S111 described above, the optical fiber characteristic measuring device 100 causes the corrected measuring position to be reflected in the strain distribution. At Step S112 described above, the optical fiber characteristic measuring device 100 stores screen display and data of the strain distribution.

3-2. Procedure of Entire Optical Fiber Characteristic Measurement Processing in Correlation Domain Scheme (BOCDA)

With reference to FIG. 36, the following describes a procedure of the entire optical fiber characteristic measurement processing in the correlation domain scheme. FIG. 36 is a flowchart illustrating an example of the procedure of the entire optical fiber characteristic measurement processing in the correlation domain scheme according to the embodiment. The following pieces of processing at Step S201 to S217 may be performed in different order. Some of the following pieces of processing at Step S201 to S217 may be omitted.

The optical fiber characteristic measuring device 100 generates the BFS distribution assuming that the refractive index of the optical fiber FUT as the sensor portion is the same at all of the measuring positions (Step S201). The optical fiber characteristic measuring device 100 determines whether all of the measuring positions are the same as previous measurement results (Step S202). At this point, if it is determined that all of the measuring positions are not the same as the previous measurement results (No at Step S202), the optical fiber characteristic measuring device 100 advances the process to the processing at Step S203. On the other hand, if it is determined that all of the measuring positions are the same as the previous measurement results (Yes at Step S202), the optical fiber characteristic measuring device 100 advances the process to the processing at Step S213.

The optical fiber characteristic measuring device 100 converts the BFS in the BFS distribution into the temperature for each measuring position, and generates the temperature distribution (Step S203). The optical fiber characteristic measuring device 100 calculates the measuring position of the high-temperature section and the length of the section for each high-temperature section (Step S204). The optical fiber characteristic measuring device 100 calculates the refractive index of the high-temperature section from the temperature of the high-temperature section for each high-temperature section (Step S205). The optical fiber characteristic measuring device 100 calculates the actual length of the high-temperature section from the measured length of the high-temperature section for each high-temperature section (Step S206). The optical fiber characteristic measuring device 100 calculates a length (distance) change due to thermal expansion (Step S207). The optical fiber characteristic measuring device 100 calculates maximum measuring position displacement amounts $\beta_{(+)}$ and $\beta_{(-)}$ on the + side and the − side for each high-temperature section (Step S208). The optical fiber characteristic measuring device 100 calculates the measuring position displacement amount for each measuring position among all of the measuring positions (Step S209). The optical fiber characteristic measuring device 100 corrects each measuring position of all of the measuring positions based on the measuring position displacement amount of each calculated measuring position (Step S210). The optical fiber characteristic measuring device 100 generates BFS distribution in a section that has not been measured, and performs temperature conversion and corrects the measuring position similarly to the processing at Step S203 to S210 (Step S211). The optical fiber characteristic measuring device 100 causes the corrected measuring position to be reflected in the temperature distribution (Step S212). The optical fiber characteristic measuring device 100 stores screen display and data of the temperature distribution (Step S213). The optical fiber characteristic measuring device 100 changes the measurement condition for BFS measurement to be a measurement range including the section that has not been measured (Step S214).

The optical fiber characteristic measuring device 100 determines whether to correct a position displacement from the object S to be measured (Step S215). At this point, if it is determined not to correct the position displacement from the object S to be measured (No at Step S215), the optical fiber characteristic measuring device 100 advances the process to the processing at Step S217. On the other hand, if it is determined to correct the position displacement from the object S to be measured (Yes at Step S215), the optical fiber characteristic measuring device 100 corrects the measuring position displacement between the actual measuring position and the object S to be measured (Step S216), and advances the process to the processing at Step S217.

The optical fiber characteristic measuring device 100 determines whether to continue the temperature measurement (Step S217). At this point, if it is determined not to continue the temperature measurement (No at Step S217), the optical fiber characteristic measuring device 100 ends the optical fiber characteristic measurement processing. On the other hand, if it is determined to continue the temperature measurement (Yes at Step S217), the optical fiber characteristic measuring device 100 advances the process to the processing at Step S201, and repeats the optical fiber characteristic measurement processing.

The above processing procedure describes the optical fiber characteristic measurement processing related to temperature measurement processing of generating the temperature distribution, but can also be applied to the optical fiber characteristic measurement processing for performing strain measurement processing of generating strain distribution. That is, in a case of performing the strain measurement processing, at Step S203 described above, the optical fiber characteristic measuring device 100 converts the BFS in the BFS distribution into the temperature for each measuring position to generate the temperature distribution, and converts the BFS into the strain for each measuring position to generate the strain distribution. At Step S212 described above, the optical fiber characteristic measuring device 100 causes the corrected measuring position to be reflected in the strain distribution. At Step S213 described above, the optical fiber characteristic measuring device 100 stores screen display and data of the strain distribution.

4. Application Examples of Embodiment

The following describes application examples of the embodiment.

4-1. Application Example 1 of Embodiment

The optical fiber characteristic measuring device 100 is an information processing device configured to measure characteristics such as a temperature, a strain, a vibration, and the like based on a physical quantity change of the optical fiber FUT using the optical fiber as a sensor. In the embodiment described above, mainly described is the temperature measurement processing of measuring the temperature from the BFS as a physical quantity of the optical fiber, but the embodiment can also be applied to the strain measurement processing of measuring the strain from the BFS.

In the embodiment described above, mainly described is reducing the measuring position displacement at the time of the temperature distribution generation processing in a case in which the optical fiber FUT is used in the high-temperature environment, but the same measuring position displacement causes a problem when a temperature of the measuring environment is high at the time of strain distribution generation processing. The measuring position displacement is caused by a refractive index change and a length change due to thermal expansion of the optical fiber FUT, and the measuring position displacement amount cannot be calculated only by performing the strain distribution generation processing, so that the temperature of the optical fiber FUT needs to be measured at the same time. The following describes an example of processing of reducing the measuring position displacement at the time of strain distribution generation processing.

First, by using a strain temperature separation technique, the strain distribution generation processing and the temperature distribution generation processing are performed at the same time, and the measuring position displacement amount is calculated. Second, by preparing the optical fiber FUT for temperature measurement separately from that for strain measurement, the temperature in the strain measuring environment is measured, and the measuring position displacement is reduced. Third, by preparing other means (a thermocouple, a temperature measuring body, thermography, and the like) instead of the optical fiber FUT, the temperature in the strain measuring environment is measured, and the measuring position displacement is reduced.

4-2. Application Example 2 of Embodiment

In an OTDR (time domain scheme) for detecting a fracture point of the optical fiber FUT, the measuring position displacement becomes a problem in a case in which the refractive index of the optical fiber FUT is changed. If the optical fiber characteristic measuring device 100 can measure a temperature of an environment in which the optical fiber FUT is laid by optional means, the measuring position displacement can be reduced.

4-3. Application Example 3 of Embodiment

The measuring position displacement also becomes a problem in a case in which the optical fiber FUT as a sensor in a low-temperature environment instead of the high-temperature environment. The optical fiber characteristic measuring device 100 can also reduce the measuring position displacement in a case in which the optical fiber FUT is used in the low-temperature environment instead of the high-temperature environment.

5. Effects of Embodiment

Finally, the following describes effects of the embodiment. The following describes effects 1 to 6 corresponding to the pieces of processing according to the embodiment.

5-1. Effect 1

First, in the processing according to the embodiment described above, the optical fiber characteristic measuring device 100 acquires the BFS from the measuring position of the optical fiber FUT disposed in the object S to be measured, generates the temperature distribution in the longitudinal direction of the optical fiber FUT by converting the acquired BFS into the temperature, calculates a physical property change of the optical fiber FUT based on the generated temperature distribution, and corrects the measuring position of the optical fiber FUT based on the calculated physical property change. Thus, in this processing, it is possible to suppress lowering of accuracy of the measuring position for the characteristics of the object S to be measured.

5-2. Effect 2

Second, in the processing according to the embodiment described above, the optical fiber characteristic measuring device 100 calculates at least one of a change in the refractive index and a change in the distance in the longitudinal direction in a section having a temperature equal to or higher than the predetermined temperature of the optical fiber FUT using the generated temperature distribution, corrects the measuring position displacement using at least one of the calculated change in the refractive index and change in the distance in the longitudinal direction, and corrects the temperature distribution. Thus, in this processing, it is possible to suppress lowering of accuracy of the measuring position for the characteristics of the object S to be measured in the temperature distribution generation processing.

5-3. Effect 3

Third, in the processing according to the embodiment described above, the optical fiber characteristic measuring device 100 generates the temperature distribution by converting the BFS into the temperature, generates the strain distribution in the longitudinal direction of the optical fiber FUT by converting the BFS into the strain, calculates at least one of a change in the refractive index and a change in the distance in the longitudinal direction in a section having a temperature equal to or higher than the predetermined temperature of the optical fiber FUT using the generated temperature distribution, corrects the measuring position displacement using at least one of the calculated change in the refractive index and change in the distance in the longitudinal direction, and corrects the generated strain distribution. Thus, in this processing, it is possible to suppress lowering of accuracy of the measuring position for the characteristics of the object S to be measured in the strain distribution generation processing.

5-4. Effect 4

Fourth, in the processing according to the embodiment described above, the optical fiber characteristic measuring device 100 acquires the BFS from the measuring position of the optical fiber FUT using the time domain scheme or the correlation domain scheme. Thus, in this processing, in a case of selecting either one of the time domain scheme or the correlation domain scheme as a method for calculating the measuring position, it is possible to suppress lowering of accuracy of the measuring position for the characteristics of the object S to be measured.

5-5. Effect 5

Fifth, in the processing according to the embodiment described above, the optical fiber characteristic measuring device 100 acquires the BFS from the measuring position of the optical fiber FUT using the single-end light incident scheme or the double-end light incident scheme. Thus, in this processing, in a case of selecting either one of the single-end light incident scheme or the double-end light incident scheme as a light incident scheme, it is possible to suppress lowering of accuracy of the measuring position for the characteristics of the object S to be measured.

5-6. Effect 6

Sixth, in the processing according to the embodiment described above, the optical fiber characteristic measuring device 100 generates the temperature distribution or the strain distribution in the longitudinal direction of the optical fiber FUT by converting the BFS into the temperature or the strain, corrects the measuring position of the optical fiber FUT based on the calculated physical property change, corrects the generated temperature distribution or strain distribution, and detects abnormality of the object S to be measured in a case in which the temperature indicated by the temperature distribution after correction or the strain indicated by the strain distribution after correction is equal to or larger than the threshold. Thus, in this processing, it is possible to suppress lowering of accuracy of the measuring position for the characteristics of the object S to be measured, and detect the abnormal state of the object S to be measured more correctly.

System

The processing procedures, control procedures, specific names, and information including various kinds of data and parameters described above or illustrated in the drawings can be optionally changed unless otherwise specifically noted.

The constituent elements of the devices illustrated in the drawings are merely conceptual, and it is not required that they are physically configured as illustrated necessarily. That is, specific forms of distribution and integration of the devices are not limited to those illustrated in the drawings. In other words, all or part thereof may be functionally or physically distributed/integrated in arbitrary units depending on various loads, usage states, or the like.

Furthermore, all or optional part of the processing functions executed by the respective devices may be implemented by a CPU and a computer program analyzed and executed by the CPU, or may be implemented as hardware using wired logic.

Hardware

Figure 37:
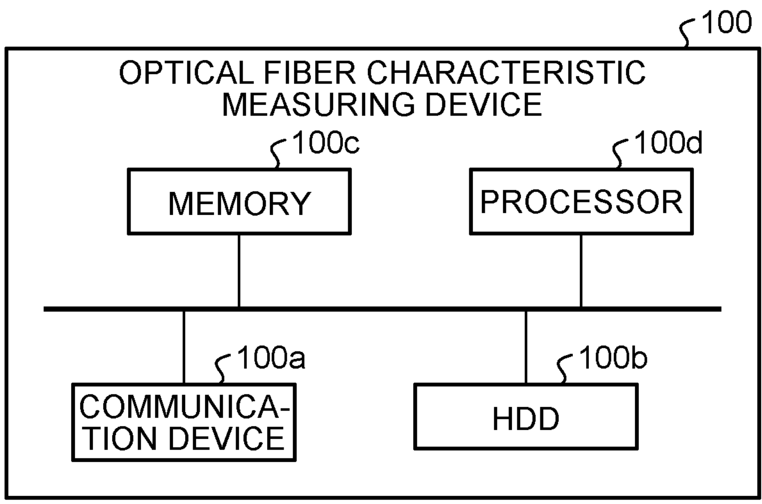
FIG. 37 is a diagram illustrating a hardware configuration example according to the embodiment.

Next, the following describes a hardware configuration example of the optical fiber characteristic measuring device 100. Other devices can have the same hardware configuration. FIG. 37 is a diagram for explaining the hardware configuration example. As illustrated in FIG. 37, the optical fiber characteristic measuring device 100 includes a communication device 100*a*, an HDD 100*b*, a memory 100*c*, and a processor 100*d*. The components illustrated in FIG. 37 are connected to each other via a bus and the like.

The communication device 100*a* is a network interface card and the like, and communicates with other servers. The HDD 100*b* stores a DB and computer programs for causing the functions illustrated in FIG. 17 to FIG. 19 to operate.

The processor 100*d* causes a process for executing the functions described above with reference to FIG. 17 to FIG. 19 and the like to operate by reading out, from the HDD 100*b* and the like, computer programs for executing the same pieces of processing as those of the processing units illustrated in FIG. 17 to FIG. 19 to be loaded into the memory 100*c*. For example, this process executes the same functions as those of the processing units included in the optical fiber characteristic measuring device 100. Specifically, the processor 100*d* reads out a computer program having the same function as the measurement control unit 110 and the like from the HDD 100*b* and the like. The processor 100*d* then performs the process of performing the same processing as the measurement control unit 110 and the like.

In this way, the optical fiber characteristic measuring device 100 operates as an information processing device that performs various kinds of processing methods by reading out and executing the computer program. The optical fiber characteristic measuring device 100 can also implement the same function as that in the embodiment described above by reading out the computer program described above from a recording medium by a medium reading device and executing the read-out computer program described above. The computer program in this other embodiment is not necessarily executed by the optical fiber characteristic measuring device 100. For example, the present invention can be similarly applied to a case in which another computer or server executes the computer program, or a case in which they execute the computer program in cooperation with each other.

This computer program can be distributed via a network such as the Internet. This computer program can be recorded in a computer-readable recording medium such as a hard disk, a flexible disk (FD), a CD-ROM, a Magneto-Optical disk (MO), and a Digital Versatile Disc (DVD), and executed by being read out from the recording medium by a computer.

The present invention has an effect of suppressing lowering of accuracy of a measuring position for characteristics of a measuring object.

What is claimed is:

1. A measuring device comprising:

at least one processor; and a memory storing instructions that, when executed by the at least one processor, cause the at least one processor to perform operations, the operations comprising:

acquiring each Brillouin Frequency Shift from each measuring position of an optical fiber disposed in a measuring object;

generating a temperature distribution in a longitudinal direction of the optical fiber by converting each Brillouin Frequency Shift into a temperature;

specifying a high-temperature section having a temperature equal to or higher than a predetermined temperature of the optical fiber from the temperature distribution;

converting a temperature into a refractive index for each specified high-temperature section, and generating a refractive index distribution in the longitudinal direction of the optical fiber;

calculating a distance change in the longitudinal direction of the optical fiber due to thermal expansion for each specified high-temperature section;

calculating a measuring position displacement amount between the measuring position and an actual measuring position from the refractive index distribution for each high-temperature section; and correcting each measuring position of the optical fiber based on the calculated measuring position displacement amount and the calculated distance change.

2. The measuring device according to claim 1, wherein the operations further comprise:

generating the temperature distribution by converting each Brillouin Frequency Shift into a temperature, and generating strain distribution in the longitudinal direction of the optical fiber by converting each Brillouin Frequency Shift into a strain, and correcting a displacement of each measuring position and correcting the strain distribution using the calculated measuring position displacement amount and the calculated distance change.

3. The measuring device according to claim 1, wherein the operations further comprise acquiring each Brillouin Frequency Shift from each measuring position of the optical fiber using a time domain scheme or a correlation domain scheme.

4. The measuring device according to claim 3, wherein the operations further comprise acquiring each Brillouin Frequency Shift from each measuring position of the optical fiber using a single-end light incident scheme or a double-end light incident scheme.

5. The measuring device according to claim 1, wherein the operations further comprise:

generating temperature distribution or strain distribution in the longitudinal direction of the optical fiber by converting each Brillouin Frequency Shift into a temperature or a strain, correcting each measuring position of the optical fiber, and correcting the temperature distribution or the strain distribution based on the calculated measuring position displacement amount and the calculated distance change, and detecting abnormality of the measuring object in a case in which the temperature indicated by the temperature distribution after correction or the strain indicated by the strain distribution after correction is equal to or larger than a threshold.

6. A measuring method comprising:

acquiring each Brillouin Frequency Shift from each measuring position of an optical fiber disposed in a measuring object;

generating a temperature distribution in a longitudinal direction of the optical fiber by converting each Brillouin Frequency Shift into a temperature;

specifying a high-temperature section having a temperature equal to or higher than a predetermined temperature of the optical fiber from the temperature distribution;

converting a temperature into a refractive index for each specified high-temperature section, and generating a refractive index distribution in the longitudinal direction of the optical fiber;

calculating a distance change in the longitudinal direction of the optical fiber due to thermal expansion for each specified high-temperature section;

calculating a measuring position displacement amount between the measuring position and an actual measuring position from the refractive index distribution for each high-temperature section; and correcting each measuring position of the optical fiber based on the calculated measuring position displacement amount and the calculated distance change.

7. A non-transitory computer-readable recording medium having stored therein a measuring program that causes a computer to perform processing comprising:

acquiring each Brillouin Frequency Shift from each measuring position of an optical fiber disposed in a measuring object;

generating a temperature distribution in a longitudinal direction of the optical fiber by converting each Brillouin Frequency Shift into a temperature;

specifying a high-temperature section having a temperature equal to or higher than a predetermined temperature of the optical fiber from the temperature distribution;

converting a temperature into a refractive index for each specified high-temperature section, and generating a refractive index distribution in the longitudinal direction of the optical fiber;

calculating a distance change in the longitudinal direction of the optical fiber due to thermal expansion for each specified high-temperature section;

calculating a measuring position displacement amount between the measuring position and an actual measuring position from the refractive index distribution for each high-temperature section; and correcting each measuring position of the optical fiber based on the calculated measuring position displacement amount and the calculated distance change.

* * * * *